(12) United States Patent
Haruna et al.

(10) Patent No.: US 10,744,651 B2
(45) Date of Patent: Aug. 18, 2020

(54) MIRROR REPLACEMENT DEVICE FOR A SEGMENTED MIRROR TELESCOPE AND MIRROR REPLACEMENT METHOD THEREOF

(71) Applicant: MITSUBISHI ELECTRIC CORPORATION, Chiyoda-ku (JP)

(72) Inventors: Masaki Haruna, Chiyoda-ku (JP); Kazuhiko Fukushima, Chiyoda-ku (JP); Ieyoung Kim, Chiyoda-ku (JP); Satoru Sofuku, Chiyoda-ku (JP); Toshitaka Nakaoji, Chiyoda-ku (JP); Yasushi Horiuchi, Chiyoda-ku (JP); Yusuke Saruta, Chiyoda-ku (JP); Junji Takaki, Chiyoda-ku (JP); Noboru Kawaguchi, Chiyoda-ku (JP); Yutaka Ezaki, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 343 days.

(21) Appl. No.: 15/769,834

(22) PCT Filed: Feb. 15, 2016

(86) PCT No.: PCT/JP2016/054261
§ 371 (c)(1),
(2) Date: Apr. 20, 2018

(87) PCT Pub. No.: WO2017/073090
PCT Pub. Date: May 4, 2017

(65) Prior Publication Data
US 2018/0297213 A1   Oct. 18, 2018

(30) Foreign Application Priority Data
Oct. 27, 2015   (JP) ................................. 2015-210499

(51) Int. Cl.
*B25J 13/08*    (2006.01)
*B25J 9/00*    (2006.01)
(Continued)

(52) U.S. Cl.
CPC ............... *B25J 13/085* (2013.01); *B25J 5/04* (2013.01); *B25J 9/003* (2013.01); *B25J 9/0018* (2013.01);
(Continued)

(58) Field of Classification Search
None
See application file for complete search history.

(56) References Cited

FOREIGN PATENT DOCUMENTS

JP      10-29793 A      2/1998
JP      10-338465 A     12/1998
(Continued)

OTHER PUBLICATIONS

International Search Report dated May 17, 2016 in PCT/JP2016/054261 filed Feb. 15, 2016.

*Primary Examiner* — Bhavesh V Amin
(74) *Attorney, Agent, or Firm* — Oblon, McClelland, Maier & Neustadt, L.L.P.

(57) ABSTRACT

A mirror replacement device includes a gripping mechanism to grip a segment mirror, a fine drive mechanism to change a position and a posture of the gripping mechanism, a lift mechanism for the segment mirror, a first detector to detect a relative position and a relative posture between a comparison object and a target object, a second detector to detect a bend of the fine drive mechanism, and a mirror replacement controller to replace the segment mirror based on detection signals output from the above-mentioned detectors. The controller determines whether the first detector can successfully perform a measurement. When it is determined that the measurement can be successfully performed, the
(Continued)

control is performed based on the detection signal output from the first detector. When it is determined that the measurement cannot be successfully performed, the control is performed based on the detection signal output from the second detector.

15 Claims, 42 Drawing Sheets

(51) Int. Cl.
    *B25J 5/04*     (2006.01)
    *B25J 19/02*     (2006.01)
    *G02B 5/09*     (2006.01)
    *B25J 9/04*     (2006.01)
    *B25J 15/02*     (2006.01)
    *G02B 7/183*     (2006.01)
    *G02B 7/198*     (2006.01)
    *G02B 23/02*     (2006.01)

(52) U.S. Cl.
    CPC ............... *B25J 9/04* (2013.01); *B25J 13/088* (2013.01); *B25J 13/089* (2013.01); *B25J 15/0206* (2013.01); *B25J 15/0253* (2013.01); *B25J 19/02* (2013.01); *B25J 19/023* (2013.01); *G02B 5/09* (2013.01); *G02B 7/183* (2013.01); *G02B 7/198* (2013.01); *G02B 23/02* (2013.01)

(56) References Cited

FOREIGN PATENT DOCUMENTS

| | | |
|---|---|---|
| JP | 2001-31383 A | 2/2001 |
| JP | 2004-273702 A | 9/2004 |

MIRROR REPLACEMENT DEVICE FOR A SEGMENTED MIRROR TELESCOPE AND MIRROR REPLACEMENT METHOD THEREOF

TECHNICAL FIELD

The present disclosure relates to a mirror replacement device for a segmented mirror telescope including a plurality of mirrors, and a mirror replacement method thereof.

BACKGROUND ART

A segmented mirror telescope needs regular replacement of mirrors for maintenance of the mirrors. It is conceivable that, with a device for the replacement, a mirror is mounted and removed by a gripping mechanism suspended with a wire (for example, Patent Literature 1).

CITATION LIST

Patent Literature

[PTL 1] JP 2001-31383 A

SUMMARY OF INVENTION

Technical Problem

According to the related-art method, the mirror is mounted and removed by the gripping mechanism suspended with the wire. The replacement device using a wire suspending method has substantially the same configuration and method as those of a foldable crane for lifting and transporting heavy goods disclosed in Patent Literature 1. In this case, there is a problem in that high positioning accuracy of the mirror cannot be achieved due to oscillation of the mirror.

The present disclosure has been made to solve the problem described above, and has an object to provide a mirror replacement device for a segmented mirror telescope, which is capable of achieving highly accurate positioning of a segment mirror, and a mirror replacement method thereof.

Solution to Problem

According to one embodiment of the present disclosure, there is provided a mirror replacement device for a segmented mirror telescope including a segmented primary mirror in which a plurality of segment mirrors are removably arranged so that segment mirrors provided in a central region of the segmented primary mirror each have a perpendicular axis extending in a vertical direction and that segment mirrors provided in an outer peripheral region of the segmented primary mirror each have a perpendicular axis inclined inward with respect to the vertical direction. The mirror replacement device includes a rough drive mechanism, a gripping mechanism, a fine drive mechanism, a lift mechanism, a first detector, a second detector, a third detector, and a mirror replacement controller. The rough drive mechanism moves a rough drive mechanism base above the segmented primary mirror. The gripping mechanism grips the segment mirror from above by opening and closing the mechanism. The fine drive mechanism has a lower end to which the gripping mechanism is fixed and an upper end fixed to the rough drive mechanism base, and is drivable along multiple axes to change a position and a posture of the gripping mechanism with higher accuracy than by the rough drive mechanism. The lift mechanism lifts a segment mirror to be replaced on the segmented primary mirror side along a perpendicular axis direction of the segment mirror. The first detector detects a relative position and a relative posture between the segment mirror gripped by the gripping mechanism and the lift mechanism. The second detector detects a relative position and a relative posture between the segment mirror on the lift mechanism and the gripping mechanism. The third detector detects a bend of the rough drive mechanism, or the bend of the rough drive mechanism and a bend of the fine drive mechanism due to an inclination of the gripping mechanism with respect to the vertical direction. The mirror replacement controller controls and drives the rough drive mechanism, the gripping mechanism, the fine drive mechanism, and the lift mechanism to replace the segment mirror. The mirror replacement controller includes a rough track calculator and a fine track calculator. The rough track calculator outputs a command signal for moving the rough drive mechanism base to a position of the segment mirror to be replaced to the rough drive mechanism in accordance with a difference between a feedback signal indicating a position of the rough drive mechanism base, which is output from the rough drive mechanism, and a pre-stored position of the segment mirror to be replaced. When the segment mirror is mounted to the lift mechanism, the fine track calculator outputs a command signal to the fine drive mechanism so as to correct the relative position and the relative posture between the segment mirror and the lift mechanism in accordance with a detection signal output from the first detector and a feedback signal indicating a position and a posture of the segment mirror gripped by the gripping mechanism, which is output from the fine drive mechanism. When the segment mirror is removed from the lift mechanism, the fine track calculator outputs the command signal to the fine drive mechanism so as to correct the relative position and the relative posture between the segment mirror on the lift mechanism and the gripping mechanism in accordance with a detection signal output from the second detector and the feedback signal indicating a position and a posture of the gripping mechanism, which is output from the fine drive mechanism. For replacement of the segment mirror having the perpendicular axis being inclined with respect to the vertical direction, when the segment mirror is mounted and removed, the fine track calculator further outputs the command signal to the fine drive mechanism in accordance with a detection signal output from the third detector.

Advantageous Effects of Invention

According to the present disclosure, the mirror replacement device for a segmented mirror telescope, which is capable of achieving highly accurate positioning of the segment mirror, and the mirror replacement method thereof can be provided.

DESCRIPTION OF EMBODIMENTS

Now, it is described about a mirror replacement device for a segmented mirror telescope and a mirror replacement method thereof according to embodiments of the present disclosure with reference to the drawings. In each of the embodiments, the same or corresponding portions are denoted by the same reference symbols, and the overlapping description thereof is omitted.

First Embodiment

Figure 1:
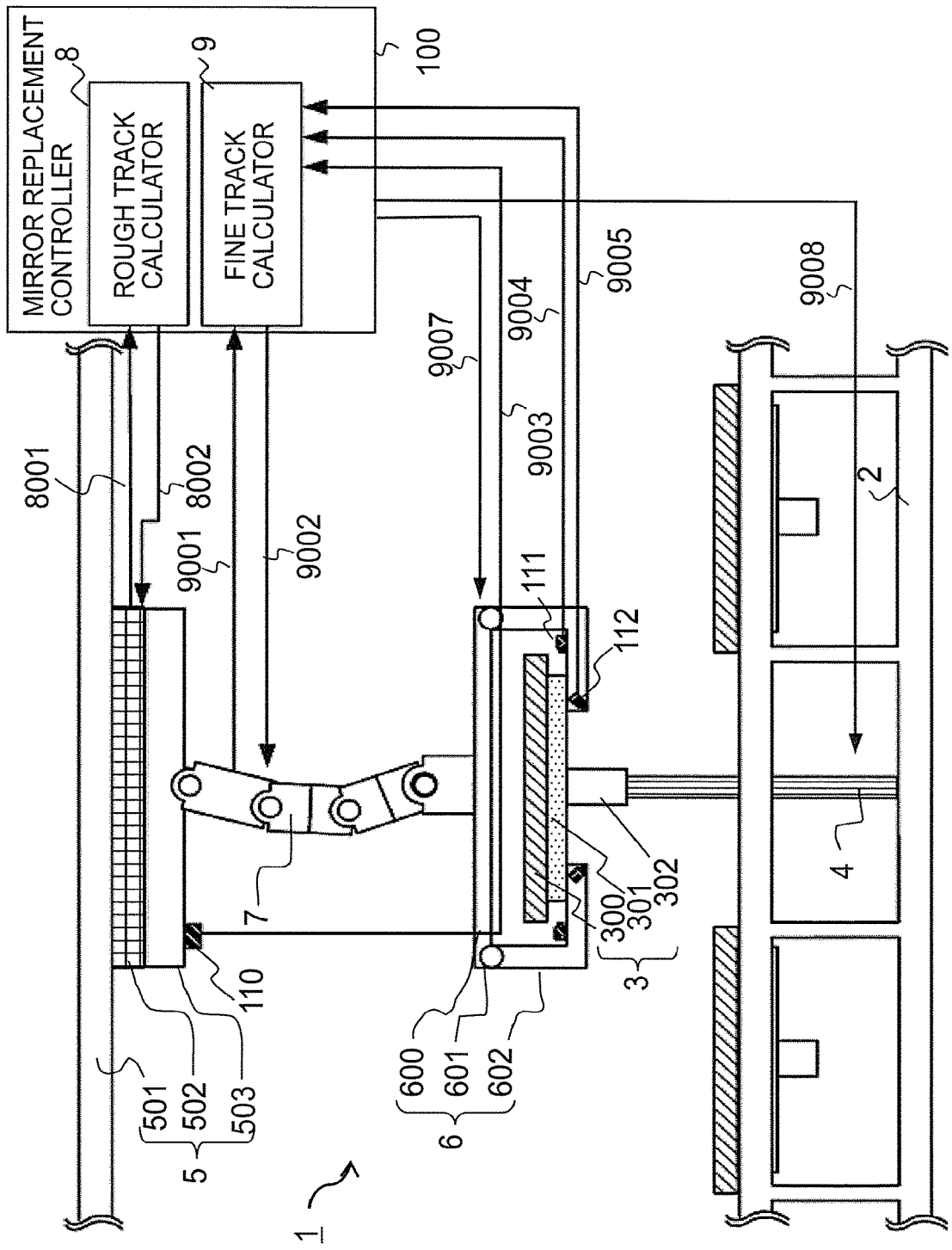
FIG. 1 is a view for illustrating a configuration of a mirror replacement device for a segmented mirror telescope according to a first embodiment of the present disclosure.
Figure 2:
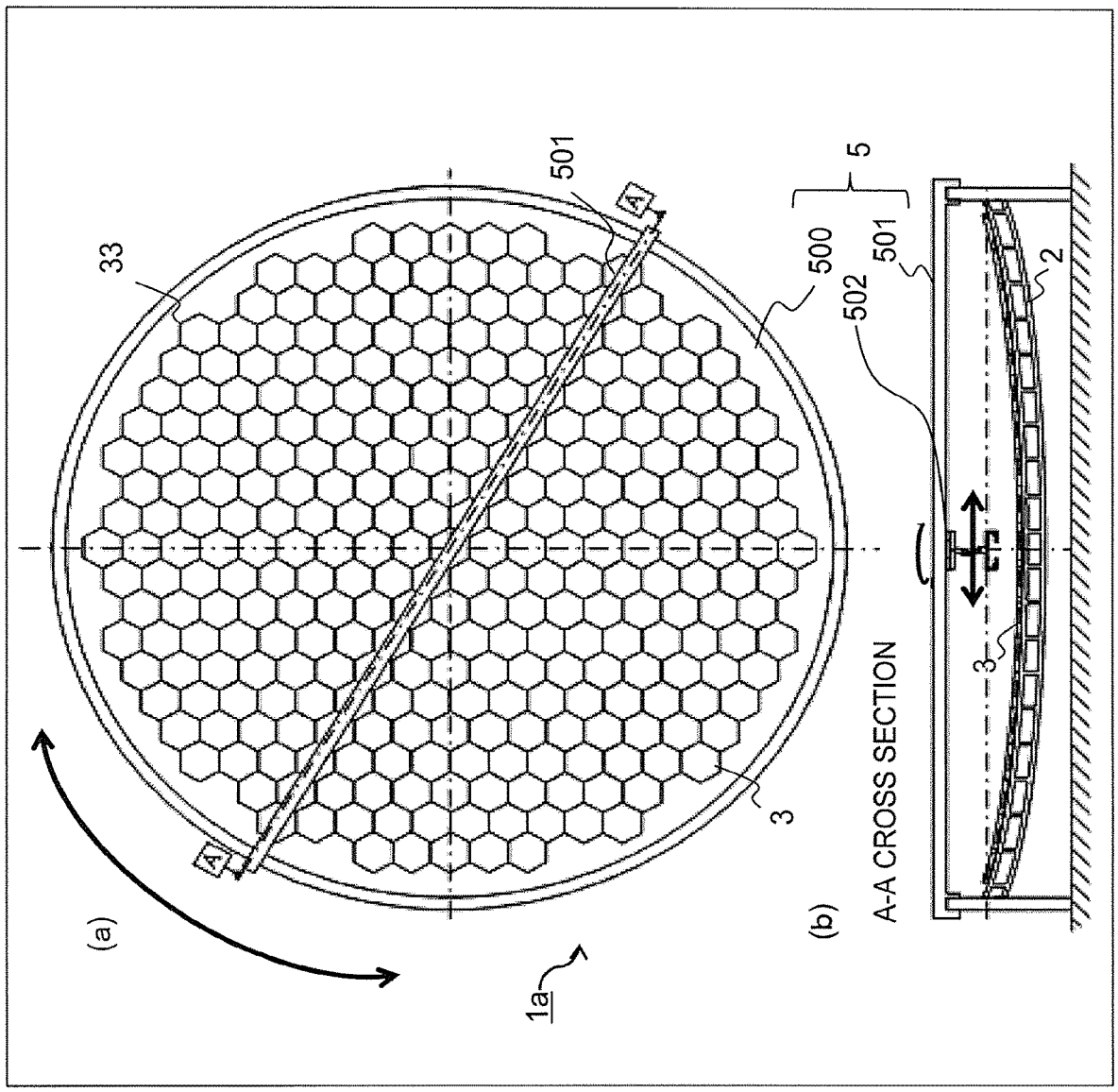
FIG. 2 are views for illustrating a whole configuration of the segmented mirror telescope provided with the mirror replacement device according to the first embodiment of the present disclosure.

FIG. 1 is a view for illustrating a configuration of a mirror replacement device for a segmented mirror telescope according to a first embodiment of the present disclosure. FIG. 2 are views for illustrating a whole configuration of the segmented mirror telescope. FIG. 2A is a top view, and FIG. 2B is a sectional view taken along the line A-A in FIG. 2A. FIG. 1 is an illustration of a state in which a segment mirror 3 is mounted to a lift mechanism 4 for the segment mirror by a mirror replacement device 1. During normal time such as a time in which a segmented mirror telescope 1a is operating, the segment mirrors 3 are mounted to a segmented mirror telescope main body 2.

The segment mirror 3 includes a mirror material portion 300, a mirror gripped portion 301, and a lift insertion portion 302.

The mirror material portion 300 actually constitutes a telescope.

The mirror gripped portion 301 is a portion to be gripped by gripping claw portions 602 described later or the like. The lift insertion portion 302 is a portion to be inserted and lifted up by the lift mechanism 4 described later.

For maintenance of the mirror, the lift insertion portion 302 of the segment mirror 3 is pushed upward to be lifted up by the lift mechanism 4. The mirror gripped portion 301 is gripped by the gripping claw portions 602 or the like.

The mirror replacement device 1 includes the lift mechanism 4, a rough drive mechanism 5, a fine drive mechanism 7 which is drivable along six axes, a gripping mechanism 6, and a mirror replacement controller 100 described later to perform control for the above-mentioned mechanisms.

The rough drive mechanism 5 moves a rough drive mechanism base 503 in a plane along a surface of the segmented mirror telescope 1a above a segmented primary mirror 33 while changing a position and a direction of the rough drive mechanism base 503.

The gripping mechanism 6 grips the segment mirror 3 from above by opening and closing the mechanism.

The fine drive mechanism 7 has a lower end to which the gripping mechanism 6 is fixed and an upper end which is fixed to the rough drive mechanism base 503, and changes a position and a posture of the gripping mechanism 6, for example, in three-dimensional space with higher accuracy than by the rough drive mechanism 5.

The lift mechanism 4 lifts the segment mirror 3 to be replaced on the segmented primary mirror 33 side along a perpendicular axis direction of the segment mirror 3.

The mirror replacement controller 100 controls and drives the lift mechanism 4, the rough drive mechanism 5, the gripping mechanism 6, and the fine drive mechanism 7 to replace the segment mirror 3.

The fine drive mechanism refers "precise drive mechanism".

Further, the fine drive mechanism 7 is not limited to be drivable along six axes, and may also be drivable along multiple axes.

The rough drive mechanism 5 includes a rough circumferential drive mechanism 500, a rough linear drive mechanism 501, a rough rotational drive mechanism 502, and the rough drive mechanism base 503.

The rough drive mechanism base 503 supports the fine drive mechanism 7 and the gripping mechanism 6.

The rough rotational drive mechanism 502 rotates the rough drive mechanism base 503 around a vertical axis.

The rough linear drive mechanism 501 extends in a horizontal direction and moves the rough drive mechanism base 503 on a straight line.

The rough circumferential drive mechanism 500 rotates the rough linear drive mechanism 501 around the vertical axis in the center of the segmented primary mirror 33, which corresponds to an intersection between two one-dot chain lines in FIG. 2A.

The fine drive mechanism 7 includes a plurality of joint portions connected between the rough drive mechanism base 503 and a gripping mechanism base 600 included in the gripping mechanism 6. Each of the joint portions is movable around a rotary axis which is parallel or orthogonal to an adjacent joint portion or the base and to the joint portion.

The gripping mechanism 6 includes the gripping mechanism base 600, a grip rotationally opening and closing mechanism 601, and the gripping claw portions 602.

The gripping mechanism base 600 is fixed to the joint portion provided at a lower end of the fine drive mechanism 7.

The grip rotationally opening and closing mechanism 601 moves the gripping claw portions 602 respectively around rotary axes at both ends of the gripping mechanism base 600, which extend in a horizontal direction perpendicular to the paper surface, so as to open and close the gripping claw portions 602 under a state illustrated in FIG. 1.

The gripping claw portions 602 grip the segment mirror 3.

Each of the lift mechanism 4, the rough circumferential drive mechanism 500, the rough linear driving mechanism 501, and the rough rotational drive mechanism 502 included in the rough drive mechanism 5, the grip rotationally opening and closing mechanism 601 included in the gripping mechanism 6, and the joint portions of the fine drive mechanism 7 each include a driver (not shown) having a stepper motor or other motor to move a target to be driven and a state detector (not shown) including an angle sensor to detect an angular position around a drive rotary axis of the corresponding target to be driven, a position sensor to detect directly a coordinate position on an axis in a driving direction, or the like.

Gripping claw portion relative sensors 111 and lift insertion portion relative sensors 112, each having a computing function, are mounted to the gripping mechanism 6. The gripping claw portion relative sensors 111 measure a relative position and a relative posture between the gripping claw portions 602 and the mirror gripped portion 301 of the segment mirror 3. The lift insertion portion relative sensors 112 measure a relative position and a relative posture between the lift insertion portion 302 of the segment mirror 3 and the lift mechanism 4.

Further, a bend measuring instrument 110 to measure an inclination in an inertial space is mounted to the rough drive mechanism base 503.

The term "position" refers a position on a selected axis or a position on XYZ coordinates with the vertical direction as a Z axis. The term "posture" refers an angle around the selected axis or an angle around each axis on the XYZ coordinates.

The rough drive mechanism 5 changes the above-mentioned "position" of each of the gripping mechanism 6 and the fine drive mechanism 7, and in addition, can also change directions of the rough drive mechanism 5 around the Z axis with the rough rotational drive mechanism 502.

Further, the lift insertion portion relative sensors 112 compose a first detector, the gripping claw portion relative sensors 111 compose a second detector, and the bend measuring instrument 110 composes a third detector.

Figure 38:
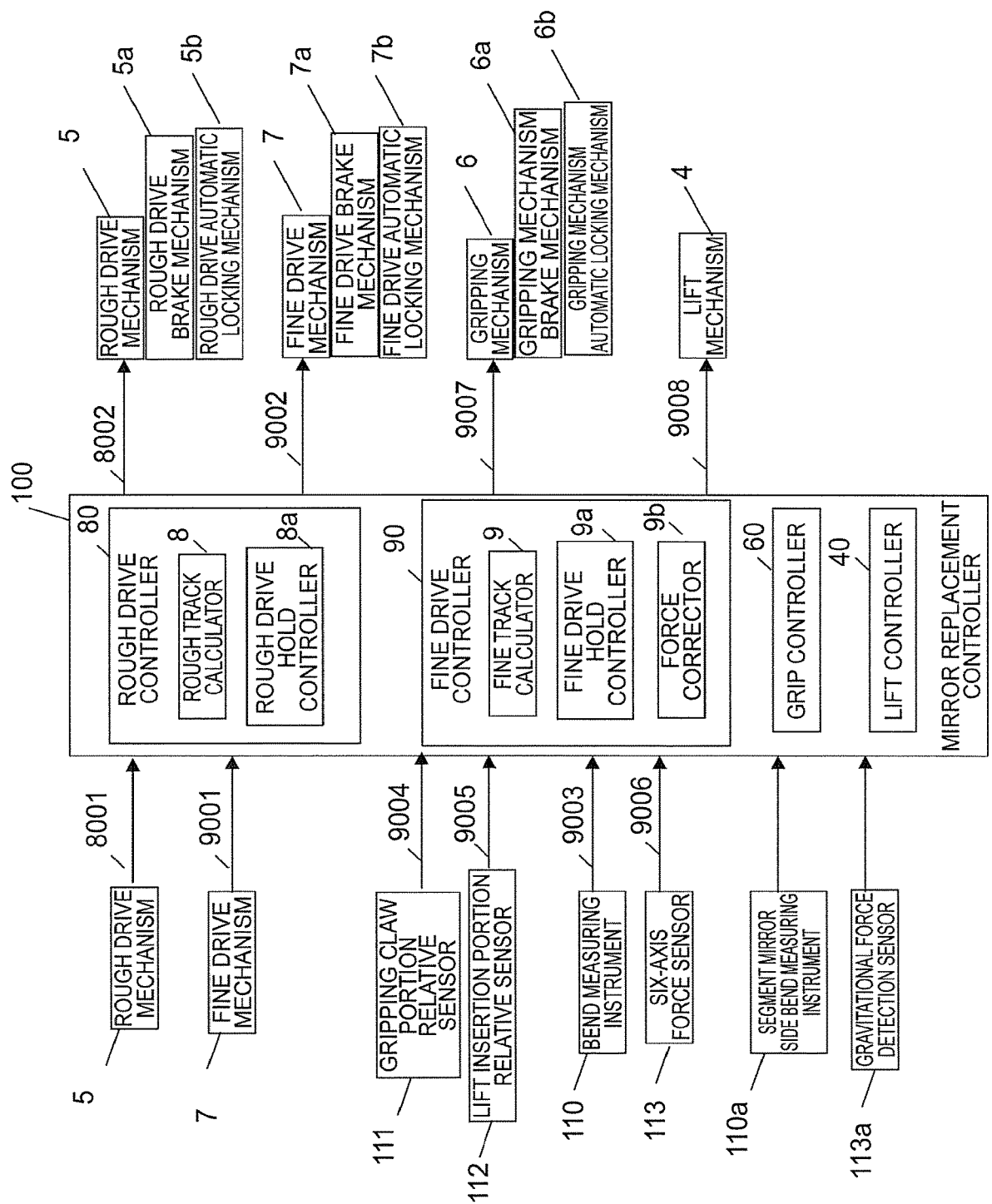
FIG. 38 is a diagram for illustrating an example of a configuration of a control system of the mirror replacement device for a segmented mirror telescope according to the present disclosure.
Figure 39:
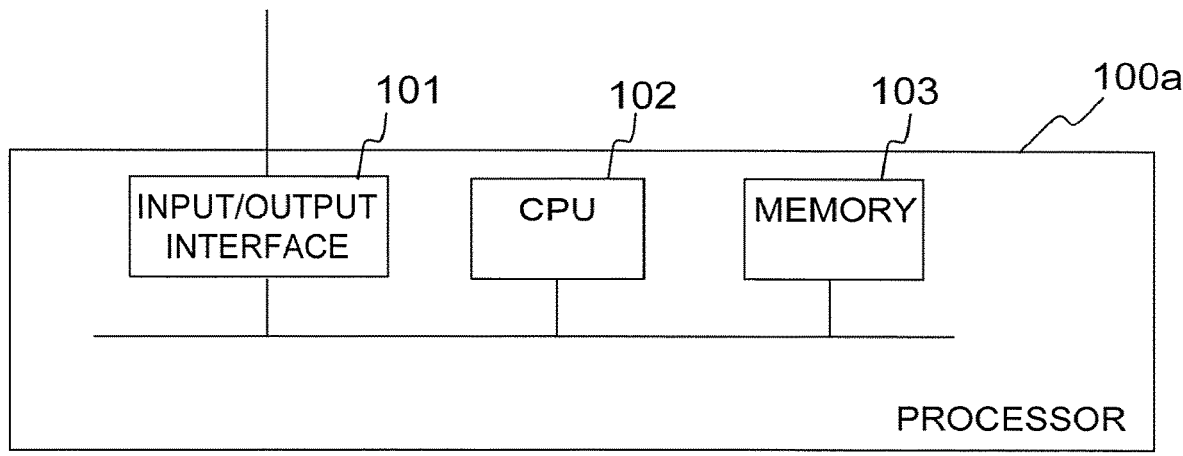
FIG. 39 is a diagram for schematically illustrating a configuration of a mirror replacement controller illustrated in FIG. 38.

FIG. 38 is an illustration of a configuration of a control system of the mirror replacement device for a segmented mirror telescope according to the present disclosure. The mirror replacement controller 100 is composed of, for example, as illustrated in FIG. 39, a processor 100a including a CPU 102, a memory 103, and an input/output interface 101. In the memory 103, programs for processing functions indicated as blocks in FIG. 38 are stored together with data to be used in the processing. Each of the programs is executed by the CPU 102. Each of a rough track calculator 8 and a fine track calculator 9 in FIG. 1 and other drawings is illustrated only a part which particularly relates to the present disclosure.

The mirror replacement controller 100 includes a rough drive controller 80, a fine drive controller 90, a grip controller 60, and a lift controller 40. The rough drive controller 80 includes the rough track calculator 8 and a rough drive hold controller 8a. The fine drive controller 90 includes the fine track calculator 9, a fine drive hold controller 9a, and a force corrector 9b.

As illustrated in FIG. 2B, a direction of a perpendicular axis is the same as a direction of gravitational force, specifically, the vertical direction for the segment mirror 3 provided in a central region of the segmented primary mirror 33. In a direction toward an outer periphery of the segmented primary mirror 33, the direction of the perpendicular axis of the segment mirror 3 is inclined inward with respect to the vertical direction, and the inclination is gradually increased.

FIG. 3 to FIG. 7 are views for illustrating an example of an operation flow of mounting the segment mirror 3 provided in the vicinity of the center, specifically, in the central region of the segmented primary mirror 33, to the lift mechanism 4 included in the mirror replacement device according to the first embodiment of the present disclosure.

Figure 3:
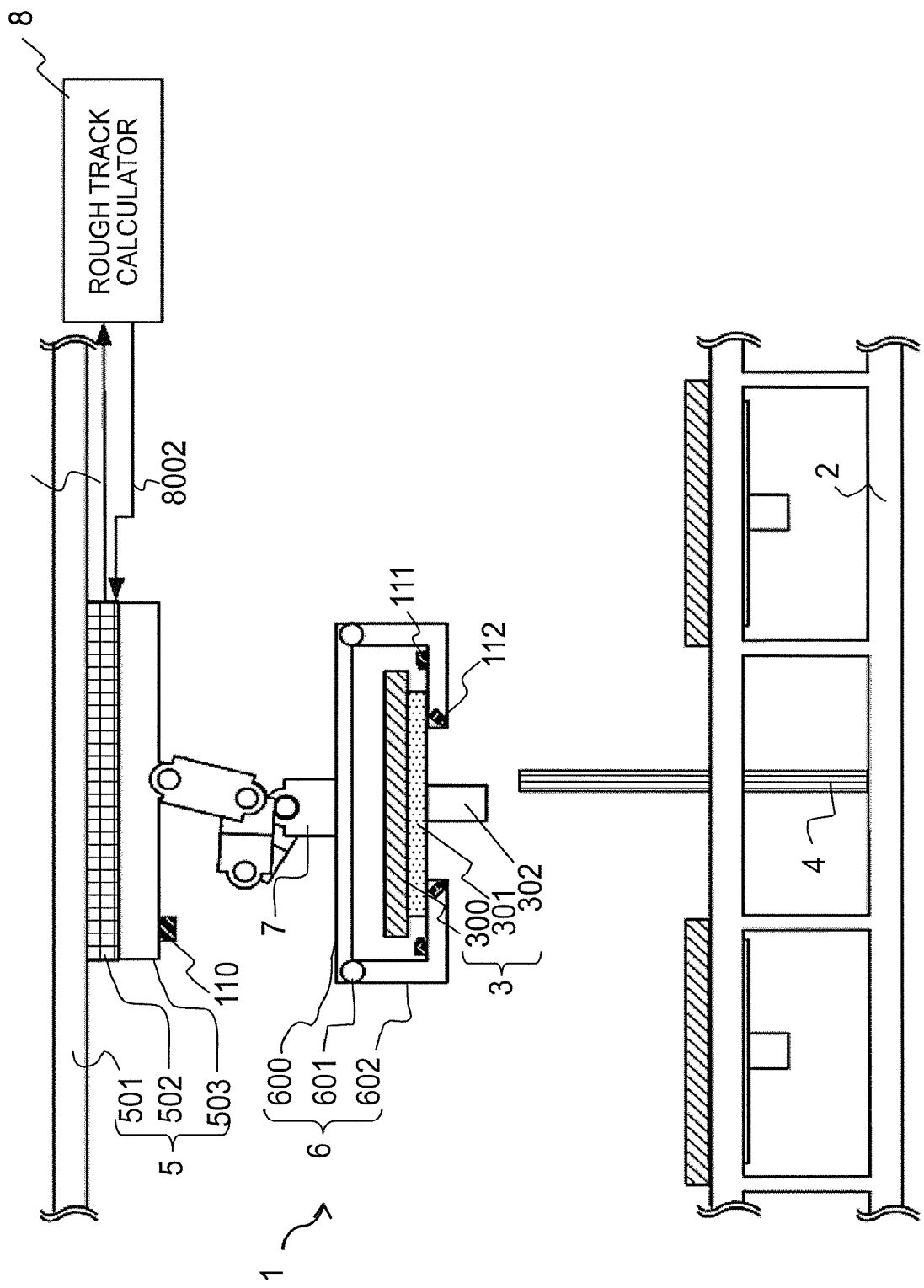
FIG. 3 is a view for illustrating an operation of mounting a segment mirror provided in a central region of a segmented primary mirror to a lift mechanism of the mirror replacement device according to the first embodiment of the present disclosure.

In an initial position illustrated in FIG. 3, the rough track calculator 8 included in the rough drive controller 80 receives a rough drive sensor signal 8001 output from the rough drive mechanism 5. The rough track calculator 8 included in the rough drive controller 80 constitutes the mirror replacement controller 100 as illustrated in FIG. 38. The rough drive sensor signal 8001 is a feedback signal indicating a position and a posture of the rough drive mechanism base 503 in a plane. The rough drive sensor signal 8001 includes, for example, a rotational position of the rough linear drive mechanism 501 driven by the rough circumferential drive mechanism 500, a position of the rough drive mechanism base 503 driven by the rough linear drive mechanism 501 on an axis of movement of the rough linear drive mechanism 501, and a rotational position of the rough drive mechanism base 503 driven by the rough rotational drive mechanism 502. Then, a rough drive command signal 8002 is output in accordance with a difference with the position of the segment mirror 3 to be maintained, pre-recorded in the memory 103, to move the rough drive mechanism base 503 included in the rough drive mechanism 5, which supports the fine drive mechanism 7 and the gripping mechanism 6, to a position of the target segment mirror 3 to be maintained. At this time, when the rough drive mechanism 5 is long and large, there exists a limitation for positional control accuracy, and an error remains.

Figure 4:
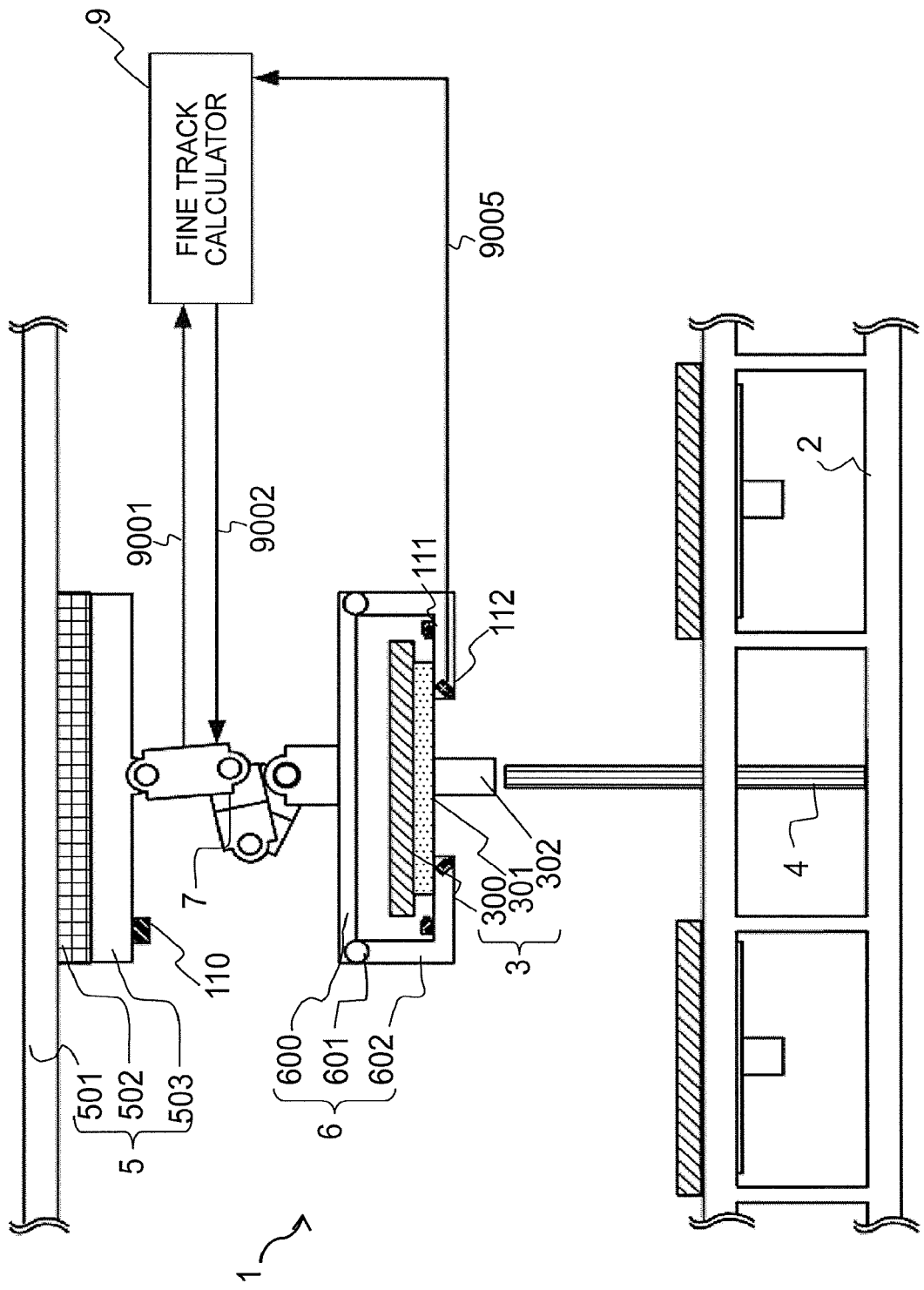
FIG. 4 is a view for illustrating the operation of mounting the segment mirror provided in the central region of the segmented primary mirror to the lift mechanism of the mirror replacement device according to the first embodiment of the present disclosure.

In FIG. 4, a lift insertion portion relative sensor signal 9005 is obtained by measuring a relative positional error and a relative posture error between the lift insertion portion 302 and the lift mechanism 4 by the lift insertion portion relative sensors 112. The lift insertion portion relative sensor signal 9005 is input to the fine track calculator 9 included in the fine drive controller 90. Further, a fine drive sensor signal 9001 is input to the fine track calculator 9. The fine drive sensor signal 9001 includes joint signals of the fine drive mechanism 7. The joint signals identify the position and a posture of the segment mirror 3 gripped by the gripping mechanism 6. The fine drive sensor signal 9001 is a feedback signal indicating a position and a posture of the gripping mechanism 6, which determines the position and the posture of the segment mirror 3. A fine drive command signal 9002 is output from the fine track calculator 9 to the fine drive mechanism 7 so as to correct the relative positional error and the relative posture error using the fine drive sensor signal 9001 and the lift insertion portion relative sensor signal 9005.

Figure 5:
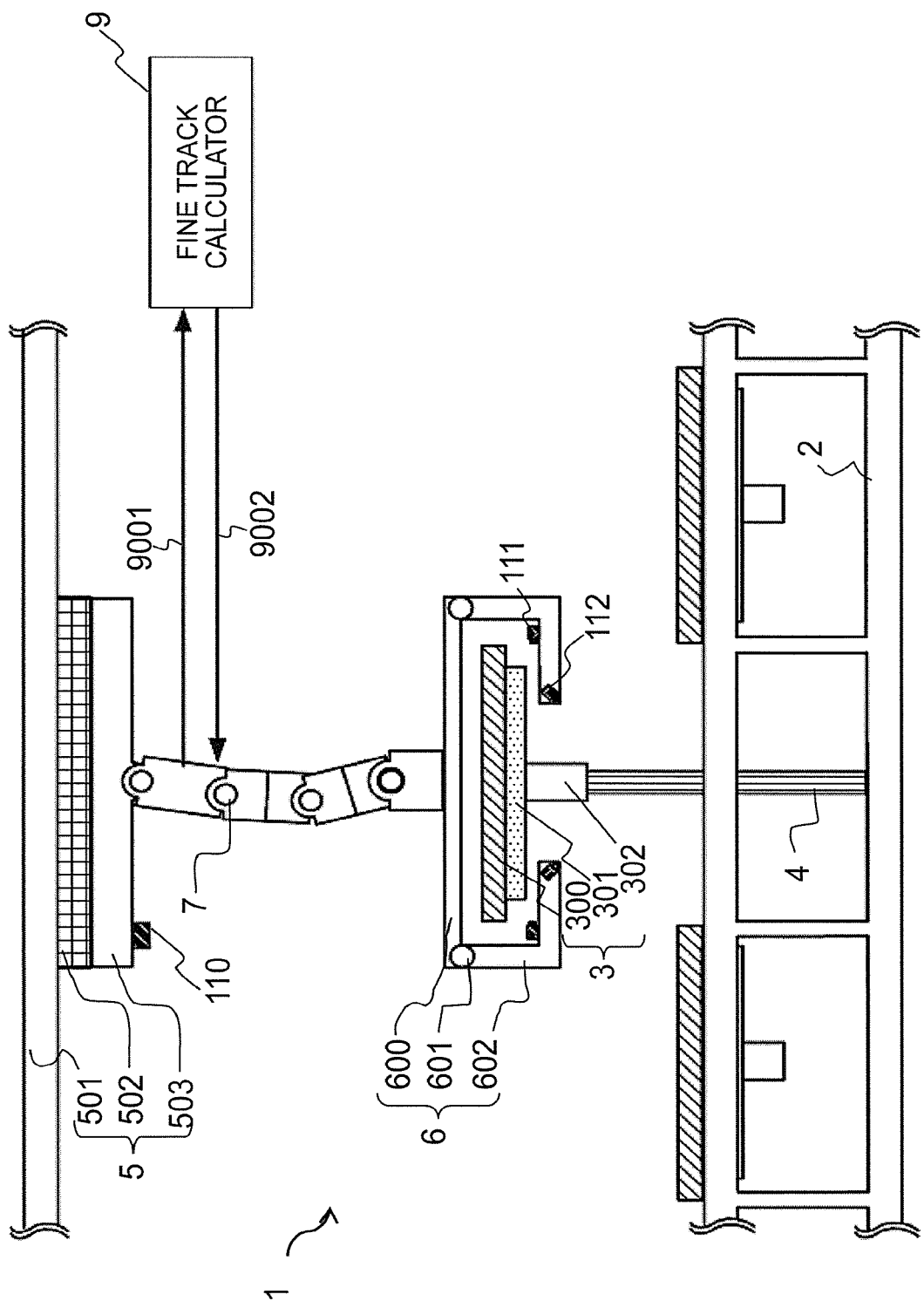
FIG. 5 is a view for illustrating the operation of mounting the segment mirror provided in the central region of the segmented primary mirror to the lift mechanism of the mirror replacement device according to the first embodiment of the present disclosure.

Thereafter, the fine drive mechanism 7 is driven based on the fine drive command signal 9002 and the segment mirror 3 is moved down in a direction toward the lift mechanism 4 so that a distal end of the lift mechanism 4 is inserted into the lift insertion portion 302 of the segment mirror 3. As a result, the segment mirror 3 is mounted to the lift mechanism 4 as illustrated in FIG. 5. In this stage, a load of the segment mirror 3 is transferred to the lift mechanism 4, and the gripping claw portions 602 separates from the mirror gripped portion 301.

Figure 6:
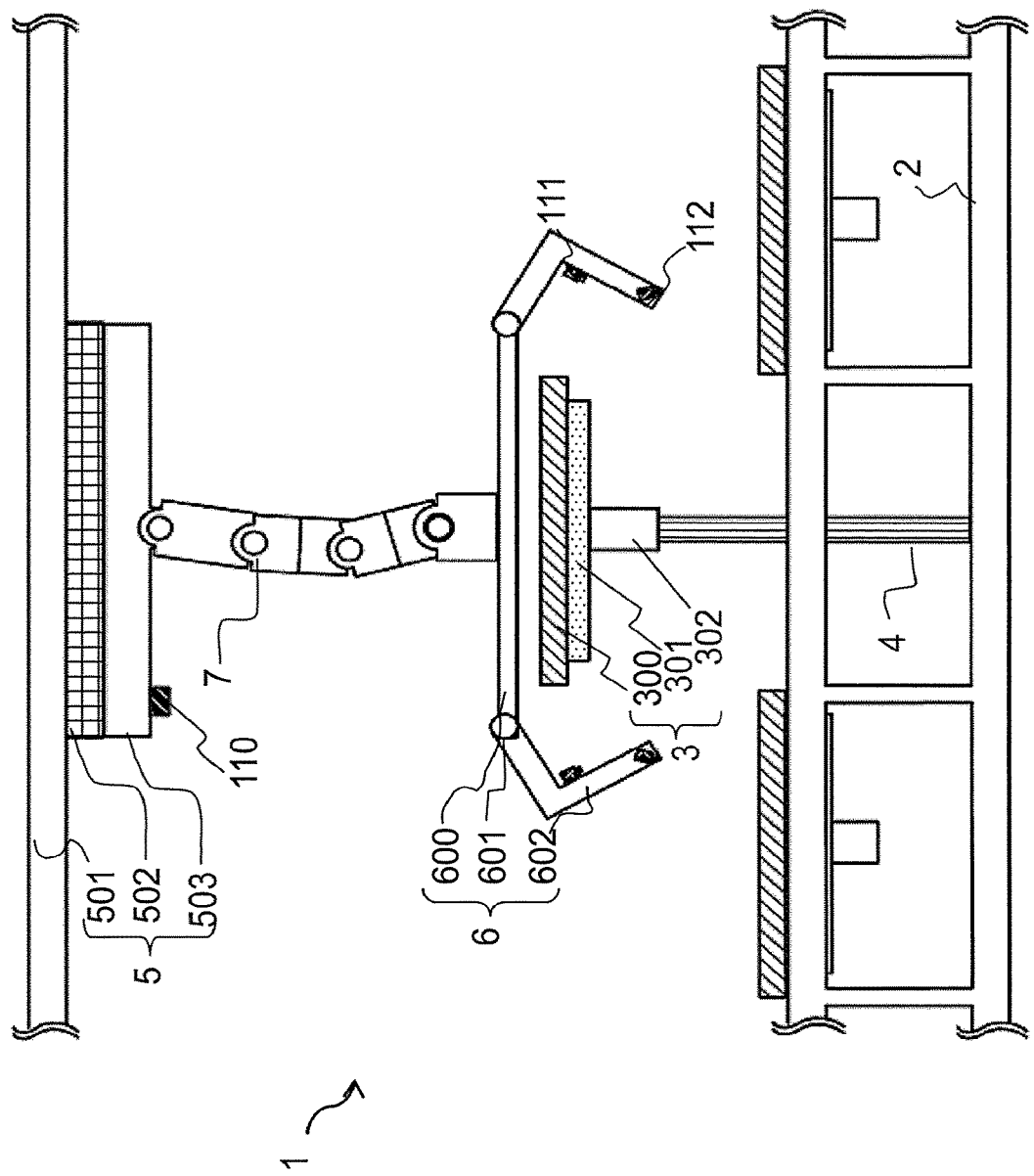
FIG. 6 is a view for illustrating the operation of mounting the segment mirror provided in the central region of the segmented primary mirror to the lift mechanism of the mirror replacement device according to the first embodiment of the present disclosure.
Figure 7:
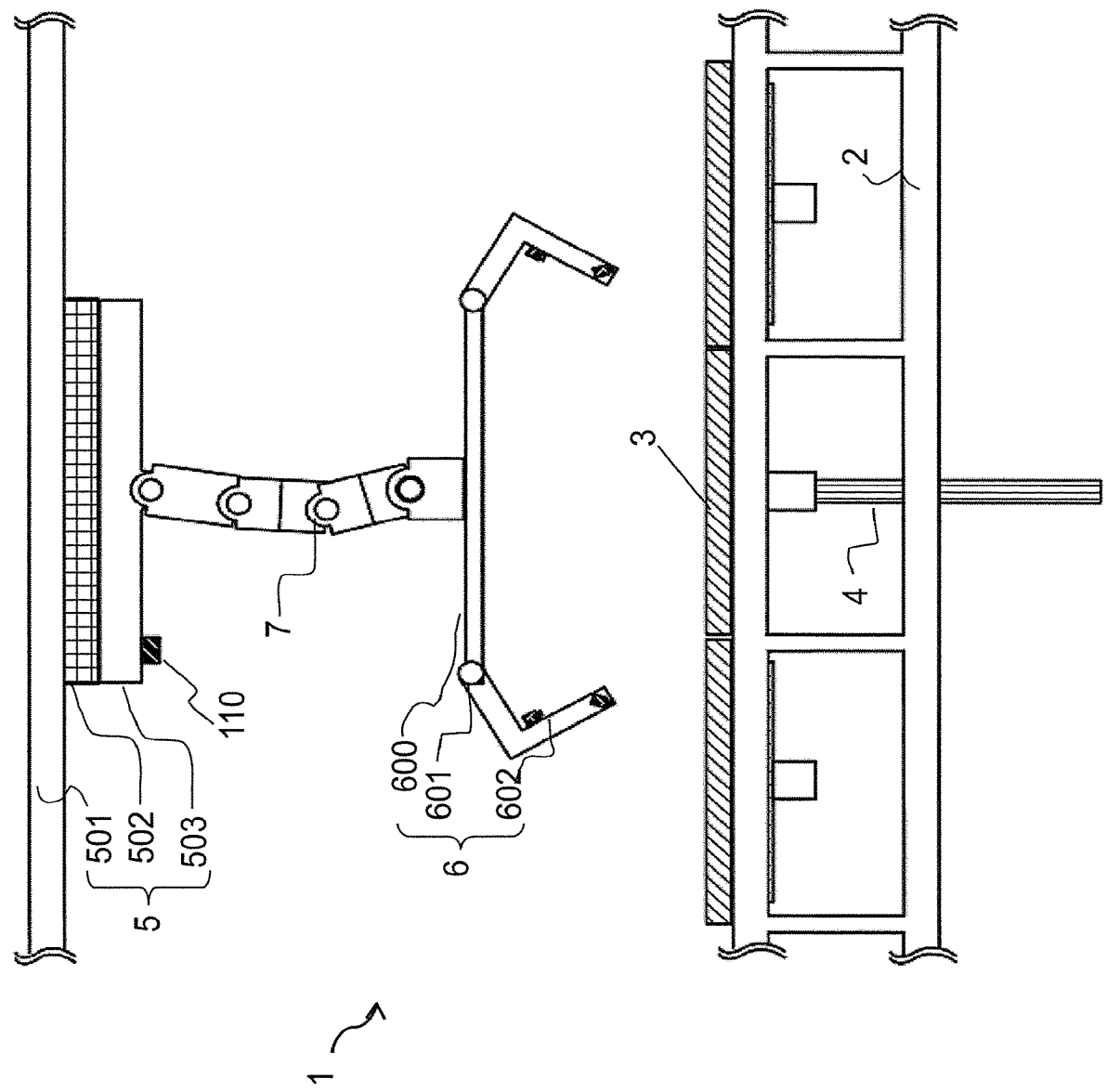
FIG. 7 is a view for illustrating the operation of mounting the segment mirror provided in the central region of the segmented primary mirror to the lift mechanism of the mirror replacement device according to the first embodiment of the present disclosure.

After the grip rotationally opening and closing mechanism 601 is driven to open the gripping claw portions 602 as illustrated in FIG. 6 based on a gripping claw portion drive command signal 9007 output from the grip controller 60 illustrated in FIG. 38, the lift mechanism 4 is moved down as illustrated in FIG. 7 based on a lift mechanism drive command signal 9008 output from the lift controller 40 illustrated in FIG. 38. As a result, the segment mirror 3 is placed at a predetermined position in the segmented mirror telescope main body 2.

Figure 8:
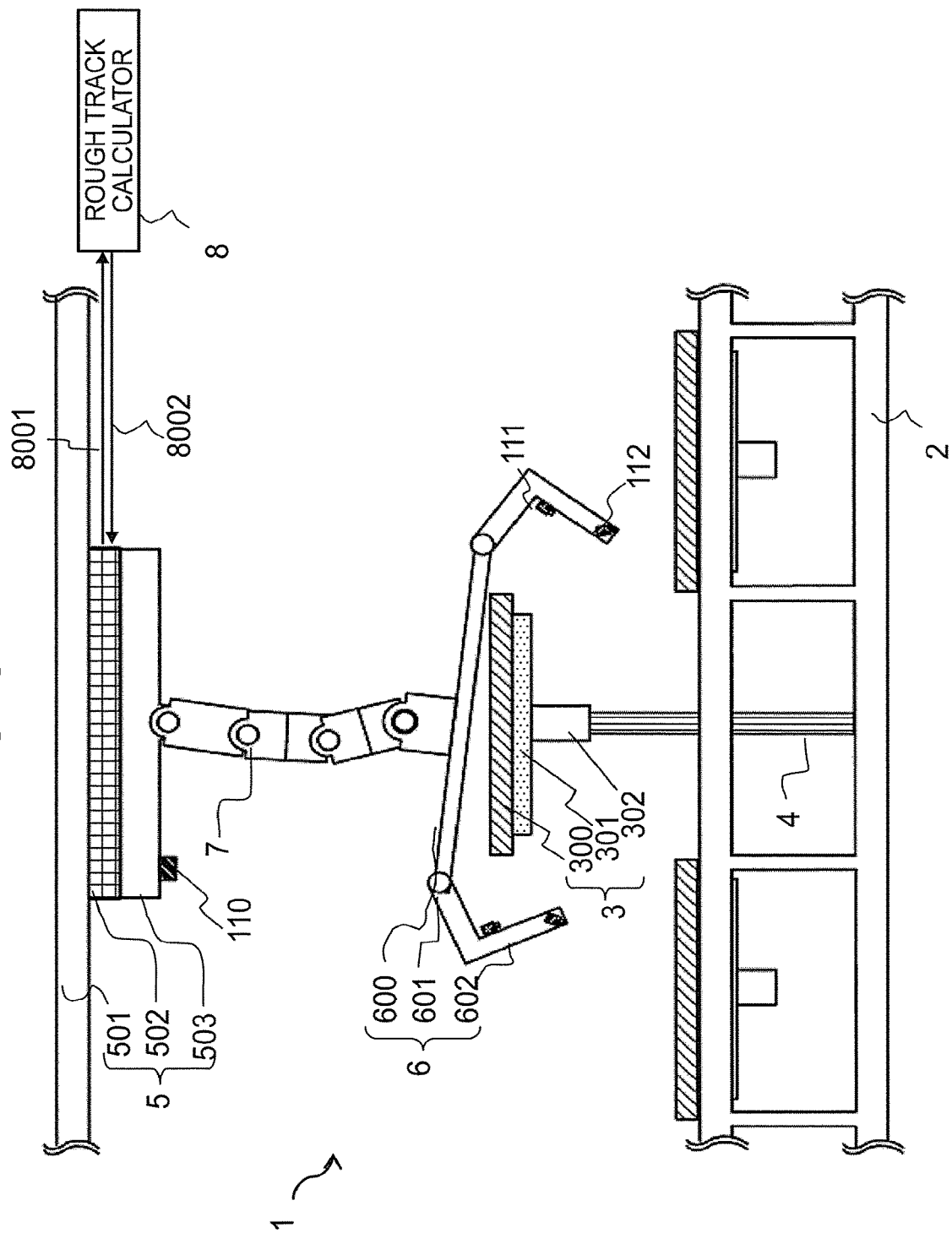
FIG. 8 is a view for illustrating an operation of removing the segment mirror provided in the central region of the segmented primary mirror from the lift mechanism of the mirror replacement device according to the first embodiment of the present disclosure.
Figure 9:
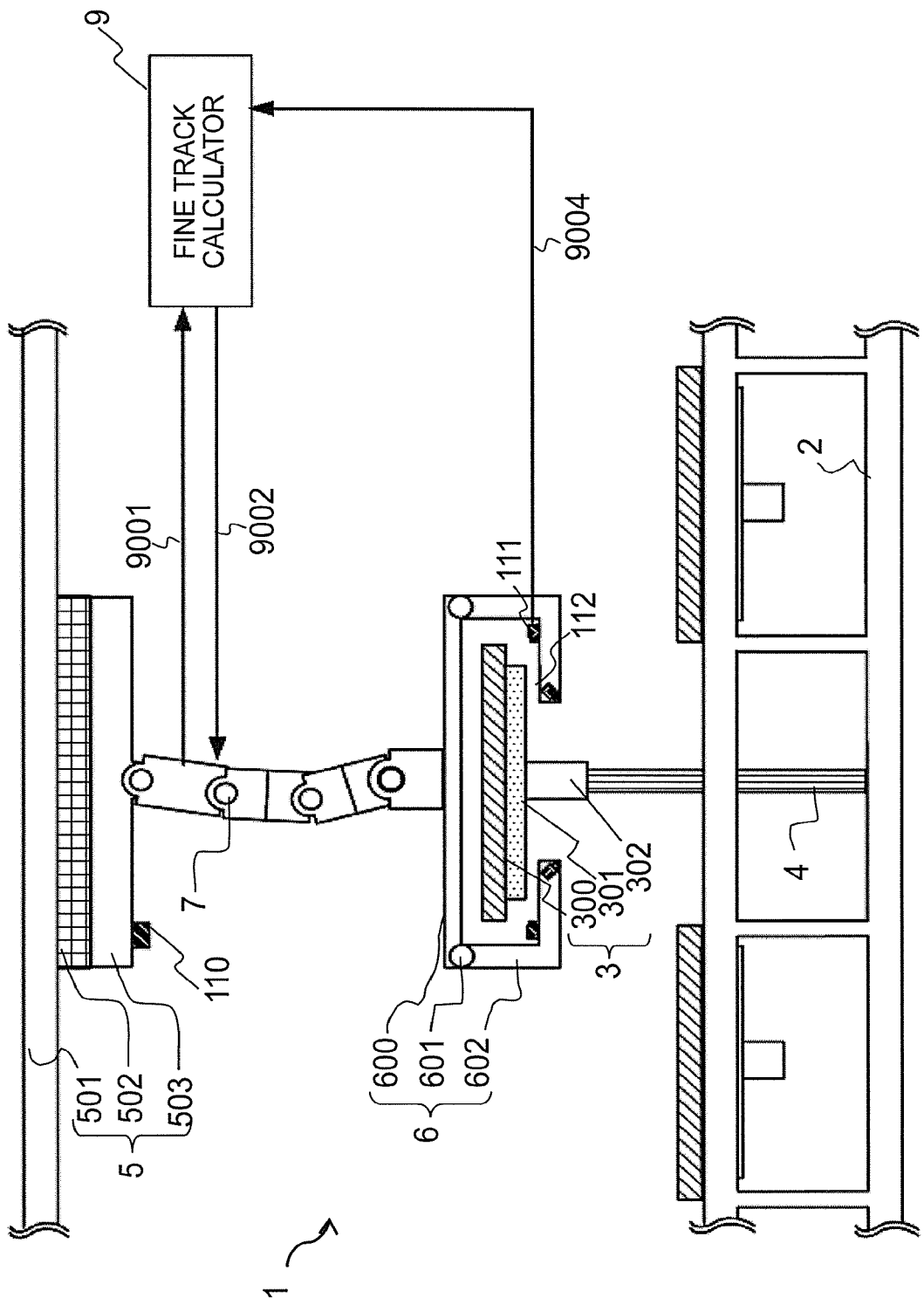
FIG. 9 is a view for illustrating the operation of removing the segment mirror provided in the central region of the segmented primary mirror from the lift mechanism of the mirror replacement device according to the first embodiment of the present disclosure.
Figure 10:
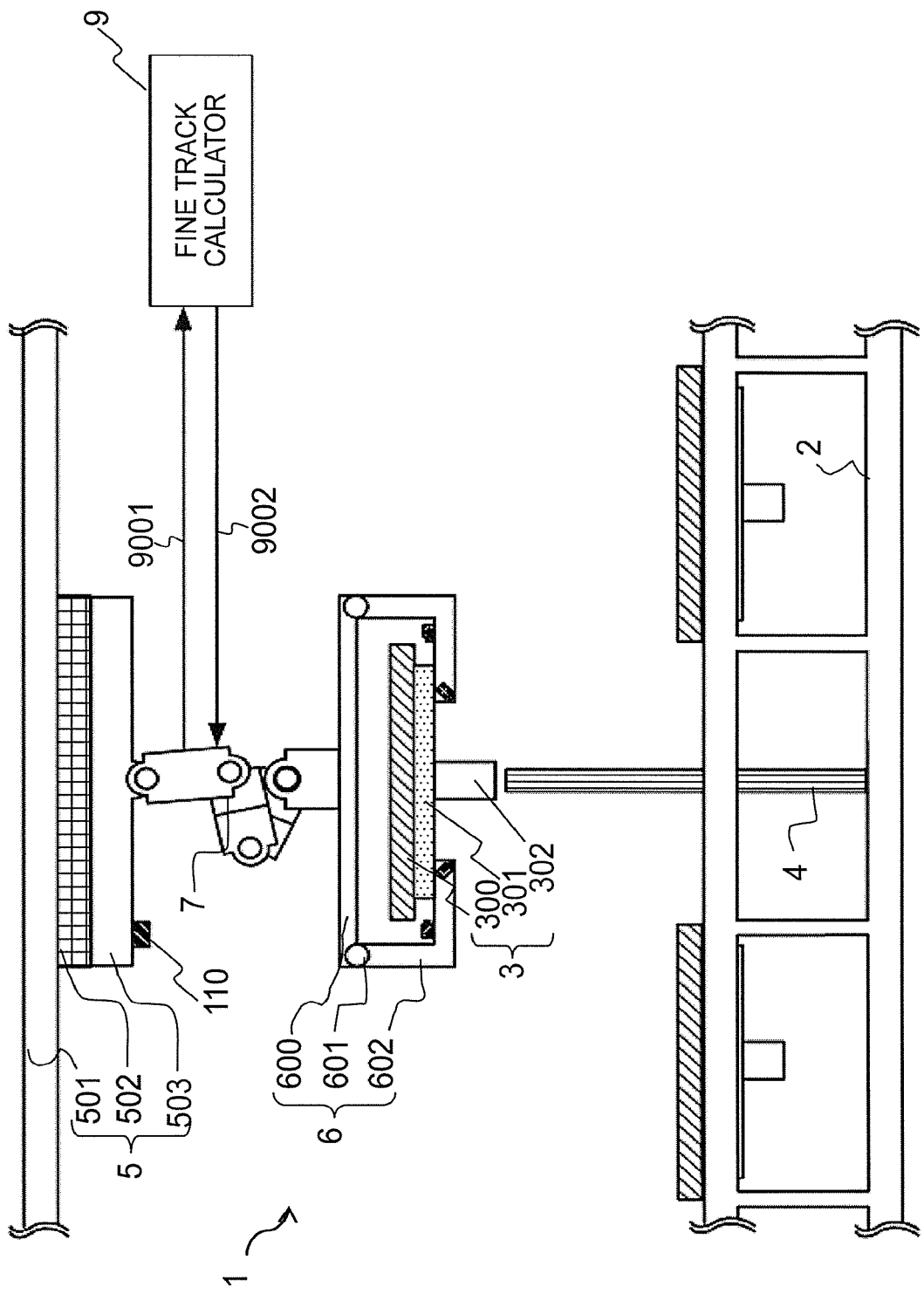
FIG. 10 is a view for illustrating the operation of removing the segment mirror provided in the central region of the segmented primary mirror from the lift mechanism of the mirror replacement device according to the first embodiment of the present disclosure.

FIG. 8 to FIG. 10 are views for illustrating an example of an operation flow of removing the segment mirror 3 provided in the vicinity of the center, specifically, in the central region of the segmented primary mirror 33 from the lift mechanism 4 included in the mirror replacement device according to the first embodiment of the present disclosure.

In an initial position illustrated in FIG. 8, the rough track calculator 8 receives the rough drive sensor signal 8001 output from the rough drive mechanism 5 and outputs the rough drive command signal 8002 based on a difference with the position of the segment mirror 3 to be maintained, pre-recorded in the memory 103. The rough drive mechanism base 503 included in the rough drive mechanism 5, which supports the fine drive mechanism 7 and the gripping mechanism 6, is moved to a position of the target segment mirror 3 to be maintained. Further, based on the lift mechanism drive command signal 9008 output from the lift controller 40, the lift mechanism 4 moves the segment mirror 3 up to a predetermined position. At this time, when the rough drive mechanism 5 is long and large, there exists a limitation for the positional control accuracy, and an error remains. FIG. 8 is an illustration of an assumed case in which the gripping mechanism 6 is inclined and an error remains when the rough drive mechanism 5 is moved under only the control of the rough track calculator 8.

Based on the gripping claw portion drive command signal 9007 output from the grip controller 60, the grip rotationally opening and closing mechanism 601 is driven to close the gripping claw portions 602. At the same time, a gripping claw portion relative sensor signal 9004 is obtained by measuring the relative positional error and the relative posture error between the segment mirror 3 and the gripping mechanism 6 by the gripping claw portion relative sensors 111, and is input to the fine track calculator 9. Further, the fine drive sensor signal 9001 is input to the fine track calculator 9. The fine drive sensor signal 9001 includes joint signals of the fine drive mechanism 7 which identify the positions and the postures of the gripping claw portions 602 each being an end of the gripping mechanism 6. The fine drive command signal 9002 is output from the fine track calculator 9 to the fine drive mechanism 7 so as to correct the relative positional error and the relative posture error based on the fine drive sensor signal 9001 and the gripping claw portion relative sensor signal 9004. As a result, the gripping claw portions 602 and the mirror gripped portion 301 are brought into a state illustrated in FIG. 9, which is a state in which the gripping claw portions 602 and the mirror gripped portion 301 are horizontal and face each other in parallel. The fine drive mechanism 7 is driven based on the fine drive command signal 9002 output from the fine track calculator 9 and raises the gripping mechanism 6 above the lift mechanism 4 so as to remove the segment mirror 3 from the lift mechanism 4 as illustrated in FIG. 10. In a stage during the removal, a load of the segment mirror 3 is transferred from the lift mechanism 4 to the gripping mechanism 6.

Further, in the present disclosure, the rough drive mechanism 5 may be a holder to hold the fine drive mechanism 7. The holder can move the fine drive mechanism 7 as the rough drive mechanism 5 does or may simply fix and hold the fine drive mechanism 7.

Figure 43:
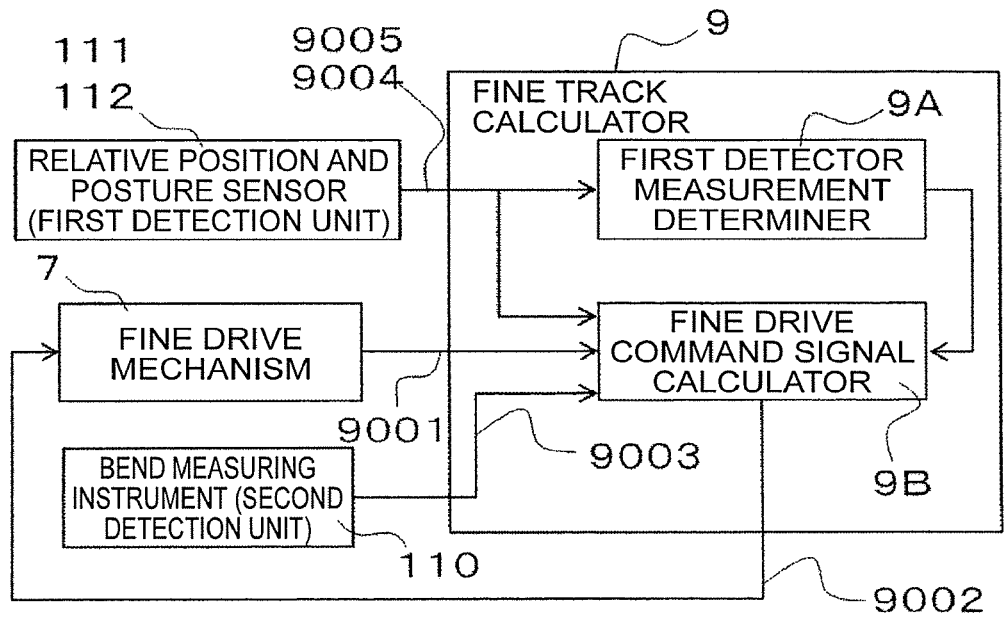
FIG. 43 is a diagram for illustrating a hardware configuration of the fine track calculator using the relative position and posture sensor and the bend measuring instrument in the present disclosure.

In FIG. 43, a configuration of the fine track calculator 9 according to the first embodiment is illustrated. The fine track calculator 9 is a part of the mirror replacement controller 100 and receives outputs from the first detector, the second detector, and the fine drive mechanism 7. The fine track calculator 9 outputs the fine drive command signal 9002 to the fine drive mechanism 7.

The first detector detects a relative position and a relative posture between a comparison object and a target object with which the comparison object is brought into contact. The comparison object is the gripping claw portions 602 included in the gripping mechanism 6 or the segment mirror 3 gripped by the gripping claw portions 602. Specifically, the comparison object can be the gripping claw portions 602 included in the gripping mechanism 6 and the target object can be the segment mirror 3 to be gripped, or the comparison object can be the segment mirror 3 to be gripped by the gripping mechanism and the target object can be the lift mechanism 4.

More specifically, the first detector is the gripping claw portion relative sensors 111, the lift insertion portion relative sensors 112, or both the gripping claw portion relative sensors 111 and the lift insertion portion relative sensors 112. The gripping claw portion relative sensors 111 are a relative position and posture sensor to measure the relative position and the relative posture between the gripping claw portions 602 and the mirror gripped portion 301 of the segment mirror 3. The lift insertion portion relative sensors 112 are a relative position and posture sensor to measure the relative position and the relative posture between the lift insertion portion 302 of the segment mirror 3 and the lift mechanism 4.

The first detector outputs the gripping claw portion relative sensor signal 9004 output from the gripping claw portion relative sensors 111 and the lift insertion portion relative sensor signal 9005 output from the lift insertion portion relative sensors 112 to the fine track calculator 9.

The second detector is the bend measuring instrument 110 to detect a bend of the holder or a bend of the fine drive mechanism 7 which includes the bend of the holder. The bend measuring instrument 110 may detect a bend of the fine drive mechanism 7. The holder is a concept including the rough drive mechanism 5 because the rough drive mechanism 5 holds the fine drive mechanism 7. The holder holds the fine drive mechanism 7 above the segmented mirror telescope 1*a* so as to replace the mirror of the segmented mirror telescope 1*a*. Therefore, the holder may be long in some cases. As a result, a weight of the fine drive mechanism 7 and the gripping mechanism 6 itself provided at a lower portion of the fine drive mechanism 7 is applied to the holder, and in addition, a weight of the segment mirror 3 is applied to the holder when the segment mirror 3 is gripped. Then, the holder is bent because of the weights described above. Therefore, the bend is detected by the bend measuring instrument 110. Further, when the fine drive mechanism 7 has an arm having a joint or in other cases, a bend occurs in the fine drive mechanism 7 itself. The bend measuring instrument 110 may measure the bend including the bend of the fine drive mechanism 7 itself and the bend of the holder. Using this method, positioning with higher accuracy can be achieved.

Here, the measurement by the bend measuring instrument 110 can be performed, for example, in a following way. A deformation gauge attached to a portion to be bent and having a resistance value changing in proportion to deformation to measure partial deformation and obtains the bend being a displacement of a predetermined portion from the partial deformation. In the present disclosure, the bend measuring instrument 110 obtains the bend (displacement) in a connected portion of the fine drive mechanism 7 with the gripping mechanism 6.

The fine drive mechanism 7 outputs the fine drive sensor signal 9001 including joint signals of the fine drive mechanism 7. The output signal is input to the fine track calculator 9.

The fine track calculator 9 includes a first detector measurement determiner 9A and a fine drive command signal calculator 9B. The first detector measurement determiner 9A determines whether or not the first detector can perform a detection. The fine drive command signal calculator 9B calculates a command signal for the fine drive mechanism from the signals output from the first detector and the fine drive mechanism 7 and the signal 9003 output from the bend measuring instrument 110 being the second detector and outputs the fine drive command signal 9002 to the fine drive mechanism 7.

The first detector measurement determiner 9A determines whether or not the first detector can identify the comparison object and the target object based on the signal output from the first detector and can measure the relative position and the relative posture therebetween. For example, the first detector may be composed of a digital camera or other devices and may recognize the comparison object and the target object in a captured image through image processing so as to detect the relative position and the relative posture therebetween. In this case, unless the comparison object and the target object appear identifiably in the image captured by the digital camera, the comparison object and the target object cannot be recognized. For example, when the gripping mechanism 6 grips the segment mirror 3, in some cases, a field of view of the digital camera provided in the gripping mechanism 6 is interrupted by the segment mirror 3 and the lift mechanism 4 being the target object does not appear in the image. In this case, the lift mechanism 4 being the target object cannot be recognized. Thus, the first detector measurement determiner 9A determines that the detection is impossible (cannot be performed).

Further, the first detector measurement determiner 9A may determine that the detection is possible when the target to be measured exists within a measurement range of the first detector (111, 112) and that the detection is impossible when the target to be measured does not exist within the measurement range of the first detector (111, 112).

Further, the first detector measurement determiner 9A may determine that the detection is possible when the first detector (111, 112) itself is stopped and that the detection is impossible when the first detector (111, 112) itself is moving.

Further, the first detector measurement determiner 9A may switch the relative position and posture sensor being the target subjected to determination of whether or not the relative position and posture sensor can detect the relative position and posture by using information, obtained with contact sensors provided at the gripping claw portions 602 or other sensors, indicating whether or not the segment mirror 3 is gripped. For example, when the information of whether or not the segment mirror 3 is gripped indicates that the segment mirror 3 is not gripped, the determination may be made for the lift insertion portion relative sensors 112 which detect the relative position and the relative posture between the lift insertion portion 302 of the segment mirror 3 and the lift mechanism 4. When the information of whether or not the segment mirror 3 is gripped indicates that the segment mirror 3 is gripped, the determination may be made for the gripping claw portion relative sensors 111 which measures the relative position and the relative posture between the gripping claw portions 602 and the mirror gripped portion 301 of the segment mirror 3.

Further, the first detector measurement determiner 9A may switch the relative position and posture sensor being the determination target depending on whether a control mode of the mirror replacement controller 100 is for mounting or for removal. For example, for mounting, the determination may be made for the lift insertion portion relative sensors 112. For removal, the determination may be made for the gripping claw portion relative sensors 111.

The first detector measurement determiner 9A outputs whether or not the relative position and posture sensor being the first detector and being the determination target can successfully perform a measurement.

The fine drive command signal calculator 9B calculates the command signal for the fine drive mechanism from the signals output from the first detector and the fine drive mechanism 7 and the signal 9003 output from the bend measuring instrument 110 being the second detector to output the fine drive command signal 9002 to the fine drive mechanism 7.

When the first detector measurement determiner 9A determines that the detection is possible, the fine drive command signal calculator 9B controls the gripping mechanism 6, the fine drive mechanism 7, and the lift mechanism 4 based on the detection signal output from the first detector. Further, the first detector measurement determiner 9A determines that the detection is impossible, the fine drive command signal calculator 9B controls and drives the gripping mechanism 6, the fine drive mechanism 7, and the lift mechanism 4 based on the detection signal output from the second detector.

The fine drive command signal calculator 9B computes a target track representing a track of a position and a posture of the gripping mechanism 6 from a current position and a current posture of the gripping mechanism 6 to a target position and a target posture at which the comparison object comes into contact with the target object. The fine drive command signal calculator 9B stores the target track in a storage (memory 103). Here, the target track expresses a time-series change in position and posture of the gripping mechanism 6. For example, the target track can be expressed by a plurality of sets in time series of a three-dimensional position of a representative point of the gripping mechanism 6 and a unit vector extending from the representative point. Each of the sets of three-dimensional position of the representative point and the unit vector extending from the representative point expresses a position and a posture of the gripping mechanism 6 at a certain point of time.

When the first detector measurement determiner 9A being the determiner determines that the detection is possible, the fine drive command signal calculator 9B obtains a correction amount for correcting the target track stored in the storage (memory 103) based on the detection signal output from the first detector which can perform the measurement, obtains a new target track corrected with the correction amount, and stores the newly obtained target track in place of the target track already stored in the storage (memory 103). Here, when the first detector can perform the measurement, in some cases, the relative position and the relative position between the comparison object and the target object actually measured by the first detector are different from the relative posture and the relative position that are originally expected at the current position in the target track. When the actually measured relative position and relative posture are different from the expected measured ones, a difference therebetween is obtained as the correction amount. When the above-mentioned holder has the bend or the fine drive mechanism has the bend including the bend of the holder, the difference including the bend is obtained as the correction amount.

When the first detector measurement determiner 9A being the determiner determines that the detection is impossible, the fine drive command signal calculator 9B obtains a correction amount for correcting the target track stored in the storage (memory 103) based on the signal 9003 from the second detector (bend measuring instrument 110). For example, when the signal 9003 output from the bend measuring instrument 110 indicates a vertically downward bend amount, the correction amount is a vertically upward bend amount. Using this method, even when the first detector cannot obtain the relative position and the relative posture between the comparison object and the target object, the bend of the holder or the bend of the holder and the bend of the fine track mechanism is detected by the second detector. Thus, the bend amount can be corrected. In this case, a value of the corrected target track is not stored in the storage (memory 103). When a next calculation for correction is performed, a value of the target track stored in the storage (memory 103) is used.

Further, when the first detector measurement detector 9A changes its determination from "detection possible" to "detection impossible", the signal output from the second detector (bend measuring instrument 110) at this time is stored in the storage (memory 103). Immediately after the result of determination changes from "detection possible" to "detection impossible", the correction is not performed. Subsequently, a difference between the stored signal output from the second detector (bend measuring instrument 110) and the latest signal output from the second detector (bend measuring instrument 110) can be used as the correction amount.

Further, as another method, the value of the corrected target track may be stored in the storage (memory 103) so that a value obtained by correcting the target track using a difference between the previous signal output from the second detector (bend measuring instrument 110) and the latest signal output from the second detector (bend measuring instrument 110) as the correction amount is stored in the storage (memory 103).

In the above, it is described about obtaining the target track and correcting the target track. However, a command signal for driving the fine drive mechanism 7 may be obtained so that the gripping mechanism 6 is moved from the current position and the current posture to the target position and the target posture with which the comparison object comes into contact with the target object and the command signal may be corrected with the same method as that described above.

The fine drive command signal calculator 9B controls and drives the fine drive mechanism 7 based on the target track corrected with the correction amount.

Further, the fine drive command signal calculator 9B may control and drive the fine drive mechanism 7 after correcting the command signal for driving the fine drive mechanism 7. In this case, the command signal for driving the fine drive mechanism 7 can be obtained from the target track (before correction) obtained as described above. After the obtained command signal is corrected, the obtained command signal can be output to the fine drive mechanism 7.

Specifically, the command signal for driving the fine drive mechanism 7 may be obtained to be corresponded to the target track from the current position and the current posture of the gripping mechanism 6 to the target position and the target posture with which the comparison object comes into contact with the target object, and the obtained command signal may be stored in the storage (memory 103). Further, as the target track, the current target track corresponding to the current position and the current posture of the gripping mechanism 6 may be obtained. And the command signal for driving the fine drive mechanism 7 is successively obtained to achieve the current target track.

The command signal for driving the fine drive mechanism 7 can be corrected in the same way as the correction of the target track described above. Specifically, the correction can be achieved by replacing the target track in the above description with the command signal.

Figure 40:
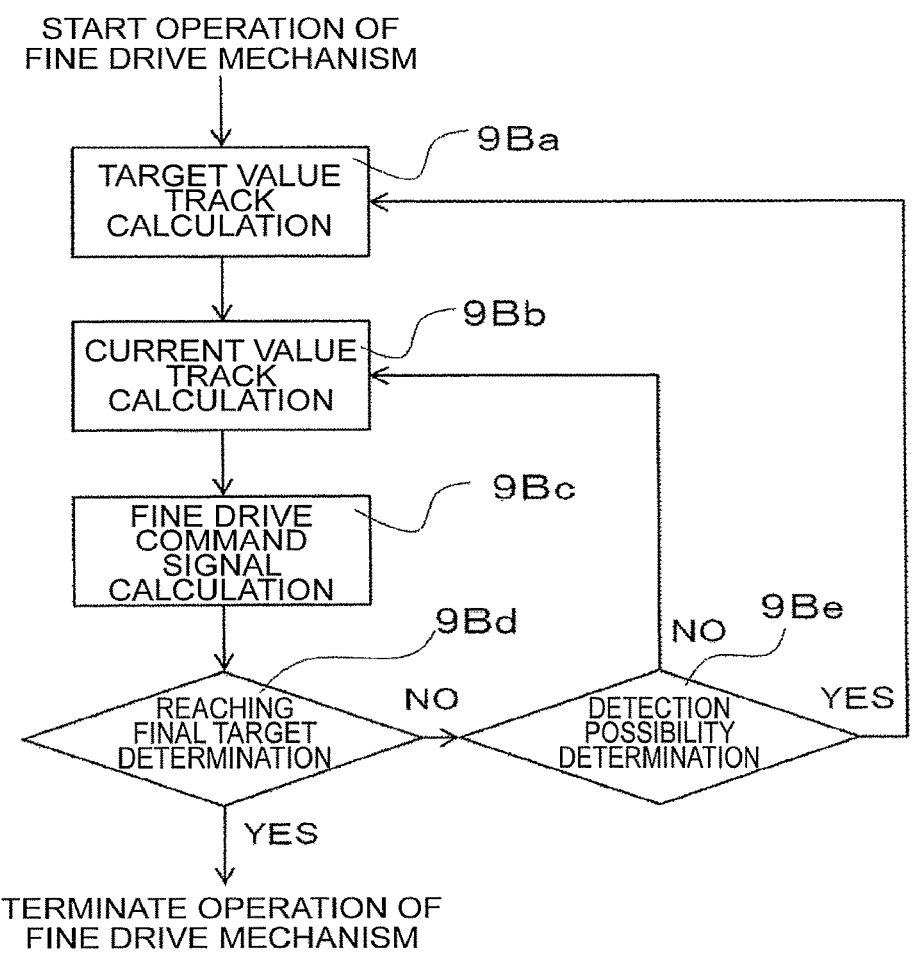
FIG. 40 is a flowchart of a fine track calculator using a relative position and posture sensor and a bend measuring instrument according to the present disclosure.

Next, FIG. 40 is a flowchart for illustrating an operation of the fine track calculator 9 in the first embodiment.

First, in Step 9Ba, target value fine track calculation 9Ba is executed. In Step 99a, the target track representing the track of the position and the posture of the gripping mechanism 6 from the current position and the current posture of the gripping mechanism 6 to the target position and the target posture with which the comparison object comes into contact with the target object is calculated. The result of calculation is stored in the storage (memory 103).

Next, in Step 9Bb, current value fine track calculation 9Bb is executed. In Step 9Bb, a current position and a current posture of the segment mirror 3 gripped by the gripping mechanism 6 are obtained using the current value of the fine drive sensor signal 9001 including joint signals of the fine drive mechanism 7 as an input.

Next, in Step 99c, fine drive command signal calculation 9Bc is executed.

Next, in Step 9Bd, a determination of reaching a final target value is performed. In Step 9Bd, determination is made on whether or not the gripping mechanism 6 reaches a final target position and a final target posture in the target track described above. In Step 9Bd, when the position and the posture of the gripping mechanism 6 reach the final target position and the final target posture, the processing performed by the fine track calculator 9 is ended. When the position and the posture of the gripping mechanism 6 do not reach the final target position and the final target posture of the gripping mechanism 6 in Step 9Bd, the operation proceeds to Step 9Be. Here, the final target position and the final target posture may be considered as a position and a posture of the fine drive mechanism 7 with which the comparison object comes into contact with the target object to have a final target position and a final target posture. For example, in a case in which the segment mirror 3 is gripped so as to be removed, the final target position and the final target posture are the position and the posture of the fine drive mechanism 7 when the gripping mechanism claw portions 602 included in the gripping mechanism 6 grip the segment mirror 3 in a well-balanced state to transfer the entire load of the segment mirror 3 from the lift mechanism 4 to the gripping mechanism 6. Further, in a case in which the segment mirror 3 is mounted, the final target position and the final target posture are the position and the posture of the fine drive mechanism 7 when the lift mechanism 4 is inserted into the lift insertion portion 302 of the segment mirror 3 to transfer the entire load of the segment mirror 3, which is applied to the gripping mechanism 6, to the lift mechanism 4.

In Step 9Be, a relative position/posture detection possibility determination 9Be is performed. In Step 9Be, determination is made on whether or not the first detector can identify the comparison object and the target object based on the signal output from the first detector and can measure the relative position and the relative posture. When the result of determination indicates that the detection is possible, the operation proceeds to Step 9Ba (target value fine track calculation 9Ba). When the result of determination indicates that the detection is impossible, the operation proceeds to Step 9Bb (current value fine track calculation 9Bb). Specifically, when the first detector can successfully perform the measurement, the correction amount for the target track is obtained based on the result of measurement by the first detector in the target value fine track calculation 9Ba. When the first detector cannot successfully perform the measurement, the current position and the current posture of the fine drive mechanism 7 are obtained in the current value fine track calculation 9Bb. The correction amount is obtained based on the bend obtained by the second detector for the target track corresponding to the current position and the current posture of the fine drive mechanism 7 and the correction amount for the command signal is obtained. The command signal is corrected using the obtained correction amount.

FIG. 11 to FIG. 15 are views for illustrating an example of an operation flow of mounting the segment mirror 3 provided in an outer peripheral region of the segmented primary mirror 33 to the lift mechanism 4 included in the mirror replacement device according to the first embodiment of the present disclosure. When the segment mirror 3 provided in the outer peripheral region of the segmented primary mirror 33 is mounted to and removed from the lift mechanism 4, in some cases, a position of the fine drive mechanism is shifted from an initially supposed position due to the bend of the fine drive mechanism. Here, it is described about a configuration which enables mounting and removal with high accuracy even when the shift occurs due to the bend. It is described for a case in that the segment mirror 3 is provided in the outer peripheral region of the segmented primary mirror 33. However, it is considered that the bend of the fine drive mechanism also occurs in the segment mirror 3 provided in the vicinity of the center, specifically, in the central region. Therefore, the following description can be applied to the replacement of the segment mirror 3 provided in the central region described above.

Figure 11:
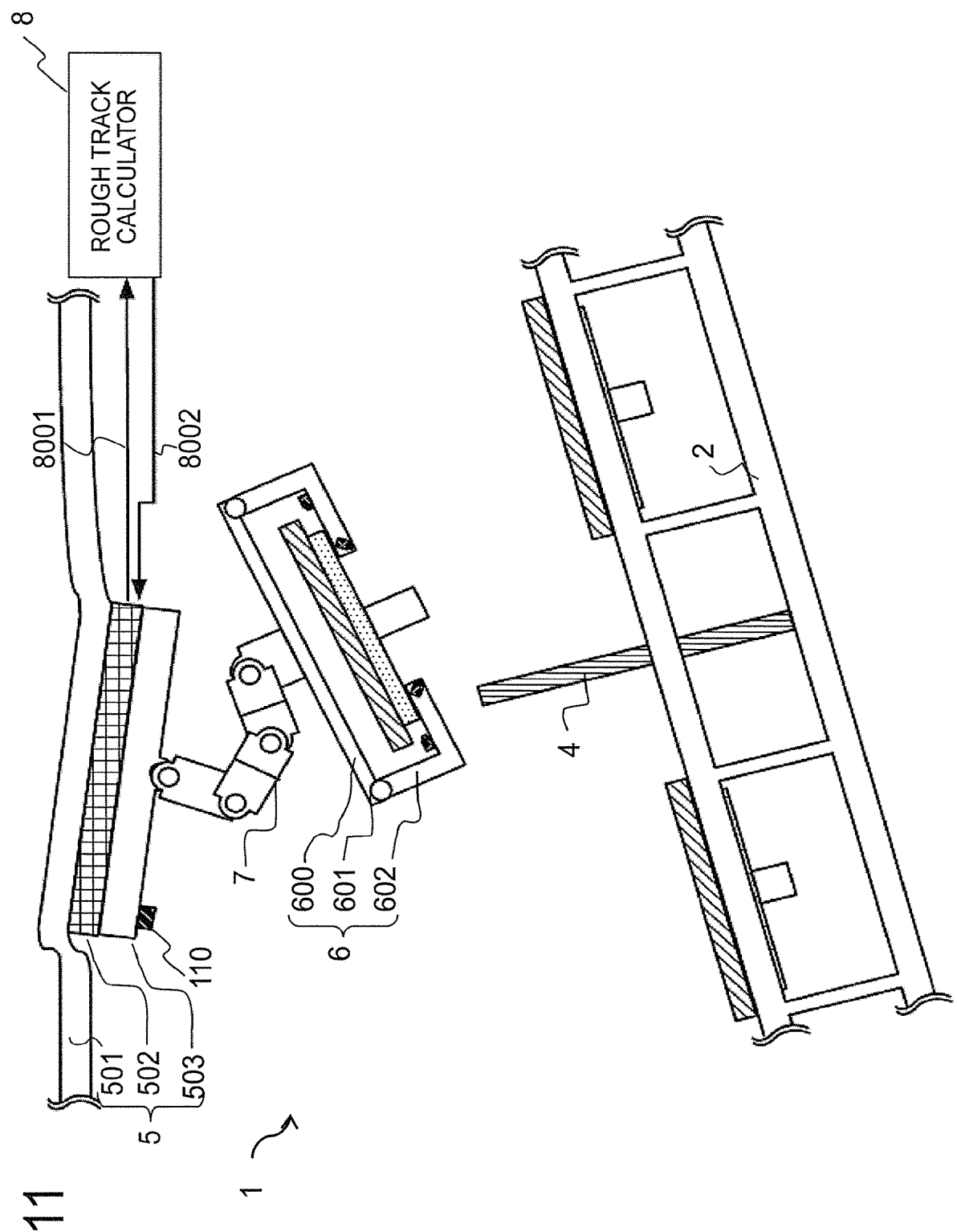
FIG. 11 is a view for illustrating an operation of mounting the segment mirror provided in an outer peripheral region of the segmented primary mirror to the lift mechanism of the mirror replacement device according to the first embodiment of the present disclosure.

In an initial position illustrated in FIG. 11, as in the case of the central region of the segmented primary mirror 33 described above, the rough track calculator 8 receives the rough drive sensor signal 8001 output from the rough drive mechanism 5 and outputs the rough drive command signal 8002 based on the difference with the pre-stored position of the segment mirror 3 to be maintained, to move the rough drive mechanism 5 to the position of the target segment mirror 3 to be maintained. At this time, when the rough drive mechanism 5 is long and large, there exists a limitation for the positional control accuracy, and an error remains. Further, the segment mirror 3 provided in the outer peripheral region is installed in a state in which the perpendicular axis is inclined with respect to the vertical direction. Therefore, the gripping mechanism 6 has a posture inclined with respect to the vertical direction. The inclination becomes larger along a direction toward the outer peripheral side. In this case, a load generated due to offset of a position of center of gravity causes a bend in the rough drive mechanism base 503. FIG. 11 is an illustration of an assumed case in which the rough drive mechanism 5 is moved under only the control of the rough drive calculator 8 and the gripping mechanism 6 is inclined to cause an error of the position. For example, a case in which the relative position and posture sensor being the first detector is a high-speed image capturing processing sensor is described below. This flow is as illustrated in FIG. 40.

Figure 12:
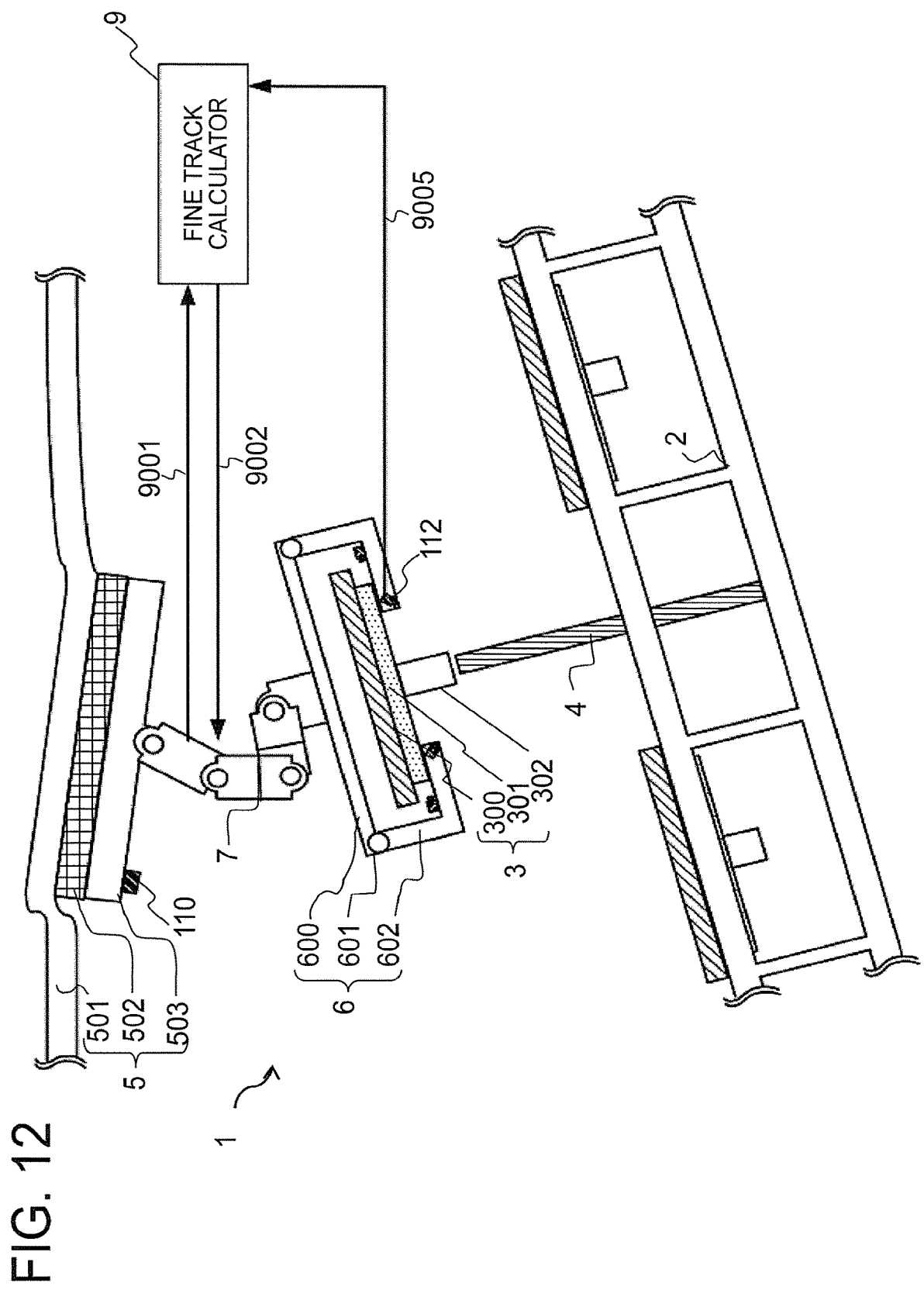
FIG. 12 is a view for illustrating the operation of mounting the segment mirror provided in the outer peripheral region of the segmented primary mirror to the lift mechanism of the mirror replacement device according to the first embodiment of the present disclosure.

In FIG. 12, the lift insertion portion relative sensor signal 9005 obtained by measuring the relative positional error and the relative posture error between the lift insertion portion 302 and the lift mechanism 4 by the lift insertion portion relative sensors 112 is input to the fine track calculator 9. Further, the fine drive sensor signal 9001 including joint signals of the fine drive mechanism 7, which identify the position and the posture of the segment mirror 3 gripped by the gripping mechanism 6, is input to the fine track calculator 9. The fine drive command signal 9002 is output from the fine track calculator 9 to the fine drive mechanism 7 so as to correct the relative position and the relative posture based on the fine drive sensor signal 9001 and the lift insertion portion relative sensor signal 9005.

Next, the above-mentioned operation is described with reference to a flowchart for the fine track calculator 9 illustrated in FIG. 40. In the relative position/posture detection determination 9Be in Step 9Be, determination is made on whether or not the first detector can identify the comparison object and the target object based on the signal output from the first detector and can measure the relative position and the relative posture. Specifically, determination is made on whether or not the lift insertion portion relative sensors 112 can measure a relative position and a relative posture between a position of a distal end of the lift mechanism 4 and the lift insertion portion relative sensors 112 themselves for each control cycle. Here, the control cycle is a cycle in which the signal for controlling the fine drive mechanism 7 is output, and is, for example, 0.1 second. When the measurement cannot be performed within the control cycle, the processing to be executed within the control cycle cannot be ended within the control cycle, and hence the measurement is substantially impossible. Thus, whether or not the measurement can be performed within the control cycle is determined. When the processing cannot be ended within the control cycle, it is determined that the detection is impossible, and the result of determination is NO. Then, the operation proceeds to Step 9Bb. On the other hand, when the processing can be ended within the control cycle, the detection is possible in some cases and is impossible in other cases. When the detection is possible, the lift insertion portion relative sensors 112 can catch the position of the distal end of the lift mechanism 4. When the detection is impossible, the lift insertion portion relative sensors 112 cannot catch the position of the distal end of the lift mechanism 4. When the processing is performed with a digital camera, for example, the case in which the detection is impossible includes a case in which the object is not included in a captured image and a case in which the object is included in the captured image but is blurred, resulting in failure in determination of the position and the posture.

When the lift insertion portion relative sensors 112 can perform the detection, the result of determination is YES. Then, the processing proceeds to Step 9Ba. When the lift insertion portion relative sensors 112 cannot perform the detection, the result of determination is NO. Then, the processing proceeds to Step 9Bb. In the following, the case in which the result of determination is YES is described at first.

In Step 9Ba, the target value fine track calculation 9Ba is executed. In Step 9Ba, the target track representing the track of the position and the posture of the gripping mechanism 6 from the current position and the current posture of the gripping mechanism 6 to the target position and the target posture with which the comparison object comes into contact with the target object is calculated. The result of calculation is stored in the storage (memory 103).

Next, in Step 9Bb, current value fine track calculation 9Bb is executed. In Step 9Bb, the current position and the current posture of the segment mirror 3 gripped by the gripping mechanism 6 are obtained based on the fine drive sensor signal 9001. At this time, the result of measurement by the bend measuring instrument 110 may be reset to zero.

Next, in Step 9Bc, the fine drive command signal calculation 9Bc is executed. In Step 9Bc, the position and the posture in the target track corresponding to the current position and the current posture are obtained. A relative positional difference and a relative posture difference between the obtained position and posture of the fine drive mechanism 7 and the position and the posture of the lift mechanism 4 being the target object are obtained. A difference between the obtained relative positional difference and relative posture difference and the position and the posture output from the lift insertion portion relative sensors 112 is obtained as the correction amount to be corrected. A command signal is obtained by correcting the command signal which is obtained in advance for the target track by the correction amount. The corrected command signal is output to the fine drive mechanism 7 as the fine drive command signal 9002.

When the result of determination is NO in Step 9Be, the target value fine track calculation 9Ba is not executed based on the result of determination, and the current value fine track calculation 9Bb is executed in Step 9Bb instead.

Next, in Step 9Bc, the fine drive command signal calculation 9Bc is executed. In Step 9Bc, the position and the posture in the target track, which correspond to the current position and the current posture, are obtained, and the relative positional difference and the relative posture difference between the obtained position and posture of the fine drive mechanism 7 and the position and the posture of the lift mechanism 4 being the target object are obtained. An integration of the obtained relative positional difference and relative posture difference and the bend detected by the second detector is obtained as the correction amount to be corrected. A command signal is obtained by correcting the command signal which is obtained in advance for the target track by the correction amount. The corrected command signal is output to the fine drive mechanism 7 as the fine drive command signal 9002.

In Step 9Bc, the current position and the current posture are estimated as described above. However, the current position and the current posture may be estimated in Step 9Bb so that a difference between the estimated current position and current posture and the corresponding position and posture in the target track may be obtained as the correction amount in Step 9Bc. In this case, when the result of determination is YES in Step 9Be, the current position and the current posture of the fine drive mechanism 7 are obtained from the relative position and the relative posture which are the result of detection by the first detector and the fine drive mechanism sensor signal 9001 in Step 9Bb. When the result of determination is NO in Step 9Be, the current value fine track calculation 9Bb is executed based on the result of measurement by the bend measuring instrument 110 and the fine drive mechanism sensor signal 9001 in Step 9Bb. Next, in Step 9Bc, based on the difference between the target value and the current value, the fine drive command signal 9002 is output to the fine drive mechanism 7.

Thus, in a case in which the lift insertion portion relative sensors 112 captures the lift mechanism 4 within the measurement range geometrically, the fine drive mechanism 7 can be controlled with high accuracy, even when the bend occurs in a case in which a captured image is not clear due to oscillation of mounting portions of the lift insertion portion relative sensors 112, in a case in which necessary accuracy is not obtained due to illumination conditions, or in other cases.

Figure 13:
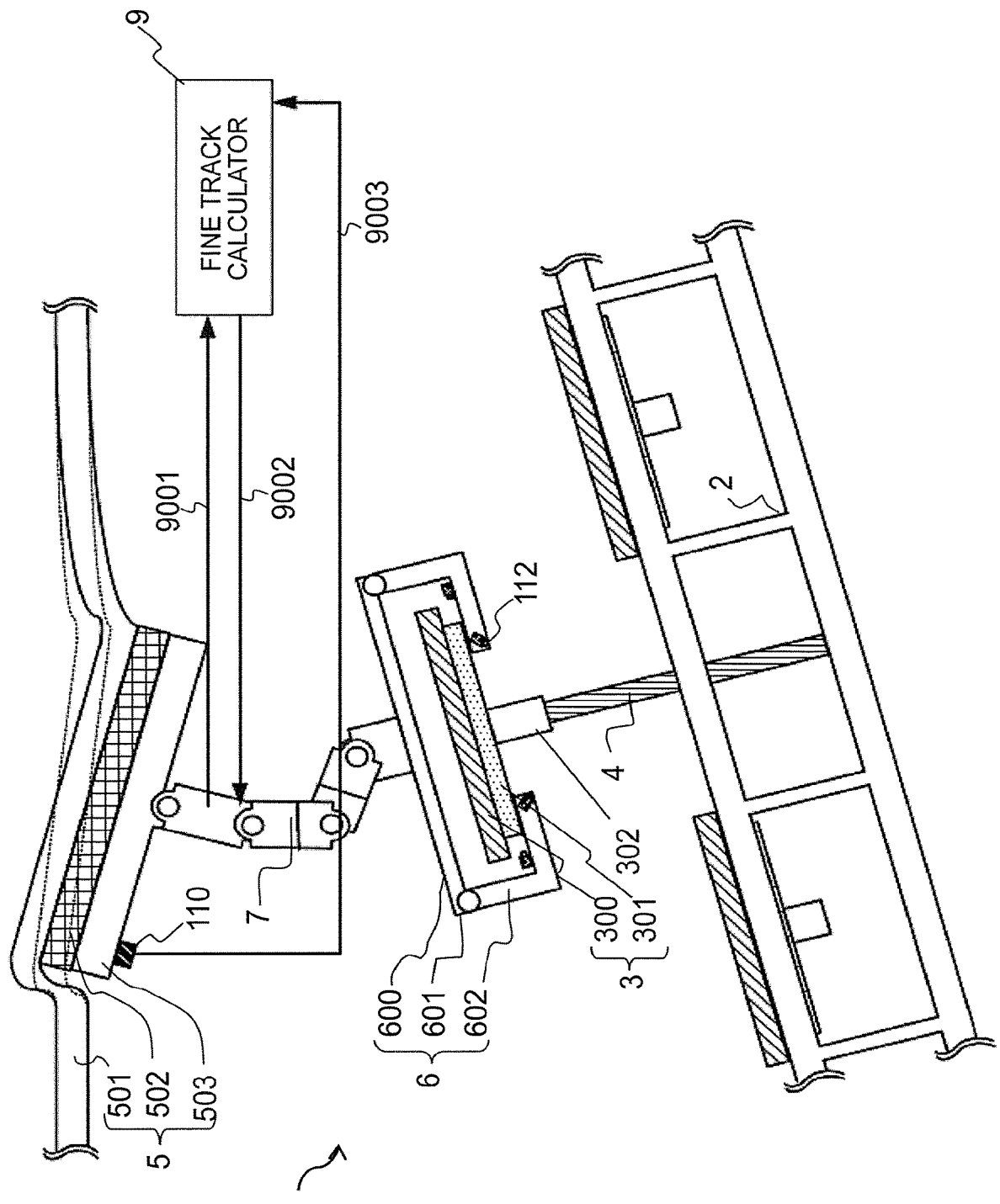
FIG. 13 is a view for illustrating the operation of mounting the segment mirror provided in the outer peripheral region of the segmented primary mirror to the lift mechanism of the mirror replacement device according to the first embodiment of the present disclosure.

As the segment mirror 3 is moved down in a direction toward the lift mechanism 4 as illustrated in FIG. 13, the offset of the position of center of gravity changes with the downward movement. Thus, the bend of the rough drive mechanism base 503 changes. At this time, the lift insertion portion relative sensors 112, which measure the relative positional error and the relative posture error between the segment mirror 3 gripped by the gripping mechanism 6 and the lift mechanism 4, capture the distal end of the lift mechanism 4 and the lift insertion portion 302 within the field of view at the same time, and measure the relative positional error and the relative posture error. Therefore, after the insertion of the segment mirror 3 into the lift mechanism 4 is started, the lift insertion portion relative sensor signal 9005 output from the lift insertion portion relative sensors 112 cannot be used as the feedback signal.

In the outer peripheral region of the segmented primary mirror 33, in particular, the bend occurs in the rough drive mechanism base 503. Therefore, the bend is required to be measured and to be corrected. The bend measuring instrument 110 to measure the bend is mounted to the rough drive mechanism base 503. The bend measurement sensor signal 9003 obtained by the measurement is input to the fine track calculator 9. As a result, the fine drive command signal 9002 is calculated from the varying bend in the fine track calculator 9 to control the fine drive mechanism 7 with high accuracy. Thus, the segment mirror 3 can be mounted to the lift mechanism 4 with a small reaction force.

Figure 14:
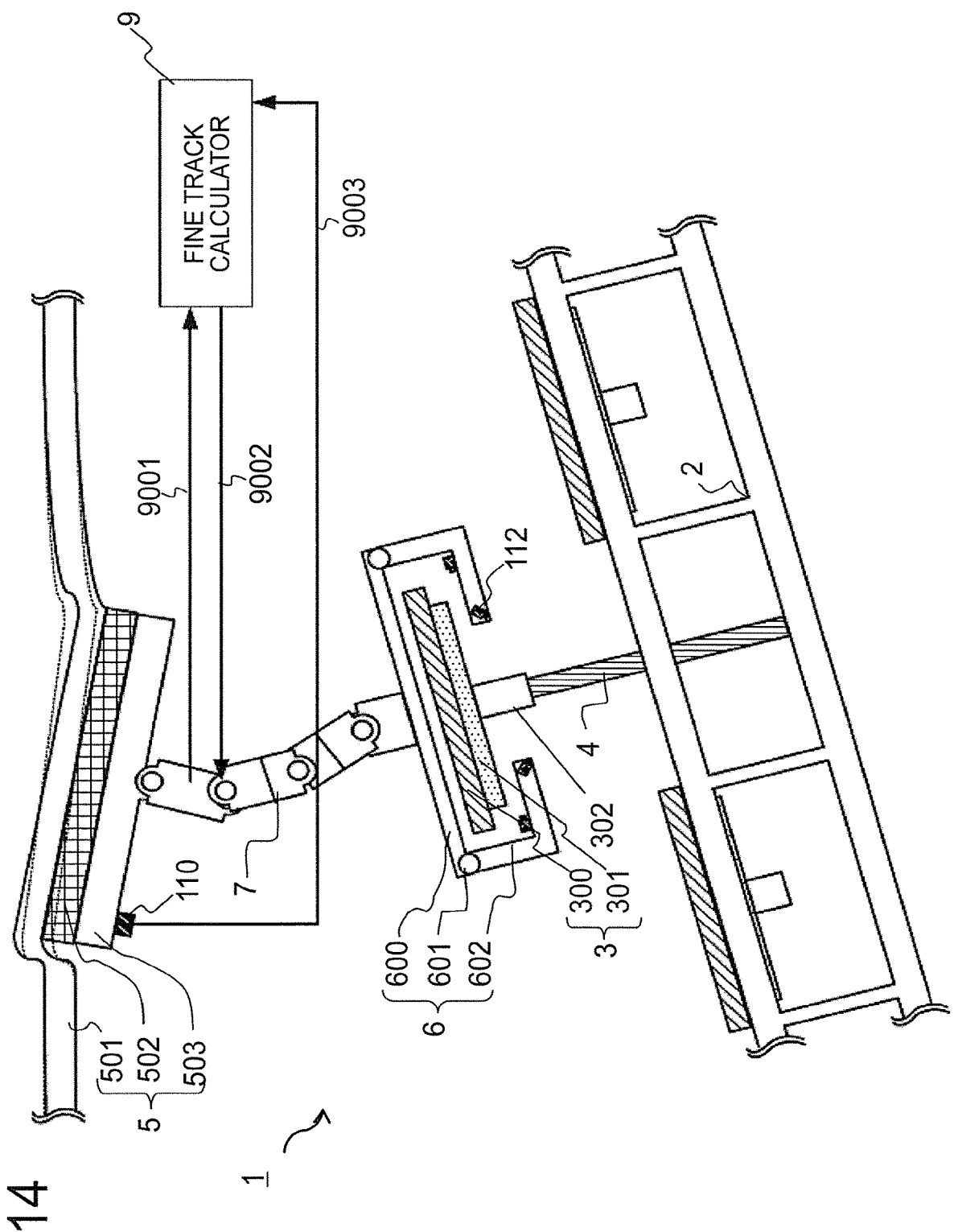
FIG. 14 is a view for illustrating the operation of mounting the segment mirror provided in the outer peripheral region of the segmented primary mirror to the lift mechanism of the mirror replacement device according to the first embodiment of the present disclosure.

Thereafter, the fine drive mechanism 7 is driven by the fine drive command signal 9002 and the segment mirror 3 is moved down in the direction toward the lift mechanism 4. The load of the segment mirror 3 is transferred to the lift mechanism 4 as illustrated in FIG. 14 so that the distal end of the lift mechanism 4 is inserted into the lift insertion portion 302 of the segment mirror 3, and the segment mirror 3 is mounted to the lift mechanism 4. Even at this time, the bend of the rough drive mechanism base 503 varies. However, the bend measurement sensor signal 9003 operates as the feedback signal to keep the gripping claw portions 602 and the mirror gripped portion 301 in parallel.

Figure 15:
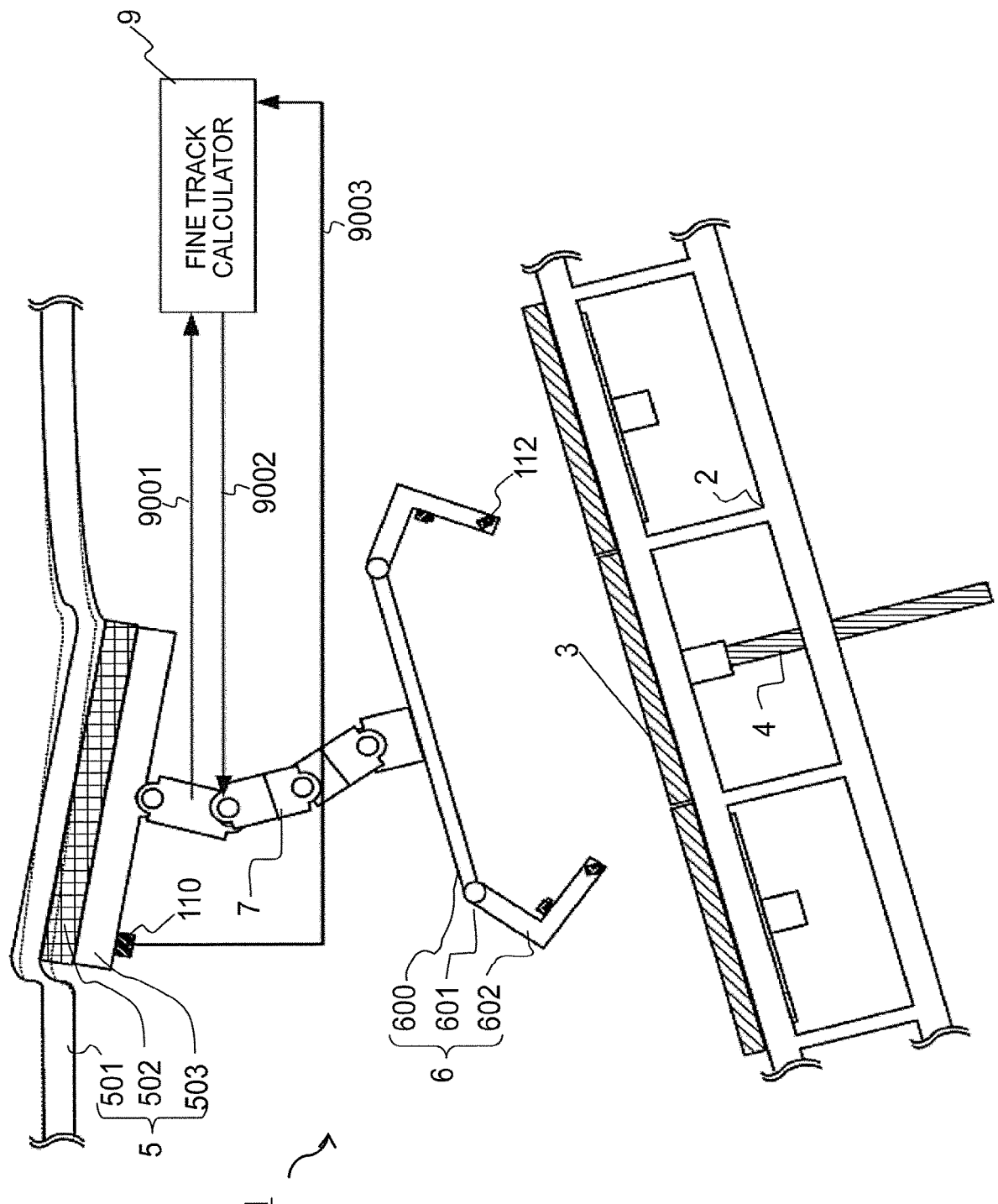
FIG. 15 is a view for illustrating the operation of mounting the segment mirror provided in the outer peripheral region of the segmented primary mirror to the lift mechanism of the mirror replacement device according to the first embodiment of the present disclosure.

Finally, as illustrated in FIG. 15, the grip rotationally opening and closing mechanism 601 is driven based on the gripping claw portion drive command signal 9007 output from the grip controller 60 illustrated in FIG. 38 to open the gripping claw portions 602. Thereafter, the lift mechanism 4 is moved down based on the lift mechanism drive command signal 9008 output from the lift controller 40 to place the segment mirror 3 in the predetermined position.

As described above, when the relative position and posture sensor (111, 112) being the first detector is a measuring instrument including a camera which can perform a measurement only when the fine drive mechanism 7 is stopped and a processer processes image data photographed by the camera, in the flowchart of FIG. 40 for the mounting, the result of determination in Step 9Be is YES only for the initial state in the first step, and the processing proceeds to Step 9Ba. Thereafter, the processing proceeds to Step 9Bb.

Figure 16:
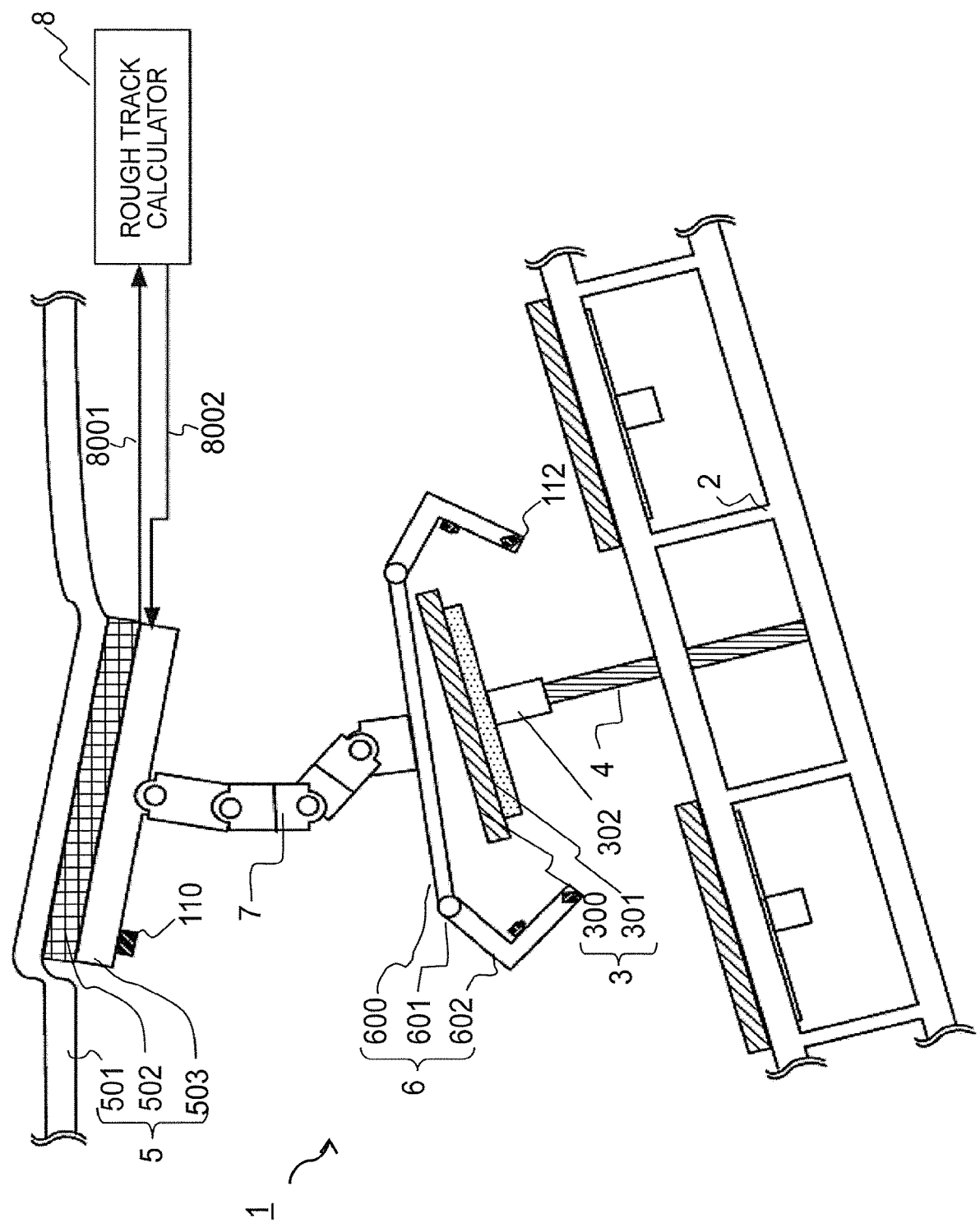
FIG. 16 is a view for illustrating an operation of removing the segment mirror provided in the outer peripheral region of the segmented primary mirror from the lift mechanism of the mirror replacement device according to the first embodiment of the present disclosure.
Figure 17:
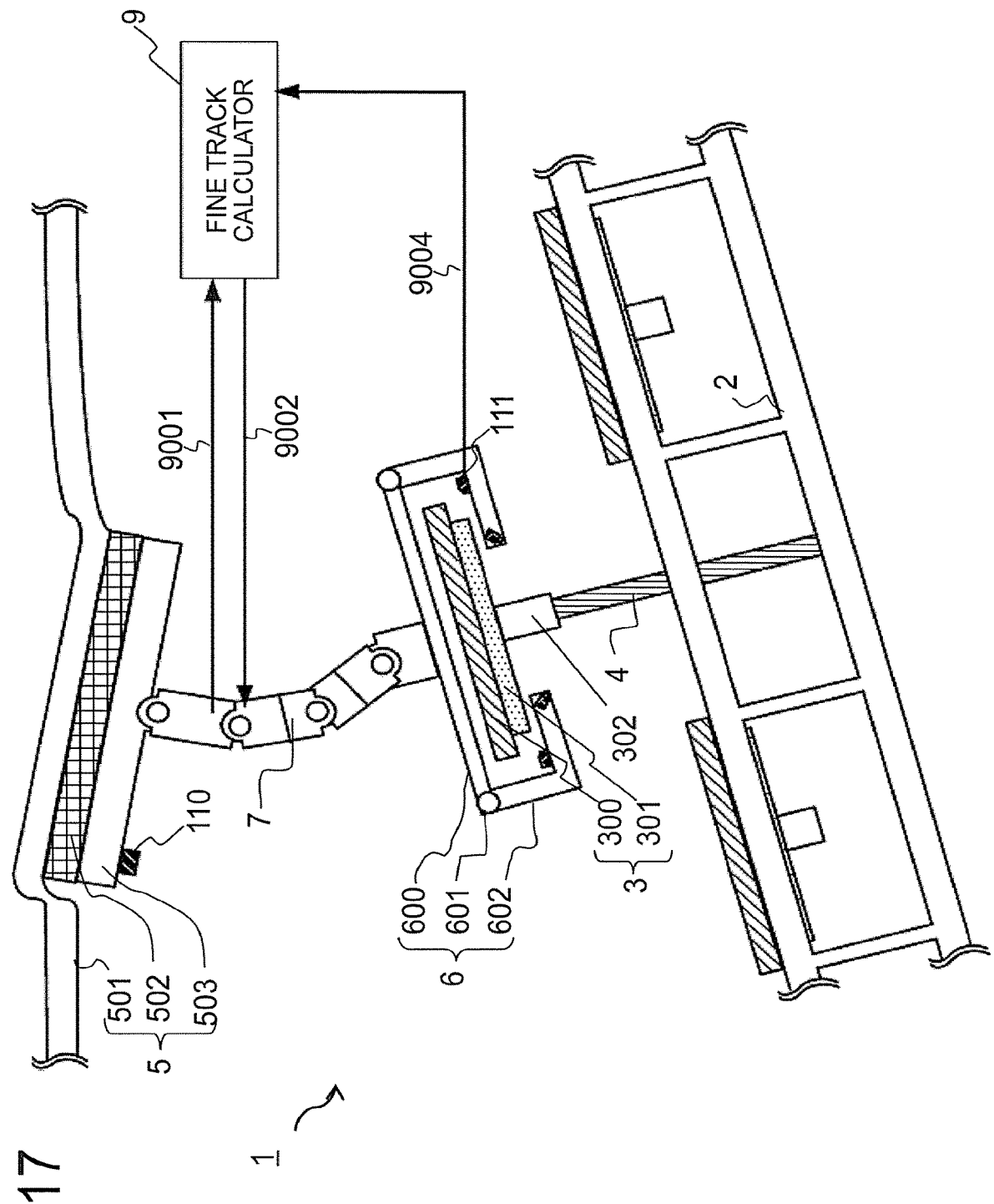
FIG. 17 is a view for illustrating the operation of removing the segment mirror provided in the outer peripheral region of the segmented primary mirror from the lift mechanism of the mirror replacement device according to the first embodiment of the present disclosure.
Figure 18:
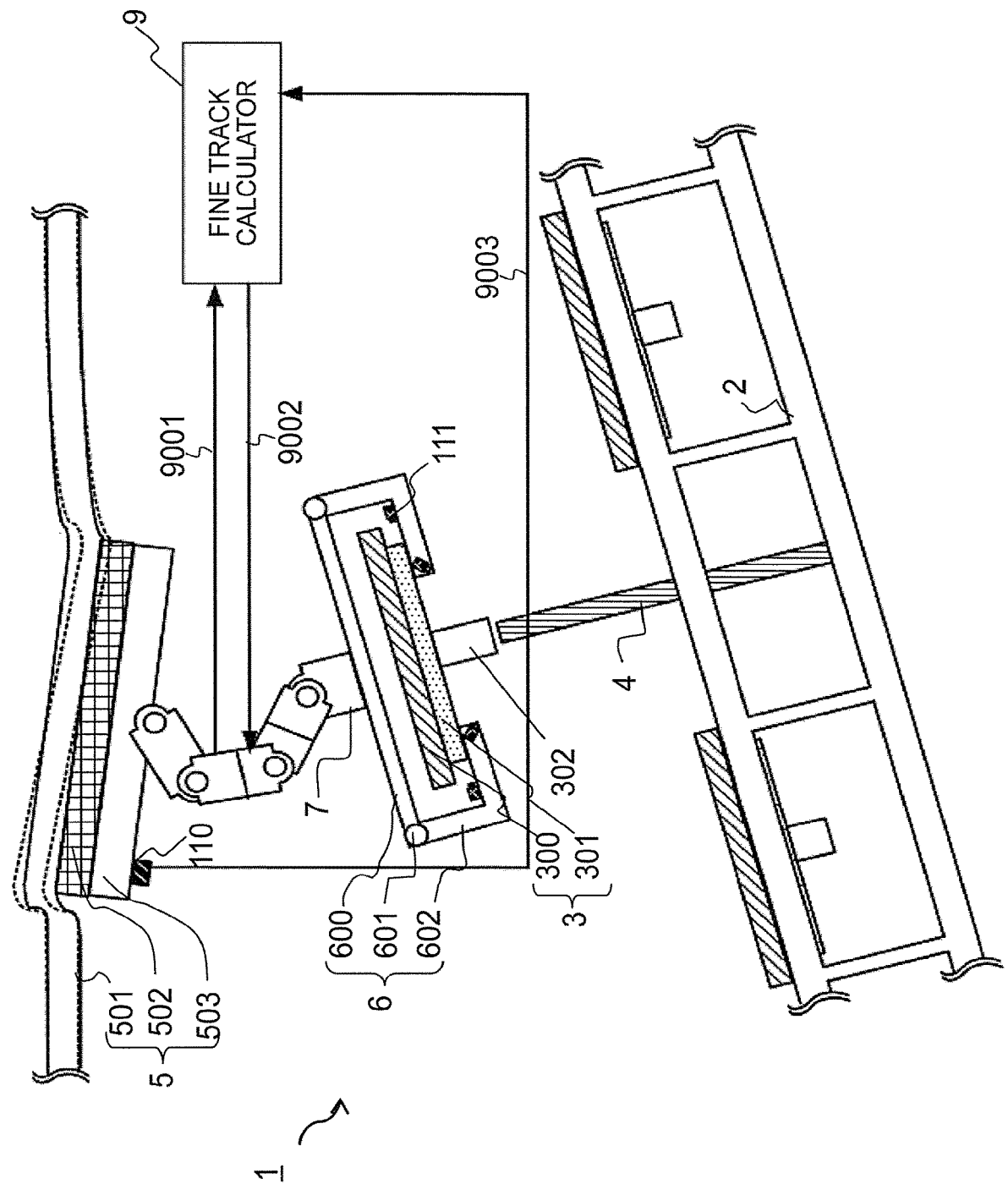
FIG. 18 is a view for illustrating the operation of removing the segment mirror provided in the outer peripheral region of the segmented primary mirror from the lift mechanism of the mirror replacement device according to the first embodiment of the present disclosure.

FIG. 16 to FIG. 18 are views for illustrating an example of an operation flow of removing the segment mirror 3 provided in the outer peripheral region of the segmented primary mirror 33 from the lift mechanism 4 included in the mirror replacement device according to the first embodiment of the present disclosure. A configuration of the fine track calculator 9 is the same as that illustrated in FIG. 43, and a processing flow chart thereof is the same as that of FIG. 40.

In an initial position illustrated in FIG. 16, the rough track calculator 8 receives the rough drive sensor signal 8001 output from the rough drive mechanism 5 and outputs the rough drive command signal 8002 based on a difference with the pre-stored position of the segment mirror 3 to be maintained, to move the rough drive mechanism 5 to a position of the target mirror to be maintained. Further, the lift mechanism 4 raises the segment mirror 3 to a predetermined position based on the lift mechanism drive command signal 9008 output from the lift controller 40. At this time, when the rough drive mechanism 5 is long and large, there exists a limitation for the positional control accuracy, and an error remains. Further, the segment mirror 3 is installed in the outer peripheral region in a state in which the perpendicular axis is inclined with respect to the vertical direction. Therefore, the gripping mechanism 6 also has a posture in which a perpendicular axis of the gripping mechanism 6 is inclined with respect to the vertical direction. Here, the load generated due to the offset of the position of center of gravity causes the bend in the rough drive mechanism base 503. FIG. 16 is an illustration supposing a case in that those errors are generated at the same time. For example, a case in which the relative position and posture sensor (111, 112) being the first detector is the high-speed image capturing processing sensor is described below.

Based on the gripping claw portion drive command signal 9007 output from the grip controller 60, the grip rotationally opening and closing mechanism 601 is driven to close the gripping claw portions 602. At the same time, the gripping claw portion relative sensor signal 9004 obtained by measuring the relative positional error and the relative posture error between the segment mirror 3 and the gripping mechanism 6 by the gripping claw portion relative sensors 111 is input to the fine track calculator 9. Further, the fine drive sensor signal 9001 including joint signals of the fine drive mechanism 7, which identify the positions and the postures of the gripping claw portions 602 being tips of the gripping mechanism 6, is input to the fine track calculator 9. The fine drive command signal 9002 is output from the fine track calculator 9 to the fine drive mechanism 7 so as to correct the relative positional error and the relative posture error using the fine drive sensor signal 9001 and the gripping claw portion relative sensor signal 9004. As a result, the gripping claw portions 602 and the mirror gripped portion 301 are brought into a state illustrated in FIG. 17, that is, a state of being faced in parallel to each other.

Next, the processing flow for the removal described above is illustrated in the flowchart of FIG. 40. Basically, the description is the same as that for the flowchart of FIG. 40 for the mounting. Thus, differences are described below. In the case of mounting, determination is made on whether or not the lift insertion portion relative sensors 112 can measure the relative position and the relative posture between the position of the distal end of the lift mechanism 4 and the lift insertion portion relative sensors 112 themselves. In the case of removal, determination is made on whether or not the gripping claw portion relative sensors 111 can measure the relative position and the relative posture between the gripping claw portion relative sensors 111 and the mirror gripped portion 301 of the segment mirror 3 to be replaced. As another different point, the lift insertion portion relative sensors 112 in the case of mounting are replaced with the gripping claw portion relative sensors 111, and the position of the distal end of the lift mechanism 4 in the case of mounting is replaced with the mirror gripped portion 301 of the segment mirror 3 to be replaced.

Next, the fine drive mechanism 7 is driven based on the fine drive command signal 9002 output from the fine track calculator 9 to raise the gripping mechanism 6 above the lift mechanism 4, and to remove the segment mirror 3 from the lift mechanism 4 as illustrated in FIG. 18. In a stage during the removal, the load of the segment mirror 3 is transferred from the lift mechanism 4 to the gripping mechanism 6. Therefore, the bend of the rough drive mechanism base 503 varies depending on the transfer of the load of the segment mirror 3 and the position and the posture of the gripping mechanism 6.

The lift insertion portion relative sensors 112 to measure the relative positional error and the relative posture error between the segment mirror 3 gripped by the gripping mechanism 6 and the lift mechanism 4 capture the distal end of the lift mechanism 4 and the lift insertion portion 302 within the field of view at the same time to measure the relative positional error and the relative posture error. Therefore, under a state in which the segment mirror 3 is inserted into the lift mechanism 4, the lift insertion portion relative sensor signal 9005 output from the lift insertion portion relative sensors 112 cannot be used as the feedback signal.

In particular, the bend occurs in the rough drive mechanism base 503 in the outer peripheral region of the segmented primary mirror 33, and hence the bend is required to be measured and to be corrected. The bend measuring instrument 110 to measure the bend is mounted to the rough drive mechanism base 503. The bend measurement sensor signal 9003 obtained by the measurement is input to the fine track calculator 9. As a result, the fine drive command signal 9002 is calculated by the fine track calculator 9 from the varying bend to control the fine drive mechanism 7 with high accuracy. As a result, the segment mirror 3 can be removed from the lift mechanism 4 causing a small reaction force.

According to the configuration described above, the position and the posture of the segment mirror are precisely recognized to mount and remove the segment mirror to and from the segmented mirror telescope main body. As a result, the positioning of the segment mirror with high accuracy can be automatically achieved.

Further, by using the hold control for each driving shaft, brake actuation, or an automatic locking operation, oscillation of the segment mirror can be reduced even when an earthquake occurs.

Further, in a case of a large structure, an increase in driving range and a bend of the structure degrade control accuracy. By the correction with the fine drive mechanism and the detection and the correction of the bend according to the configuration of the present disclosure, the positioning with high accuracy can be automatically achieved.

Here, the hold control for each driving shaft, the brake actuation, or the automatic locking operation mentioned above is described.

In the hold control, the rough drive controller 80 illustrated in FIG. 38 includes the rough drive hold controller 8a, and the fine drive controller 90 illustrated in FIG. 38 includes the fine drive hold controller 9a. When each of a movable portion of the rough drive mechanism 5 and a movable portion of the fine drive mechanism 7 achieves a position or a position and a posture specified by the command signal, these controllers control the movable portion to be maintained in the position or in the position and the posture.

In the brake actuation, for example, as conceptually illustrated for the rough drive mechanism 5 and the fine drive mechanism 7 on an output side of the mirror replacement controller 100 in FIG. 38, the rough drive mechanism 5 includes a rough drive brake mechanism 5a and the fine drive mechanism 7 includes a fine drive brake mechanism 7a, each to brake and to fix the corresponding movable portion except when the movable portion is being moved to the position or to the position and the posture specified by the command signal.

In the automatic locking actuation, for example, as conceptually illustrated for the rough drive mechanism 5 and the fine drive mechanism 7 on the output side of the mirror replacement controller 100 in FIG. 38, the rough drive mechanism 5 includes a rough drive automatic locking mechanism 5b and the fine drive mechanism 7 includes a fine drive automatic locking mechanism 7b, each to maintain the corresponding movable portion in the position or in the position and the posture specified by the command signal so that the movable portion is not moved by an external force.

Second Embodiment

Figure 19:
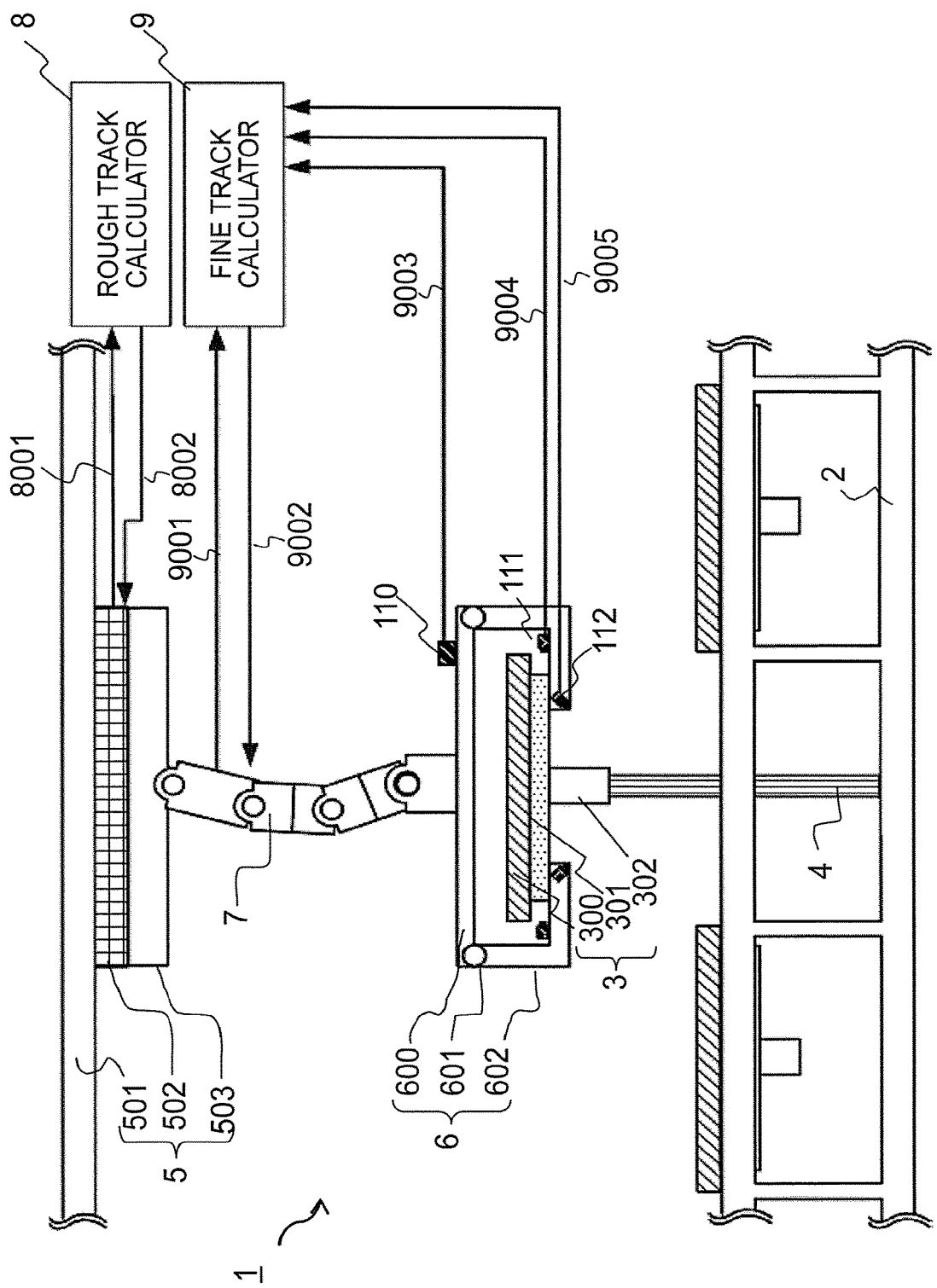
FIG. 19 is a view for illustrating a configuration of the mirror replacement device for a segmented mirror telescope according to a second embodiment of the present disclosure.

FIG. 19 is a view for illustrating a configuration of the mirror replacement device for a segmented mirror telescope according to a second embodiment of the present disclosure. In FIG. 19, the bend measuring instrument 110 which is mounted to the rough drive mechanism base 503 in the first embodiment is mounted to the gripping mechanism base 600.

According to the configuration described above, in addition to the effects of the first embodiment, not only when the bend of the rough drive mechanism 5 occurs but also when the bend of the fine drive mechanism 7 occurs, the positioning with high accuracy can be automatically achieved.

Third Embodiment

Figure 20:
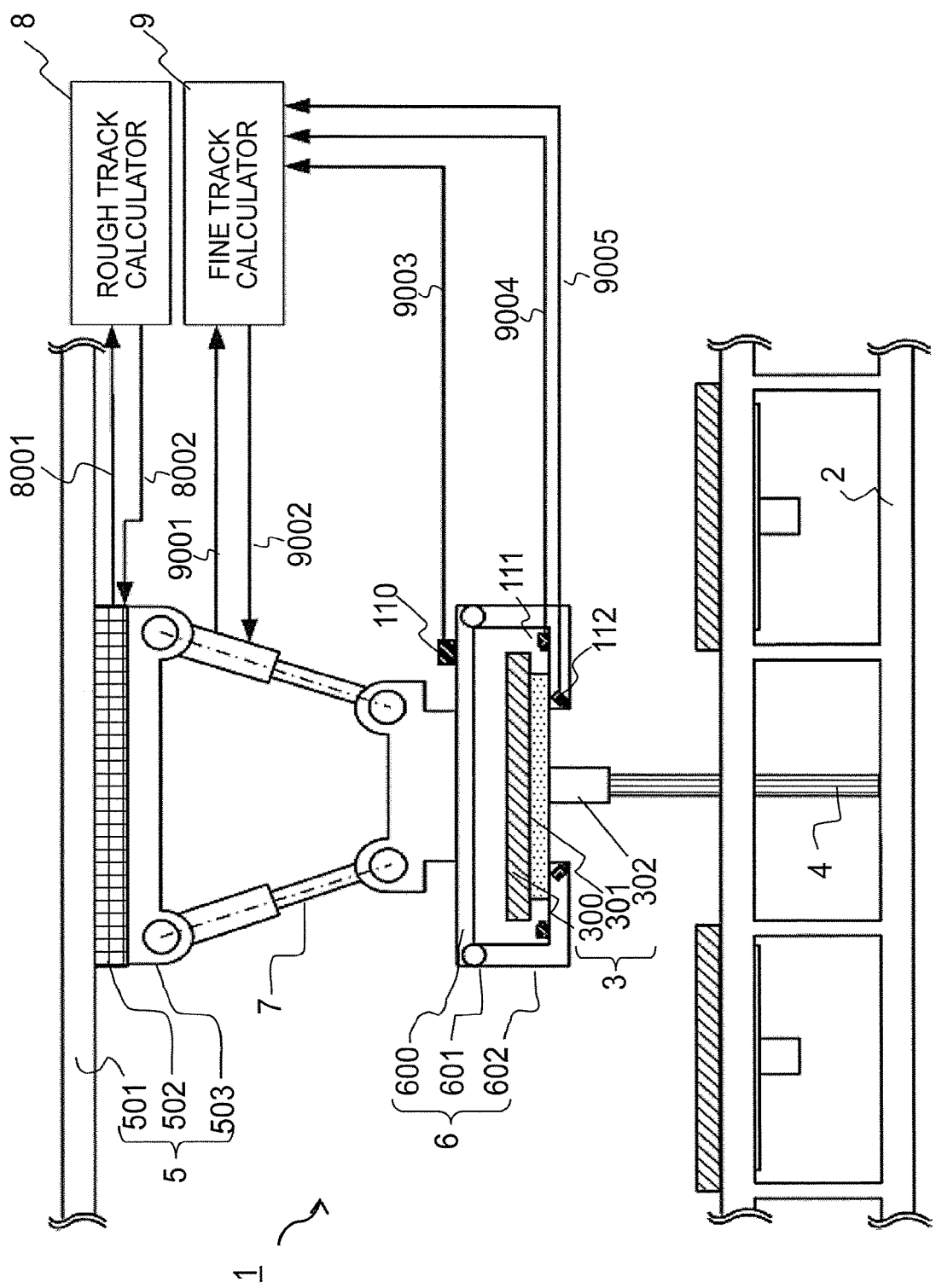
FIG. 20 is a view for illustrating a configuration of the mirror replacement device for a segmented mirror telescope according to a third embodiment of the present disclosure.

FIG. 20 is a view for illustrating a configuration of the mirror replacement device for a segmented mirror telescope according to a third embodiment of the present disclosure. In each of the embodiments described above, a serial link mechanism is used as the fine drive mechanism 7. However, a parallel link mechanism is used as the fine drive mechanism 7 in FIG. 20. The fine drive mechanism 7 is, for example, a parallel link mechanism which can be driven with six degrees of freedom and has two or more expandable and contractible arms having five degrees of freedom of rotation between the rough drive mechanism base 503 on the upper side and the gripping mechanism base 600 on the lower side.

According to the configuration described above, in addition to the effects of the embodiments described above, the occurrence of the bend can be suppressed because a stiffness of the fine drive mechanism 7 is increased.

Fourth Embodiment

Figure 21:
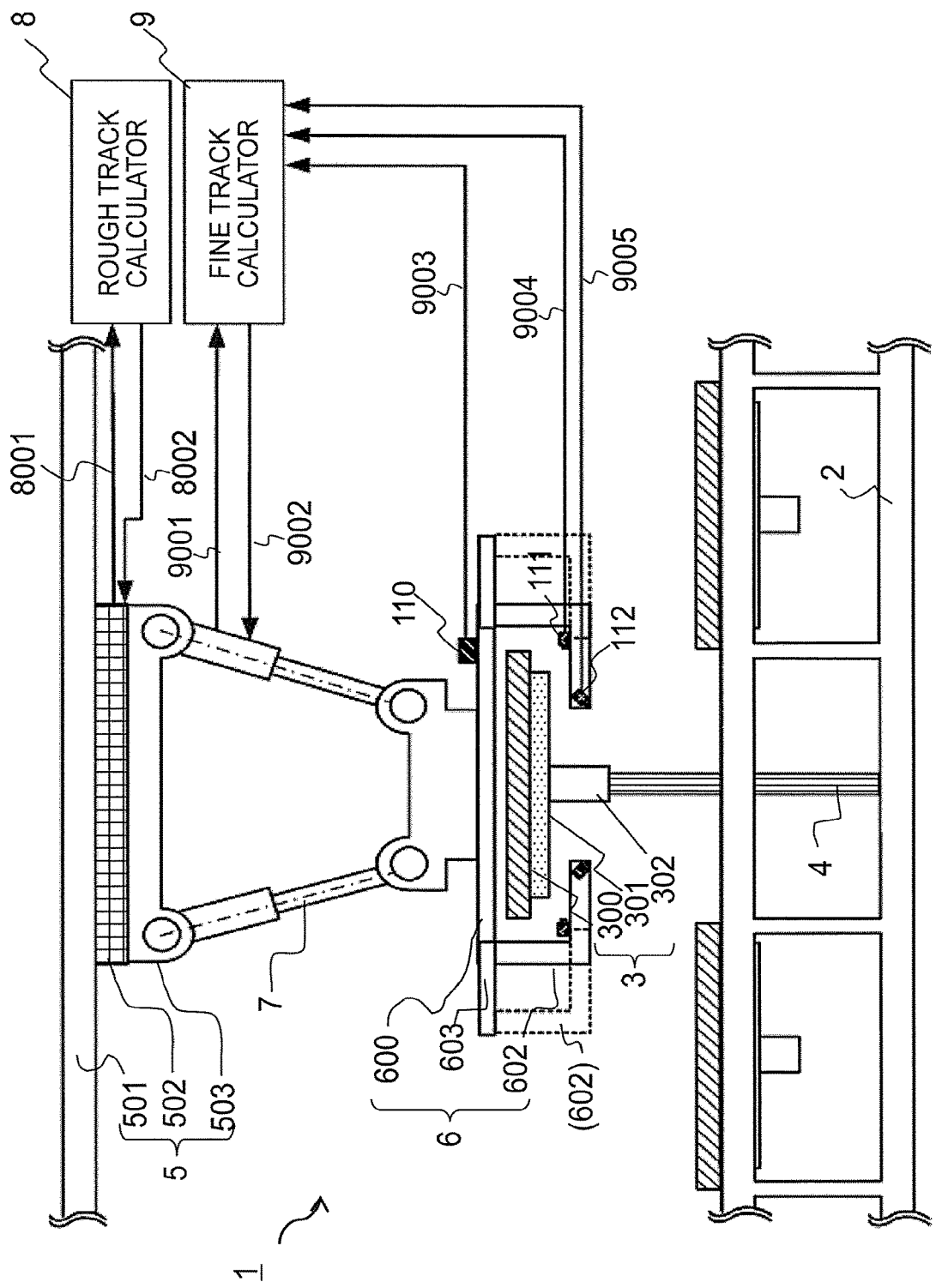
FIG. 21 is a view for illustrating a configuration of the mirror replacement device for a segmented mirror telescope according to a fourth embodiment of the present disclosure.

FIG. 21 is a view for illustrating a configuration of the mirror replacement device for a segmented mirror telescope according to a fourth embodiment of the present disclosure. In each of the embodiments described above, opening/closing mechanisms for the gripping claw portions 602 included in the gripping mechanism 6 are the grip rotationally opening and closing mechanism 601 to perform a rotating operation. However, grip horizontally opening and closing mechanisms 603 to perform a horizontal operation is used in FIG. 21. More specifically, the grip horizontally opening and closing mechanisms 603 slide in a direction parallel to a surface of the mirror gripped portion 301 of the segment mirror 3 for opening and closing.

According to the configuration described above, in addition to the effects of the embodiments described above, the gripping claw portion relative sensors 111 can constantly measure the mirror gripped portion 301 during the processes illustrated in FIG. 9 and FIG. 17.

Fifth Embodiment

Figure 22:
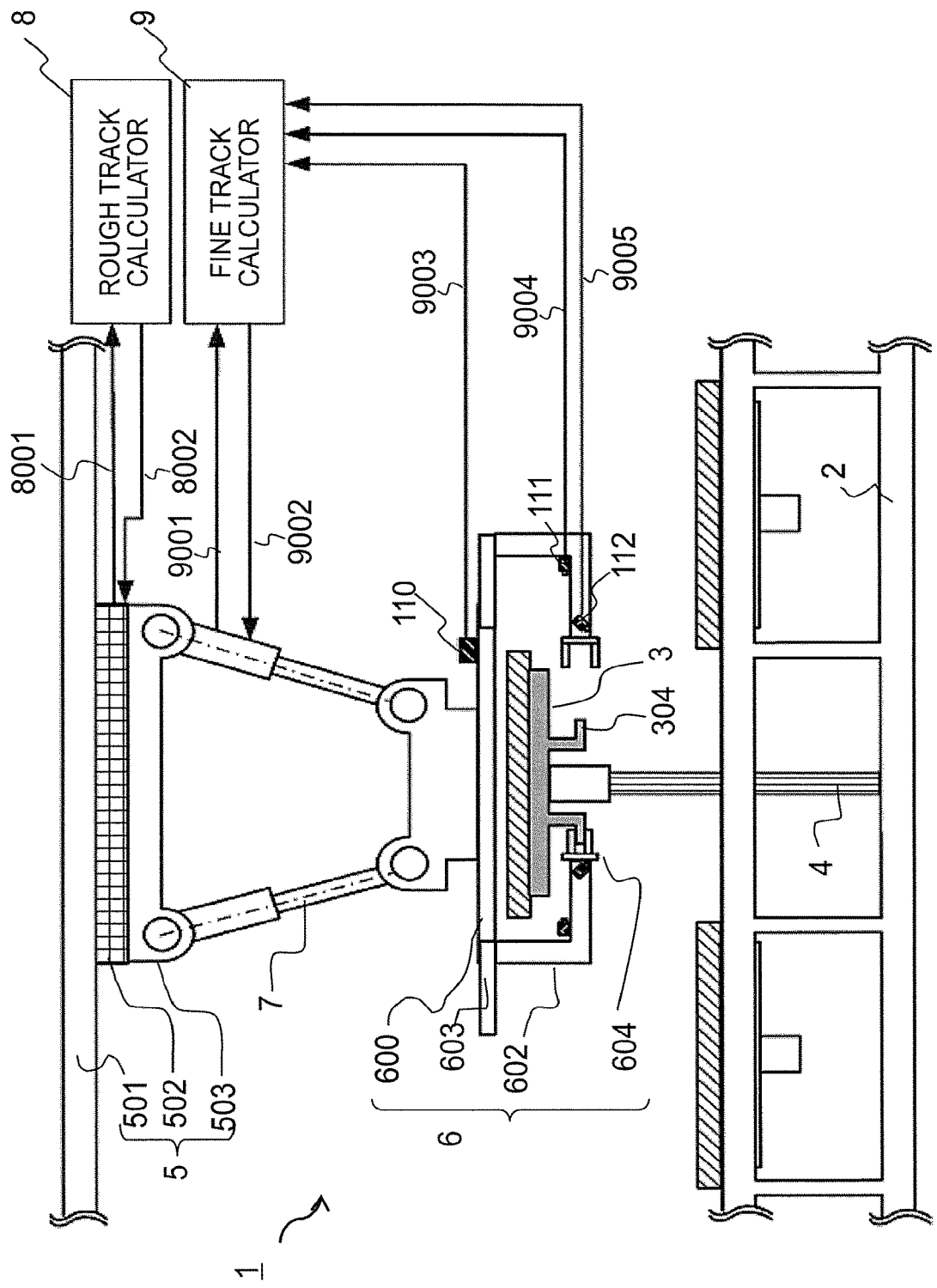
FIG. 22 is a view for illustrating a configuration of the mirror replacement device for a segmented mirror telescope according to a fifth embodiment of the present disclosure.

FIG. 22 is a view for illustrating a configuration of the mirror replacement device for a segmented mirror telescope according to a fifth embodiment of the present disclosure. In the configuration illustrated in FIG. 22, gripping hold mechanisms 604 to sandwich the segment mirror 3 are additionally provided respectively to distal ends of the gripping claw portions 602 included in the gripping mechanism 6. Further, gripping projections 304 to be held by the gripping hold mechanisms 604 are provided at the mirror gripped portion 301 of the segment mirror 3.

According to the configuration described above, in addition to the effects of the embodiments described above, the segment mirror 3 which is held in contact with the gripping claw portions 602 with the gravitational force can be reliably gripped. In particular, even when an oscillation equal to or more than 1 G (gravitational acceleration) is applied at the time of occurrence of an earthquake, the segment mirror 3 does not separate from the gripping claw portions 602, thereby providing safety.

Sixth Embodiment

Figure 23:
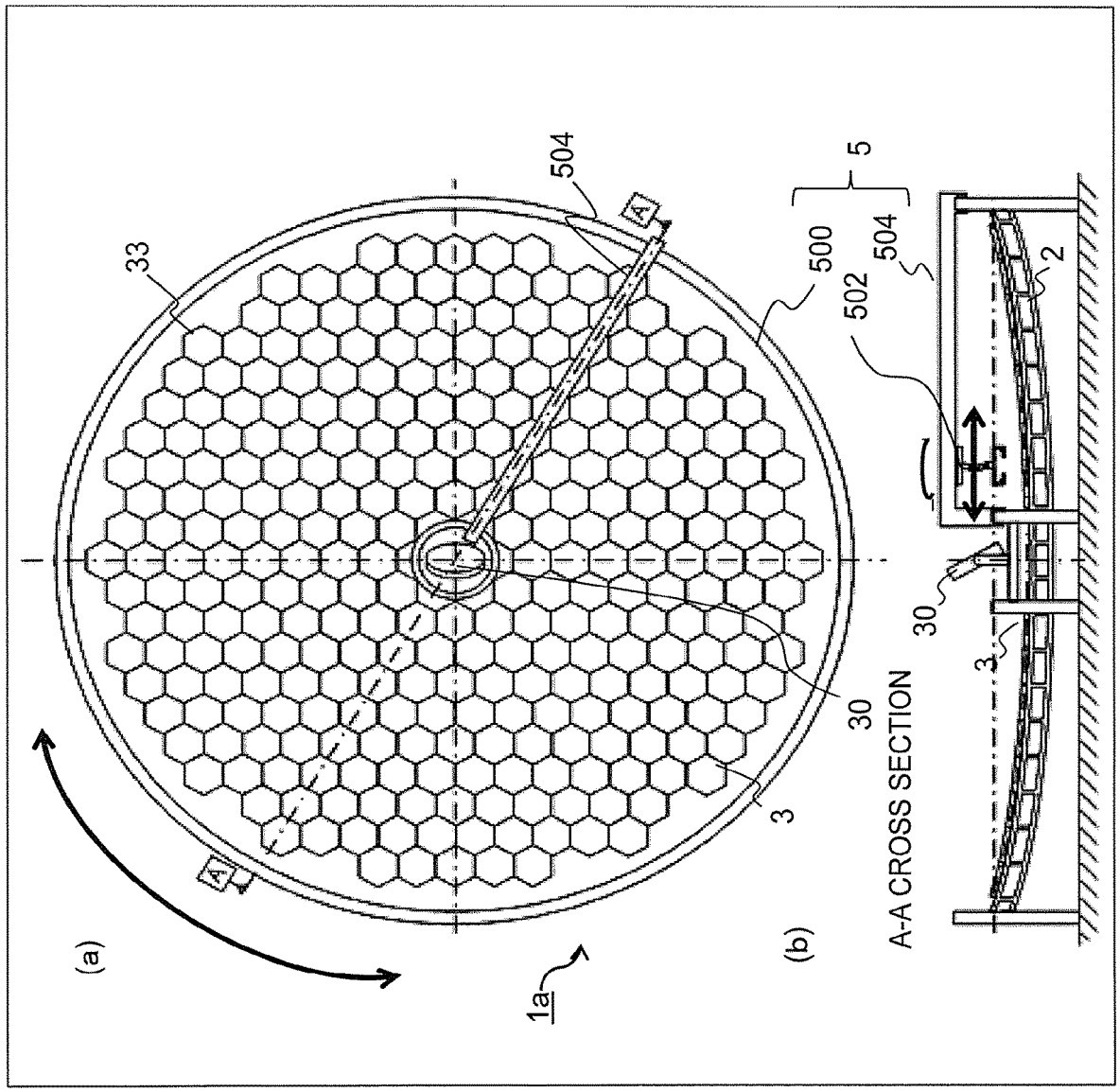
FIG. 23 are views for illustrating a whole configuration of a segmented mirror telescope provided with the mirror replacement device according to a sixth embodiment of the present disclosure.

FIG. 23 are views for illustrating a whole configuration of a segmented mirror telescope including the mirror replacement device according to a sixth embodiment of the present disclosure. FIG. 23A is a top view, and FIG. 23B is a sectional view taken along the line A-A in FIG. 23A. In FIG. 23, a rough linear half drive mechanism 504 is provided in a case in which a reflecting mirror 30 is provided in the center of the segmented primary mirror 33.

The rough linear drive mechanism 501 illustrated in FIG. 2 has a length equal to a diameter of the rough circular drive mechanism 500, specifically, the segmented primary mirror 33, whereas the rough linear half drive mechanism 504 has a length equal to an approximate radius of the rough circular drive mechanism 500, specifically, the segmented primary mirror 33. The rough circular drive mechanism 500 rotates the rough linear half drive mechanism 504 around the vertical axis in the center of the segmented primary mirror 33, which corresponds to an intersection between two one-dot chain lines in FIG. 23A.

According to the configuration described above, in addition to the effects of the embodiments described above, even when the reflecting mirror 30 is provided in the center of the segmented primary mirror 33, all the segment mirrors 3 can be replaced.

In a case of a configuration in which the rough linear half drive mechanism 504 has the same curvature as that of the segmented mirror telescope main body 2 in FIG. 23, a driving range of robots, specifically, the rough drive mechanism 5, the fine drive mechanism 7, and the gripping mechanism 6 can have smaller size.

Seventh Embodiment

Figure 24:
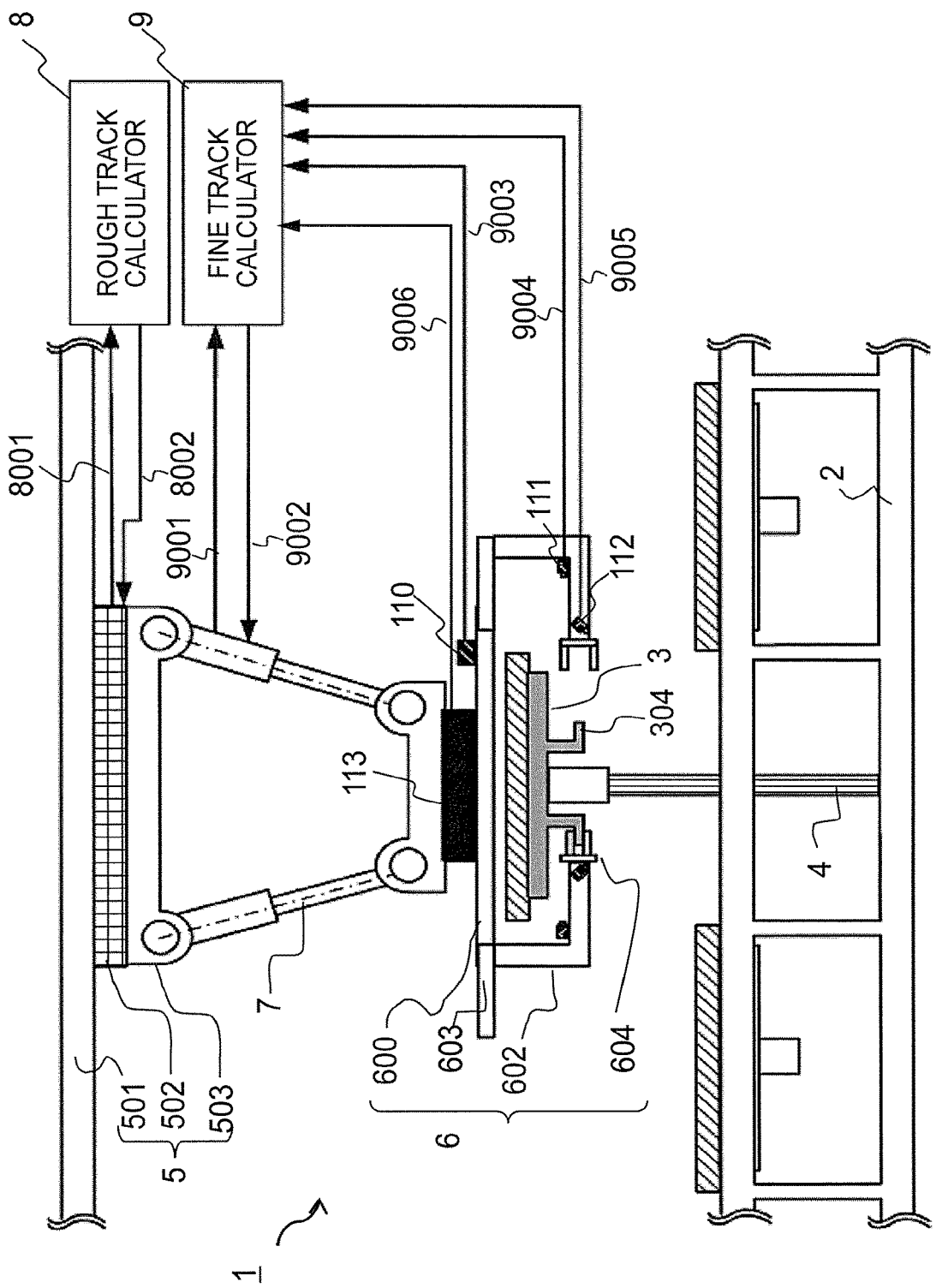
FIG. 24 is a view for illustrating a configuration of the mirror replacement device for a segmented mirror telescope according to a seventh embodiment of the present disclosure.

FIG. 24 is a view for illustrating a configuration of the mirror replacement device for a segmented mirror telescope according to a seventh embodiment of the present disclosure. In FIG. 24, for example, in the configuration according to the fifth embodiment described above, a six-axis force sensor 113 is provided at a portion to couple the fine drive mechanism 7 and the gripping mechanism base 600.

According to the configuration described above, in addition to the effects of the embodiments described above, a six-axis force sensor signal 9006 from the six-axis force sensor 113 is input to the rough track calculator 8, the fine track calculator 9, and other components of the mirror replacement controller 100. As a result, when the segment mirror 3 is mounted and removed, the load applied to the segment mirror 3 can be monitored. Thus, work can be performed without applying an unnecessary load to the segment mirror 3. For example, with a monitor (not shown) connected to the six-axis force sensor 113, when a significantly heavy load is applied, the operation can be manually stopped as an emergency event.

Eighth Embodiment

Figure 25:
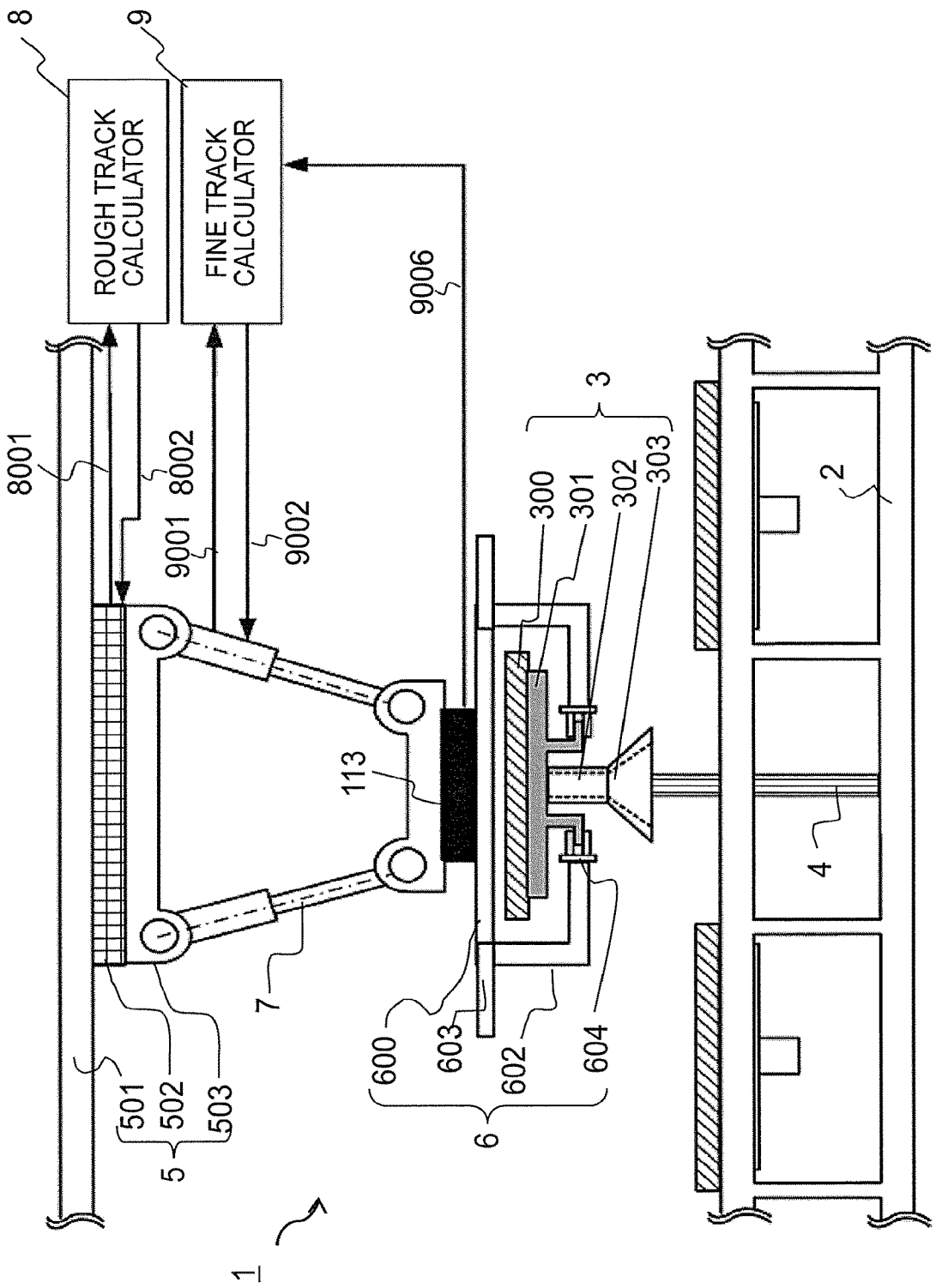
FIG. 25 a view for illustrating a configuration of the mirror replacement device for a segmented mirror telescope according to an eighth embodiment of the present disclosure.

FIG. 25 is a view for illustrating a configuration of the mirror replacement device for a segmented mirror telescope according to an eighth embodiment of the present disclosure. In FIG. 25, the bend measuring instrument 110, the gripping claw portion relative sensors 111, and the lift insertion portion relative sensors 112 are omitted, for example, from the configuration according to the seventh embodiment described above. An inner shape of the lift insertion portion 302 of the segment mirror 3 is a cylindrical shape as indicated by the dotted line in FIG. 25 so that the distal end of the lift mechanism 4 can be inserted. A lift contact tapered portion 303 is formed at a lower end of the lift insertion portion 302 so as to correct the relative positional error between the segment mirror 3 and the lift mechanism 4 based on the six-axis force sensor signal 9006 output from the six-axis force sensor 113. The inner shape is a tapered shape as indicated by the dotted line in FIG. 25. Specifically, at least an inner shape of the lift contact tapered portion 303 is a conical shape.

Figure 44:
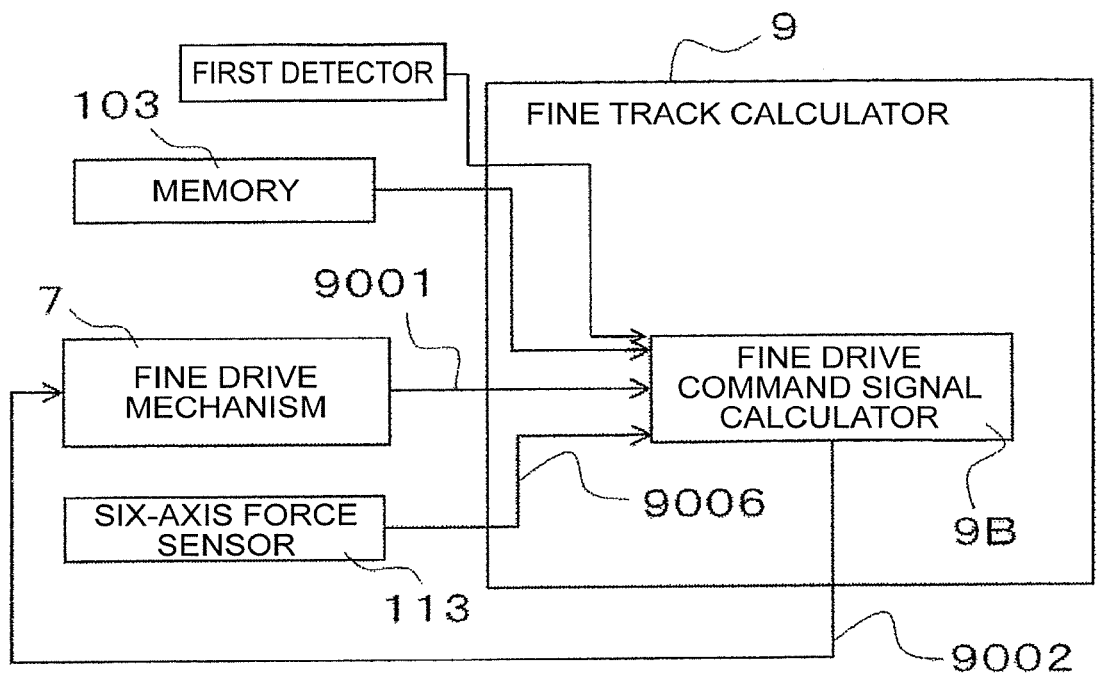
FIG. 44 is a diagram for illustrating a hardware configuration of the fine track calculator using the six-axis force sensor in the present disclosure.

FIG. 44 is a view for illustrating an example of a configuration of the fine track calculator 9 included in the eighth embodiment. The fine track calculator 9 is a portion of the mirror replacement controller 100 and includes the fine drive command signal calculator 9B. The fine drive command signal calculator 9B calculates the command signal for the fine drive mechanism 7 from a signal from the memory 103, a signal from the first detector, the fine drive sensor signal 9001 from the fine drive mechanism 7, and the signal 9006 output from the six-axis force sensor 113 and outputs the fine drive command signal 9002 to the fine drive mechanism 7.

Figure 41:
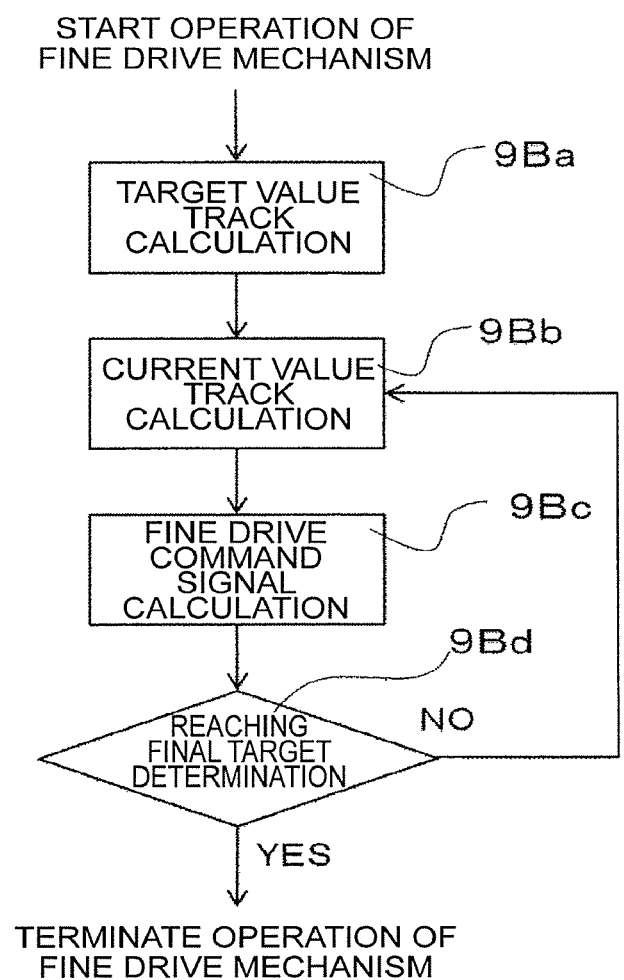
FIG. 41 is a flowchart of the fine track calculator using a six-axis force sensor in the present disclosure.

FIG. 41 is an example of a flowchart for illustrating a flow of processing performed by the fine track calculator 9 included in the eighth embodiment. In FIG. 41, first, in an initial state under which the fine drive mechanism starts an operation, Step 9Ba is executed. In Step 9Ba, the target value fine track calculation 9Ba is executed. Next, the processing proceeds to Step 9Bb where the current value fine track calculation 9Bb is executed. Next, the processing proceeds to Step 9Bc where the fine drive command signal calculation 9Bc is executed. Subsequently, the processing proceeds to Step 9Bd where the determination of reaching the target value for determining whether or not the fine drive mechanism 7 reaches the target value is executed. When the result of determination indicates that the fine drive mechanism 7 reaches the target value, this processing is ended. When the result of determination indicates that the fine drive mechanism 7 does not reach the target value, the processing returns to Step 9Bb to repeat the processing.

Specifically, in Step 9Ba, the fine track calculator 9 reads the target position and the target posture which are stored in the memory 103 and are programmed in advance, and calculates the target track from the target position and the target posture. In Step 9Bb, the fine track calculator 9 calculates the current position and the current posture (current value fine track) of the fine drive mechanism 7 from the fine drive sensor signal 9001. This value does not includes the bend of the structure, and hence is not a precise value in terms of the inertial space. When the segment mirror 3 and the lift mechanism 4 come into contact with each other due to an error for the amount of bend, the force is detected by the six-axis force sensor 113. In Step 9Bc, the command signal for the fine drive mechanism 7 is calculated so that the force detected by the six-axis force sensor 113 is reduced and is output as the fine drive command signal 9002. By this method, the positioning with high accuracy can be achieved.

FIG. 26 to FIG. 29 are views for illustrating an operation of mounting the segment mirror 3 provided in the outer peripheral region of the segmented primary mirror 33 to the lift mechanism 4 included in the mirror replacement device according to the eighth embodiment of the present disclosure.

Figure 26:
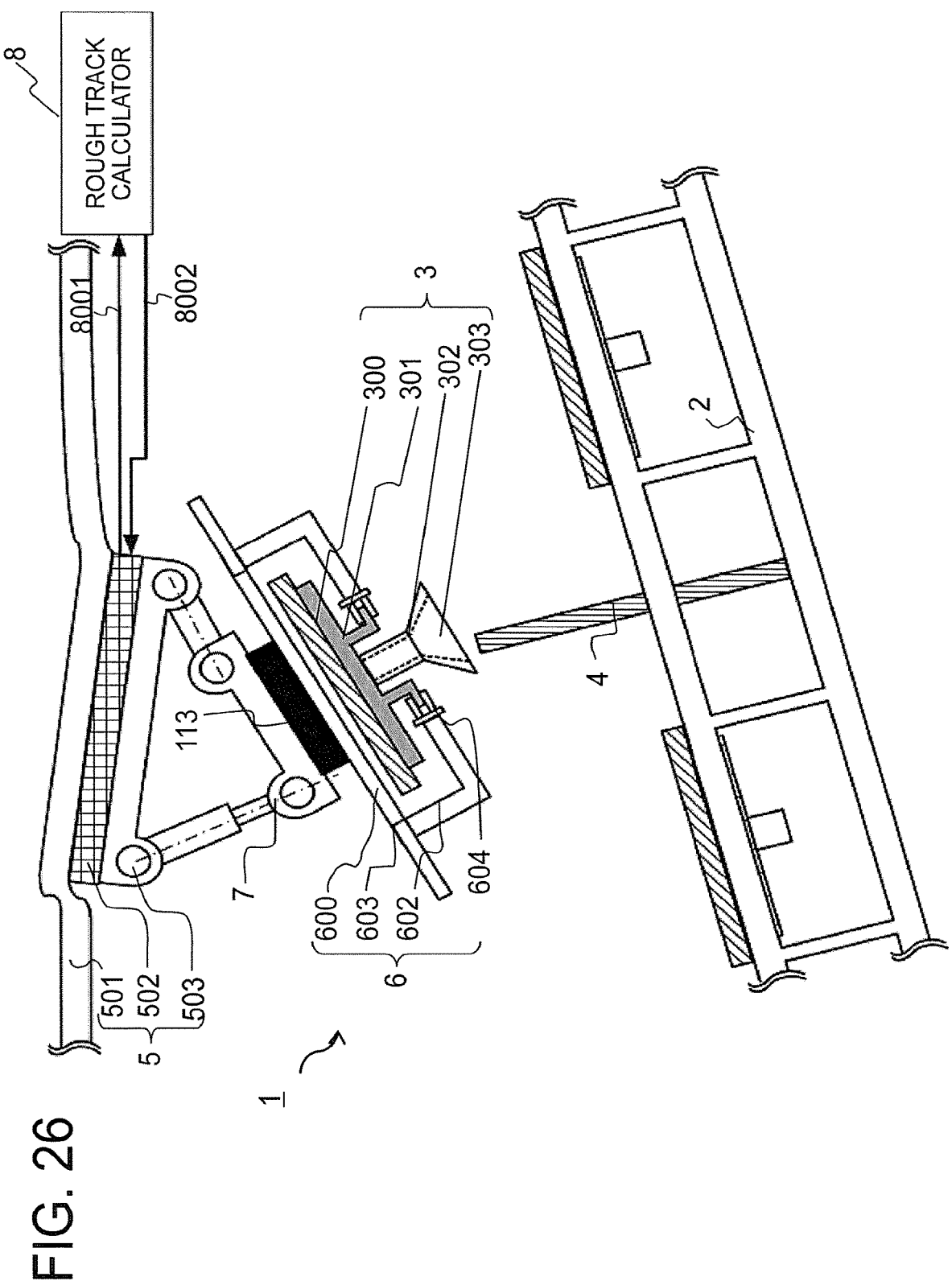
FIG. 26 is a view for illustrating the operation of mounting the segment mirror provided in the outer peripheral region of the segmented primary mirror to the lift mechanism of the mirror replacement device according to the eighth embodiment of the present disclosure.
Figure 27:
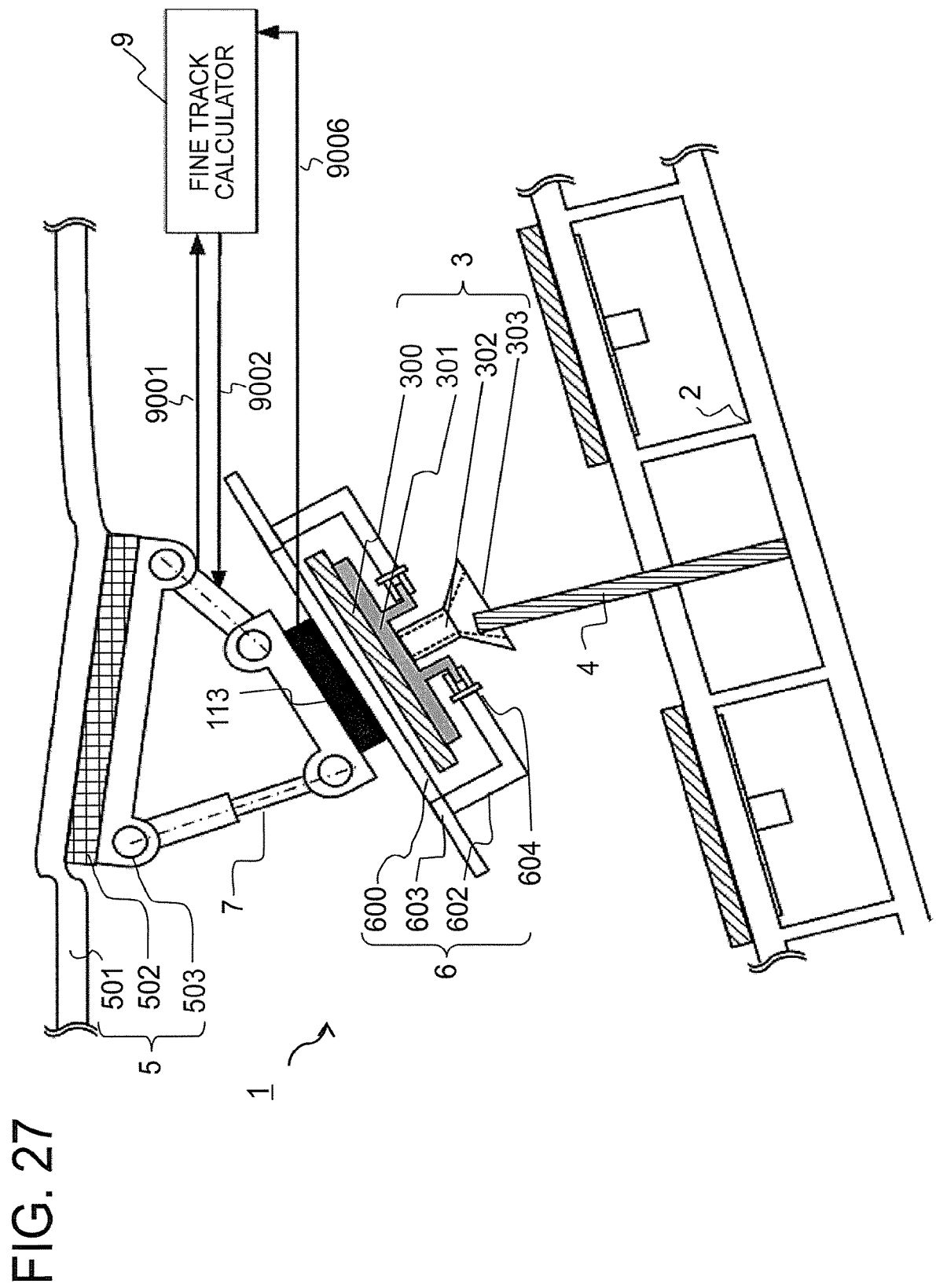
FIG. 27 is a view for illustrating the operation of mounting the segment mirror provided in the outer peripheral region of the segmented primary mirror to the lift mechanism of the mirror replacement device according to the eighth embodiment of the present disclosure.
Figure 28:
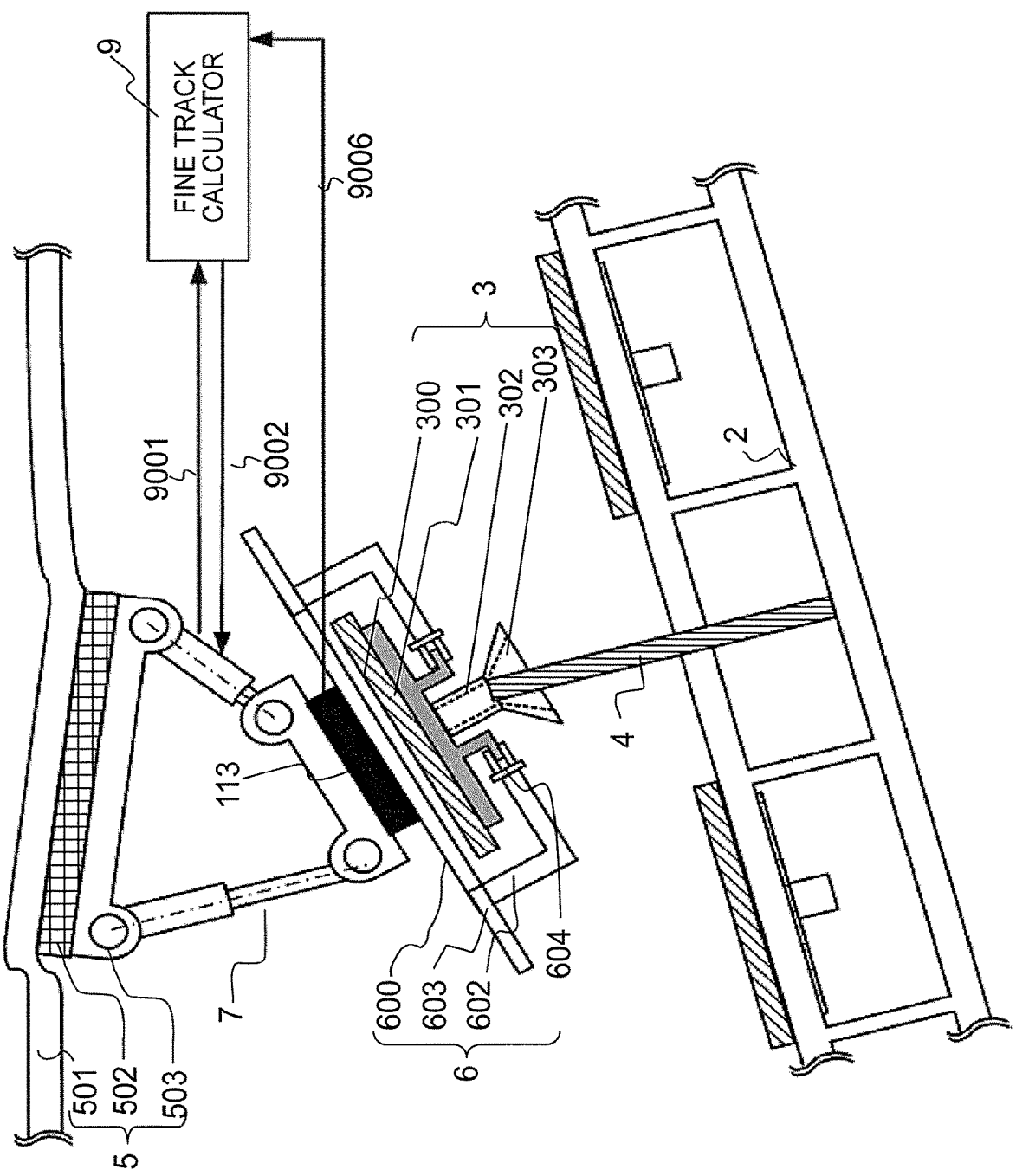
FIG. 28 is a view for illustrating the operation of mounting the segment mirror provided in the outer peripheral region of the segmented primary mirror to the lift mechanism of the mirror replacement device according to the eighth embodiment of the present disclosure.

For example, in a case in which there is a relative positional error between the segment mirror 3 and the lift mechanism 4 as illustrated in FIG. 26, when the segment mirror 3 is moved in a downward direction without correcting the relative positional error, the lift mechanism 4 comes into contact with the lift contact tapered portion 303 as illustrated in FIG. 27. At this time, the six-axis force sensor 113 measures a force pressed by the lift mechanism 4. The six-axis force sensor signal 9006 which is an output of the six-axis force sensor 113 is input to the fine track calculator 9. The fine track calculator 9 performs a track correction calculation so that the detected six-axis force sensor signal 9006 becomes smaller and outputs the fine drive command signal 9002 to the fine drive mechanism 7. As a result, as illustrated in FIG. 28, the relative positional error is corrected.

Figure 29:
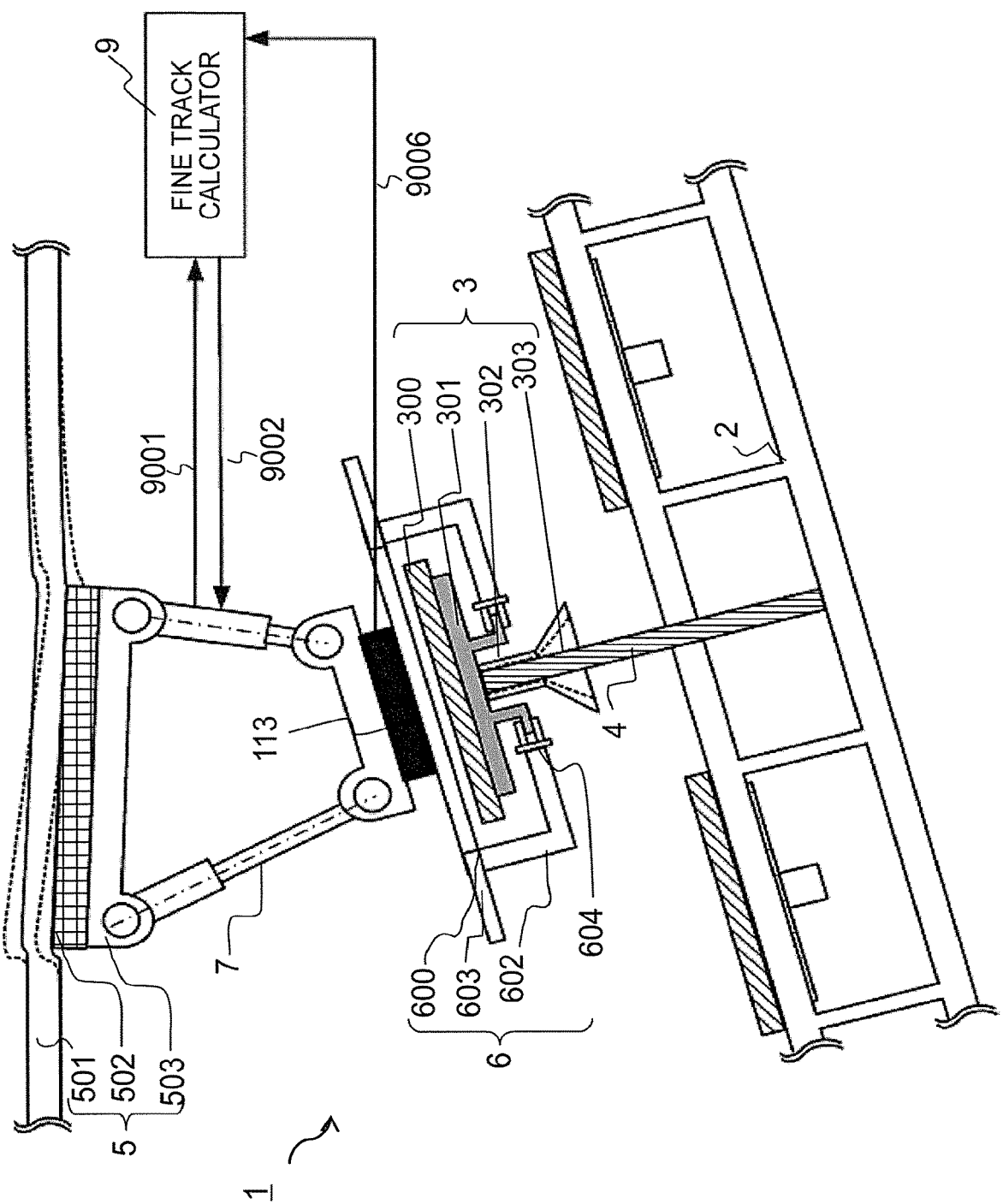
FIG. 29 is a view for illustrating the operation of mounting the segment mirror provided in the outer peripheral region of the segmented primary mirror to the lift mechanism of the mirror replacement device according to the eighth embodiment of the present disclosure.

Next, in a case in which there is a relative posture error between the segment mirror 3 and the lift mechanism 4, when the segment mirror 3 is further moved down, the distal end portion of the lift mechanism 4 and an inner wall of a cylindrical portion of the lift insertion portion 302 come into contact with each other. The six-axis force sensor signal 9006 output from the six-axis force sensor 113 at this time, is input to the fine track calculator 9. The fine track calculator 9 performs the track correction calculation so that the detected six-axis force sensor signal becomes smaller and outputs the fine drive command signal 9002 to the fine drive mechanism 7. As a result, as illustrated in FIG. 29, the relative posture error is corrected, and hence the load of the segment mirror 3 is transferred from the gripping mechanism 6 to the lift mechanism 4. In the operation illustrated in FIG. 26 to FIG. 29, as described in the first embodiment, depending on a load change caused by the offset of the position of the center of gravity of the gripping mechanism 6 and the transfer of the load of the segment mirror 3 to the lift mechanism 4, the bend occurring in the rough drive mechanism base 503 or the fine drive mechanism 7 varies. However, feedback control based on the six-axis force sensor signal 9006 output from the six-axis force sensor 113 is continuously performed during the operation. Therefore, the influence of the variation in bend is also corrected in the process of correcting the positional error and the posture error.

Specifically, during the operation illustrated in FIG. 26 to FIG. 29, the posture of the gripping mechanism 6 is controlled so as to become gradually orthogonal to the lift mechanism 4.

Figure 30:
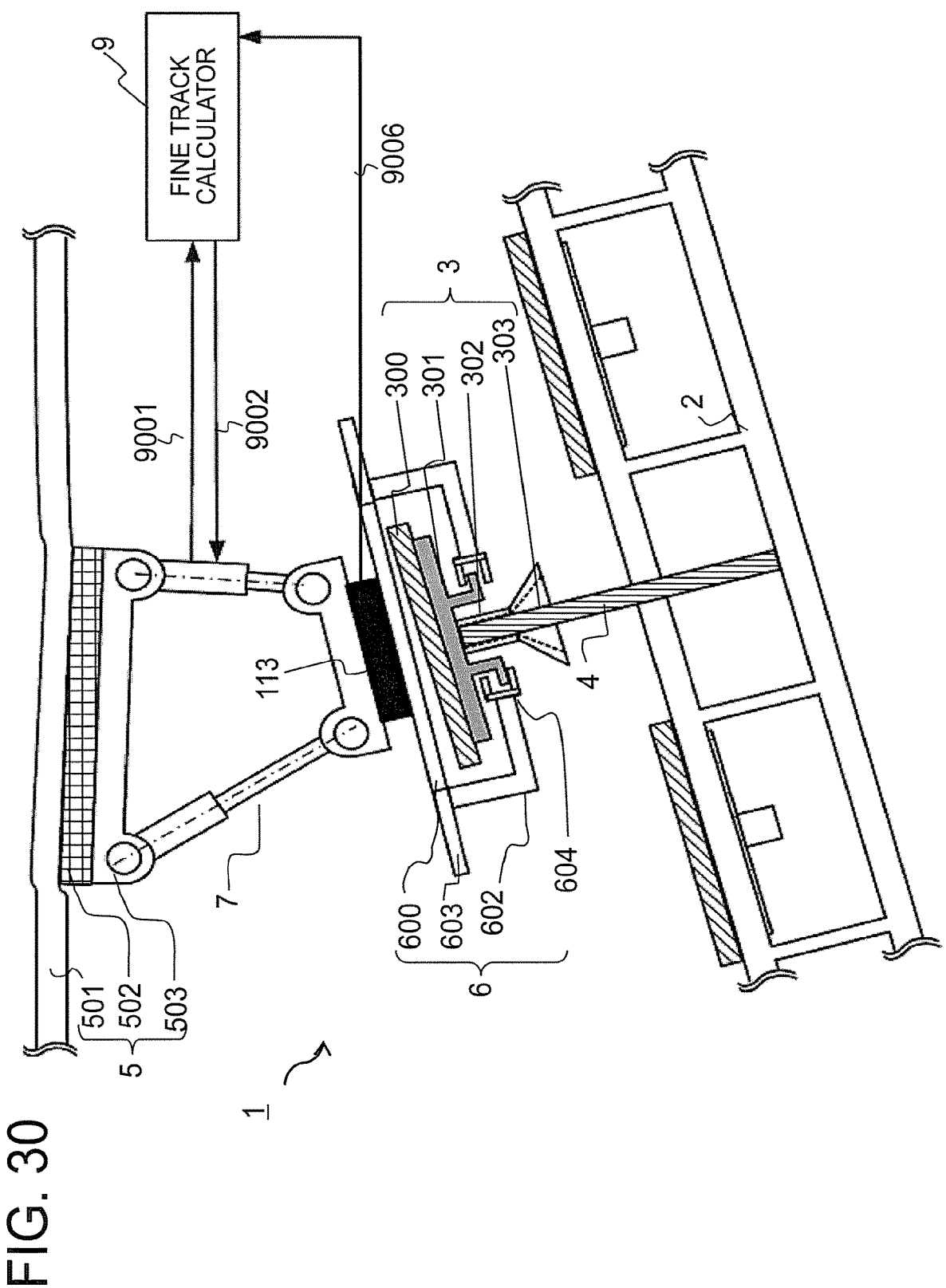
FIG. 30 is a view for illustrating the operation of removing the segment mirror provided in the outer peripheral region of the segmented primary mirror from the lift mechanism of the mirror replacement device according to the eighth embodiment of the present disclosure.
Figure 31:
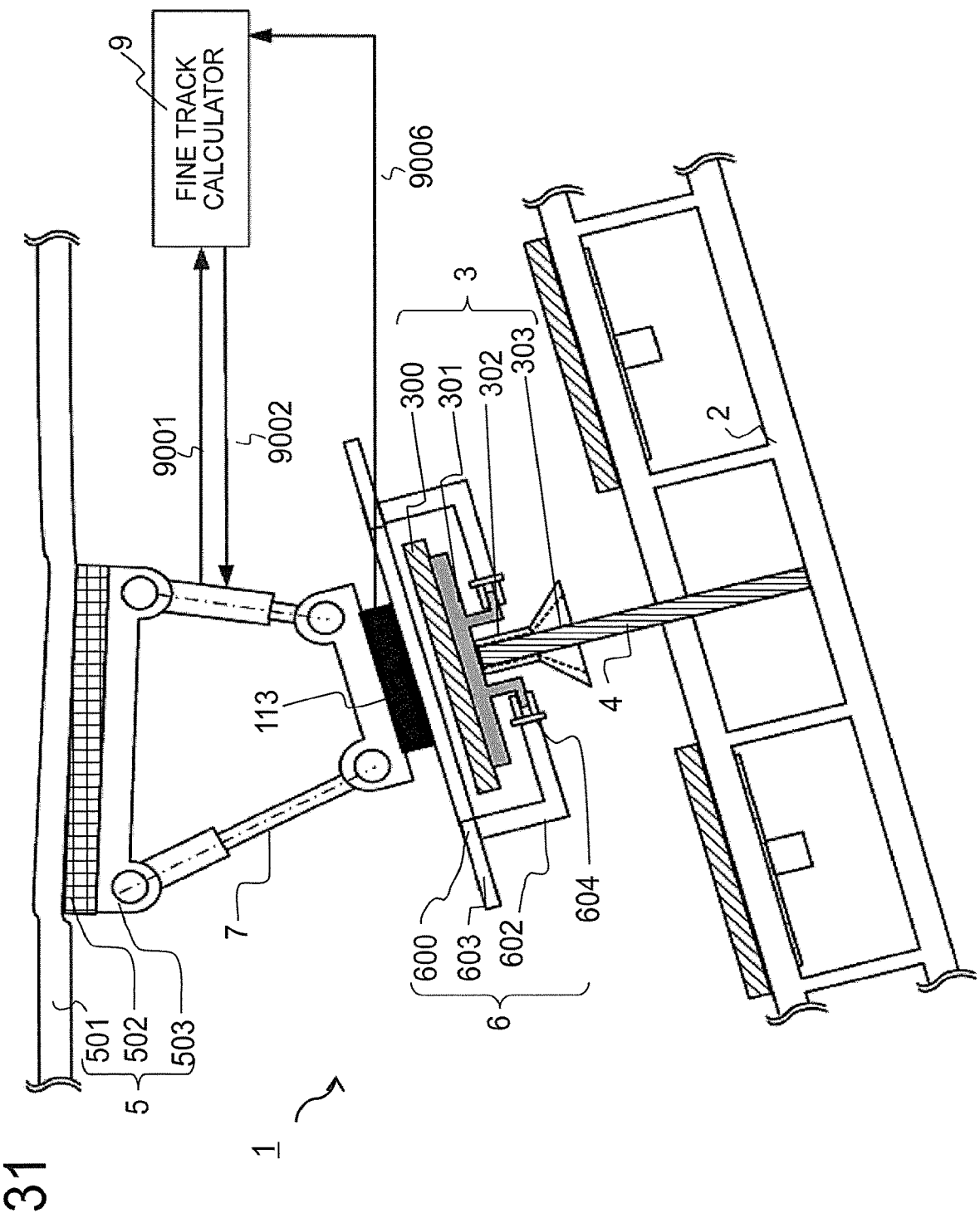
FIG. 31 is a view for illustrating the operation of removing the segment mirror provided in the outer peripheral region of the segmented primary mirror from the lift mechanism of the mirror replacement device according to the eighth embodiment of the present disclosure.
Figure 32:
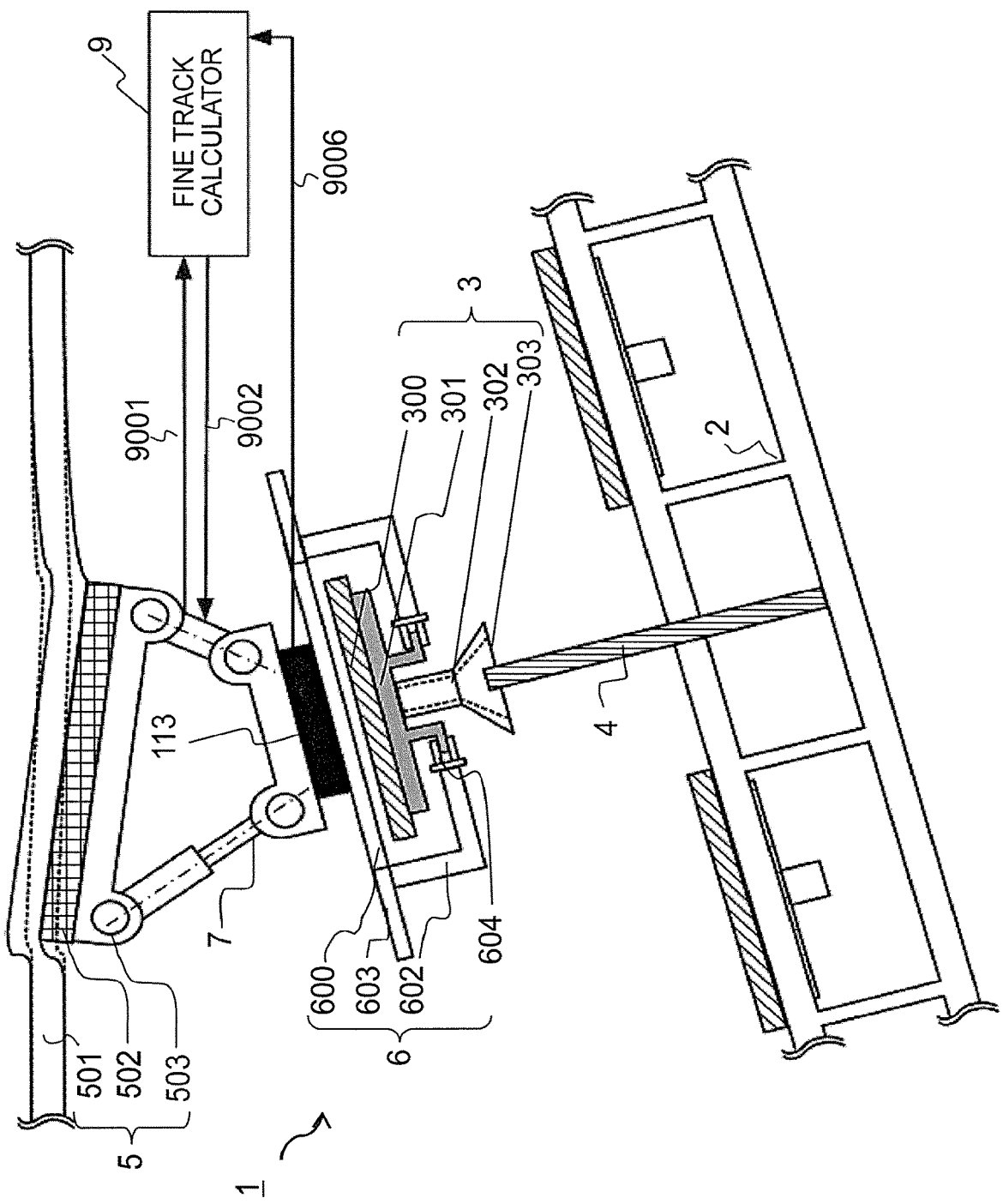
FIG. 32 is a view for illustrating the operation of removing the segment mirror provided in the outer peripheral region of the segmented primary mirror from the lift mechanism of the mirror replacement device according to the eighth embodiment of the present disclosure.

FIG. 30 to FIG. 32 are views for illustrating an operation of removing the segment mirror 3 provided in the outer peripheral region of the segmented primary mirror 33 from the lift mechanism 4 included in the mirror replacement device according to the eighth embodiment of the present disclosure.

For example, in a case in which there is a relative posture error between the gripping claw portions 602 and the segment mirror 3 mounted to the lift mechanism 4 as illustrated in FIG. 30, when the gripping claw portions 602 are moved in an upward direction without correcting the relative posture error, one of the gripping claw portions 602 comes into contact with the mirror gripped portion 301. At this time, the six-axis force sensor 113 measures the force pressed by the mirror gripped portion 301, and the six-axis force sensor signal 9006 being an output thereof is input to the fine track calculator 9. The fine track calculator 9 performs the track correction calculation so that the detected six-axis force sensor signal becomes smaller and outputs the fine drive command signal 9002 to the fine drive mechanism 7. As a result, as illustrated in FIG. 31, the relative posture error between the gripping claw portions 602 and the segment mirror 3 is corrected so that all the gripping claw portions 602 and the gripping projections 304 of the mirror gripped portion 301 are equally subjected to the load.

Next, the gripping claw portions 602 are raised in a vertically upward direction of the lift mechanism 4 to transfer the load of the segment mirror 3 from the lift mechanism 4 to the gripping claw portions 602 in a well-balanced manner. As a result, as illustrated in FIG. 32, the segment mirror 3 is removed from the lift mechanism 4. In the operation illustrated in FIG. 30 to FIG. 32, as described in the first embodiment, depending on a moment change caused by the offset of the position of center of gravity of the gripping mechanism 6 and the transfer of the load of the segment mirror 3 from the lift mechanism 4 to the gripping claw portions 602, the bend occurring in the rough drive mechanism base 503 or the fine drive mechanism 7 varies. However, the feedback control based on the six-axis force sensor signal 9006 output from the six-axis force sensor 113 is continuously performed during the operation. Therefore, the influence of the variation in bend is also corrected in the process of correcting the positional error and the posture error.

Specifically, in the operation illustrated in FIG. 30 to FIG. 32, the posture of the gripping mechanism 6 is controlled so as to become orthogonal to the lift mechanism 4 gradually.

According to the configuration described above, in addition to the effects of the seventh embodiment, the number of constituent sensors can be reduced, while the positioning with high accuracy can be automatically achieved without using the relative sensor which is liable to be affected by an external environment. Further, even when an elastic deformation occurs due to the transfer of the load of the segment mirror 3 under the influence of the stiffness of the lift mechanism 4, the segmented mirror telescope main body 2, the rough drive mechanism 5, the fine drive mechanism 7, and other portions, the influence of the elastic deformation is detected by the six-axis force sensor 113. Thus, the influence of the elastic dethrmation described above can also be corrected.

Ninth Embodiment

Figure 33:
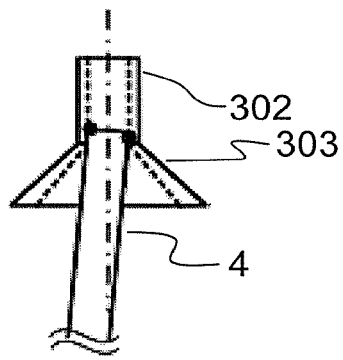
FIG. 33 is a view for illustrating correction of a relative posture error between the segment mirror and the lift mechanism by the mirror replacement device for a segmented mirror telescope according to a ninth embodiment of the present disclosure.
Figure 34:
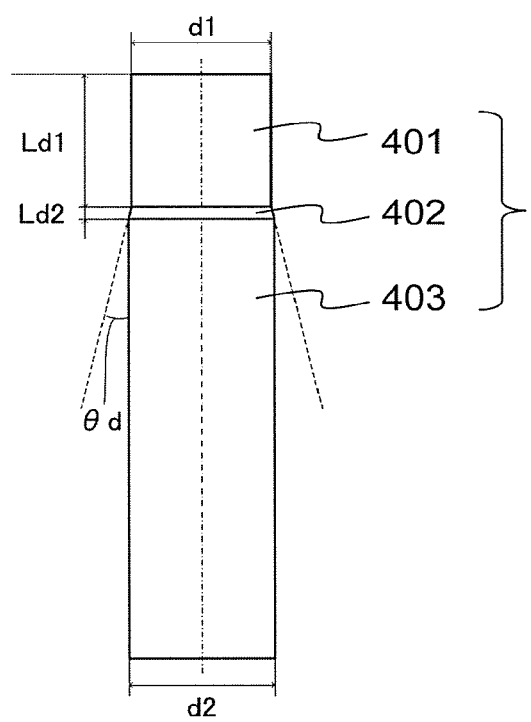
FIG. 34 is a view for illustrating the correction of the relative posture error between the segment mirror and the lift mechanism by the mirror replacement device for a segmented mirror telescope according to the ninth embodiment of the present disclosure.

FIG. 33 to FIG. 36 are views for illustrating the correction of the relative posture error between the segment mirror and the lift mechanism in the mirror replacement device for the segmented mirror telescope according to a ninth embodiment of the present disclosure. In FIG. 34, the shape of the lift mechanism 4 is not a simple column and is devised to facilitate force control. In order to facilitate the insertion of the distal end of the lift mechanism 4 into the lift insertion portion 302 of the segment mirror 3, a gap, specifically, a clearance between the distal end of the lift mechanism 4 and an inner wall of the lift insertion portion 302 is required to be increased. In particular, in the case of the segment mirror 3 provided in the outer peripheral region of the segmented primary mirror 33, an axial direction of the lift mechanism 4 is not the vertical direction. Therefore, it is important to provide the clearance. When the lift mechanism 4 has a simple columnar shape, the clearance cannot be increased.

With a small clearance, when there is the relative posture error between the segment mirror 3 and the lift mechanism 4 as illustrated in FIG. 33, the segment mirror 3 contacts with the lift mechanism 4 at two points, each indicated by the solid circle. In this case, a sign of the force or the moment detected by the six-axis force sensor 113 is easily inverted depending on a contact condition at each of the points. Therefore, for correcting the relative posture error, work of searching a direction of the rotary axis of each of the movable portions, particularly the fine drive mechanism 7, in which the output from the six-axis force sensor 113 becomes smaller by rotating in a clockwise direction and a counterclockwise direction is required for each time. Therefore, time required for mounting disadvantageously increases.

Figure 35:
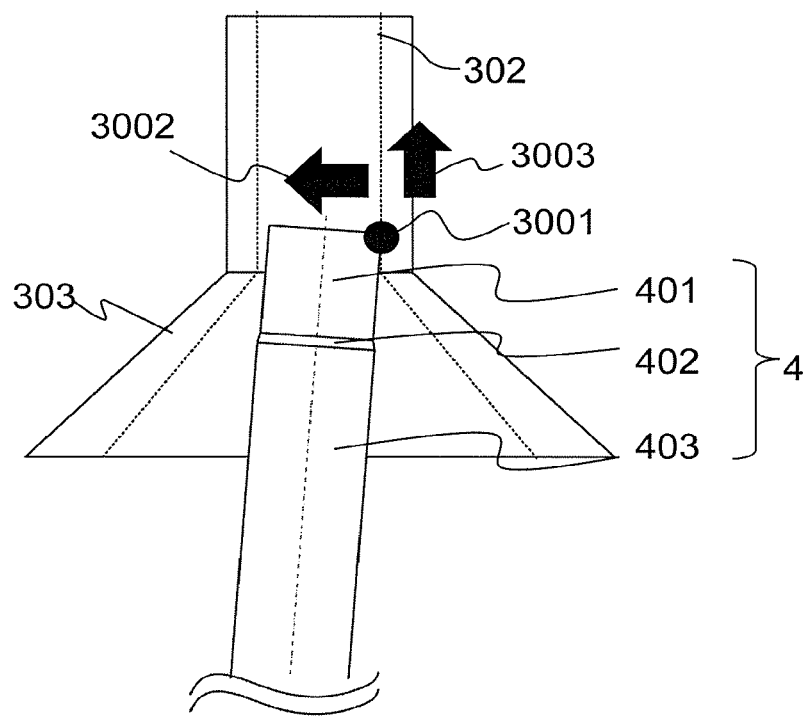
FIG. 35 is a view for illustrating the correction of the relative posture error between the segment mirror and the lift mechanism by the mirror replacement device for a segmented mirror telescope according to the ninth embodiment of the present disclosure.
Figure 36:
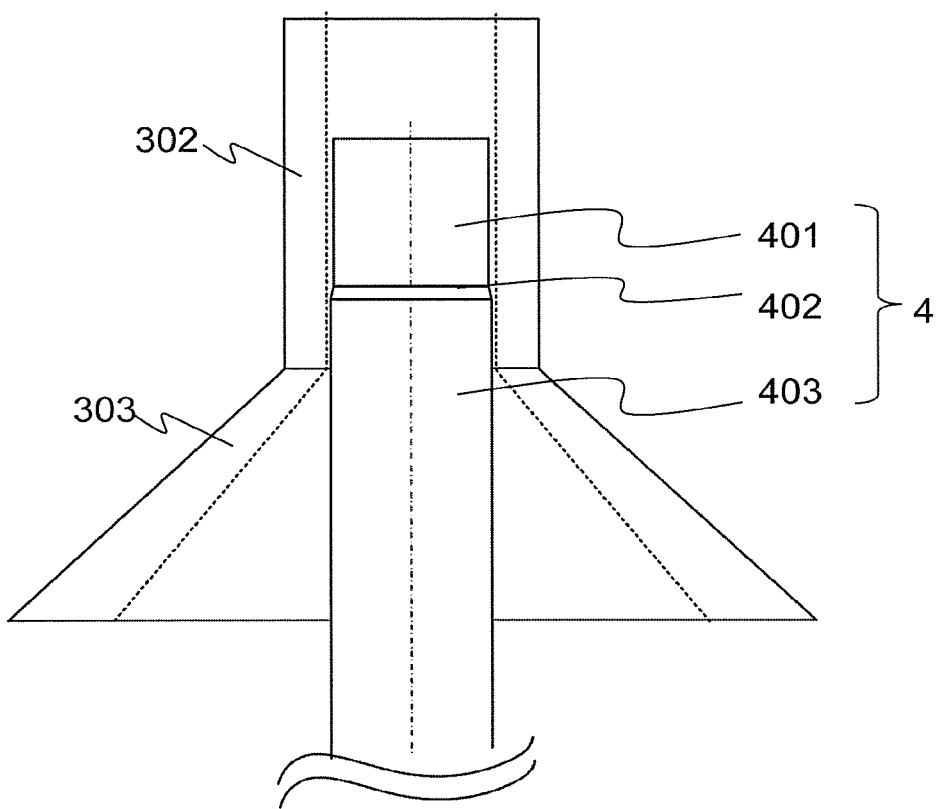
FIG. 36 is a view for illustrating the correction of the relative posture error between the segment mirror and the lift mechanism by the mirror replacement device for a segmented mirror telescope according to the ninth embodiment of the present disclosure.

The lift mechanism 4 illustrated in FIG. 34 according to the present disclosure includes a lift mechanism small columnar portion 401, a lift mechanism large columnar portion 403, and a lift mechanism tapered portion 402. In the case of this lift mechanism 4, the clearance is large for the lift mechanism small columnar portion 401 as illustrated in FIG. 35. Therefore, even when there is a relative posture error between the segment mirror 3 and the lift mechanism 4, a posture error correction is performed under a condition in which the contact is made at one point 3001. At this time, the fine track calculator 9 performs the posture error correction while performing pressing control so as to apply a constant load 3002 to the contact point 3001. At a time at which a direction of a reaction force 3003 in the vertical direction by the segment mirror 3 is inverted from the upper direction, the posture error is successfully corrected. After the posture error is successfully corrected, the segment mirror 3 is further pressed in the axial direction of the lift mechanism 4 as illustrated in FIG. 36 to correct the relative posture error remaining between the segment mirror 3 and the lift mechanism 4.

An operation in which the detection signals output from the bend measuring instrument 110, the gripping claw portion relative sensors 111, and the lift insertion portion relative sensors 112 are replaced with the detection signal output from the six-axis force sensor 113 is performed in the same way as in the eighth embodiment described above.

According to the configuration described above, in addition to the effects of the embodiments described above, an effect of efficiently performing the work for correcting the posture error, which otherwise takes long time, can be obtained.

Tenth Embodiment

Figure 37:
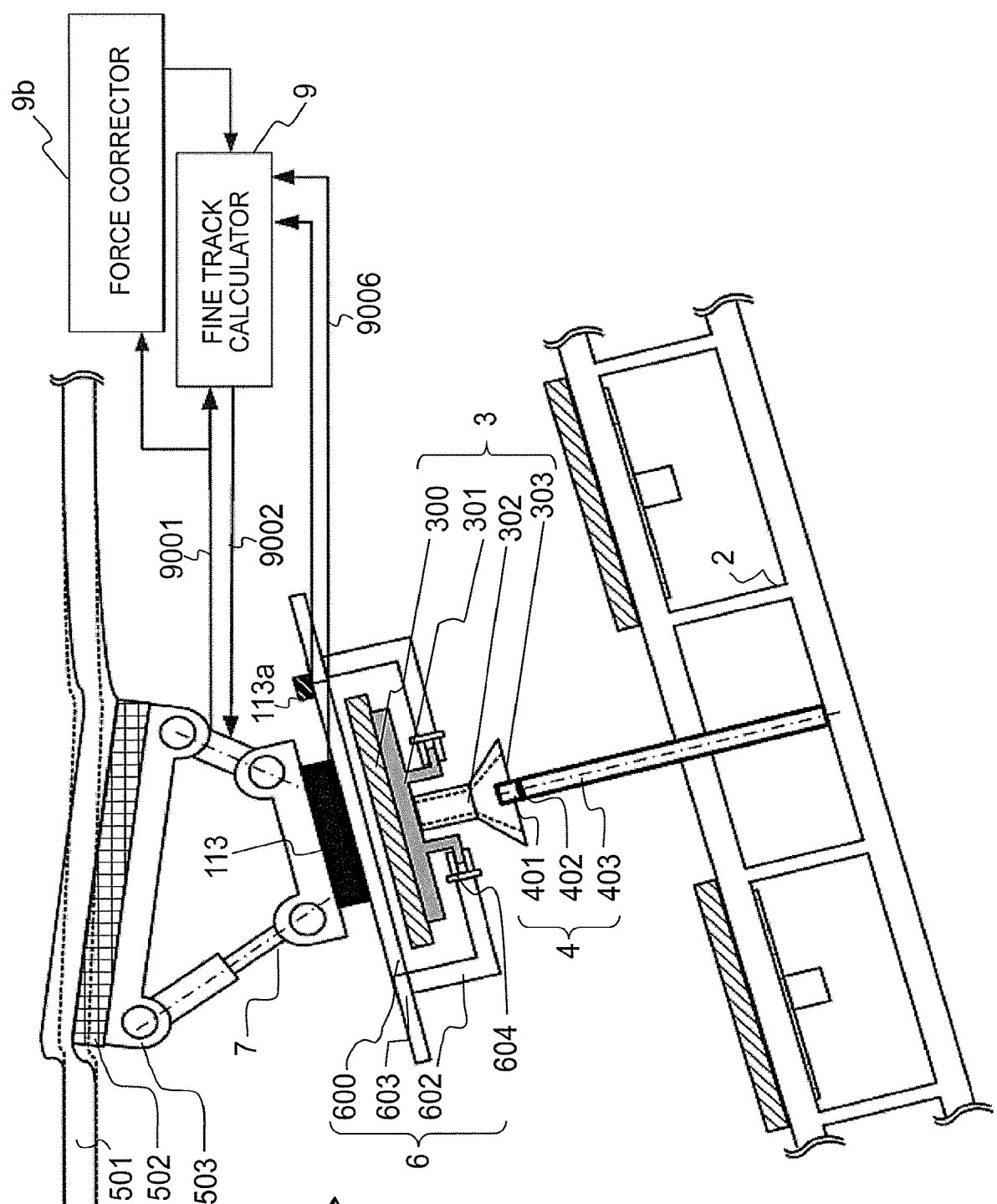
FIG. 37 is a view for illustrating a configuration of the mirror replacement device for a segmented mirror telescope according to a tenth embodiment of the present disclosure.

FIG. 37 is a view for illustrating a configuration of the mirror replacement device for a segmented mirror telescope according to a tenth embodiment of the present disclosure. In FIG. 37, the mirror replacement controller 100 illustrated in FIG. 38 includes the force corrector 9b to obtain and to correct a force change generated when the posture error is corrected in the ninth embodiment or the other embodiments by a calculation using a gravitational force detection sensor 113a and a model including a weight and a pre-measured position of center of gravity of a robot itself, the load and a position of center of gravity of the mirror, a relative position between the robot and the mirror, and the like. For example, the model which is measured in advance is stored in the memory 103. The force change is calculated based on an output from the gravitational force detection sensor 113a and the model in accordance with the performing correction of the posture error to perform the correction.

Figure 45:
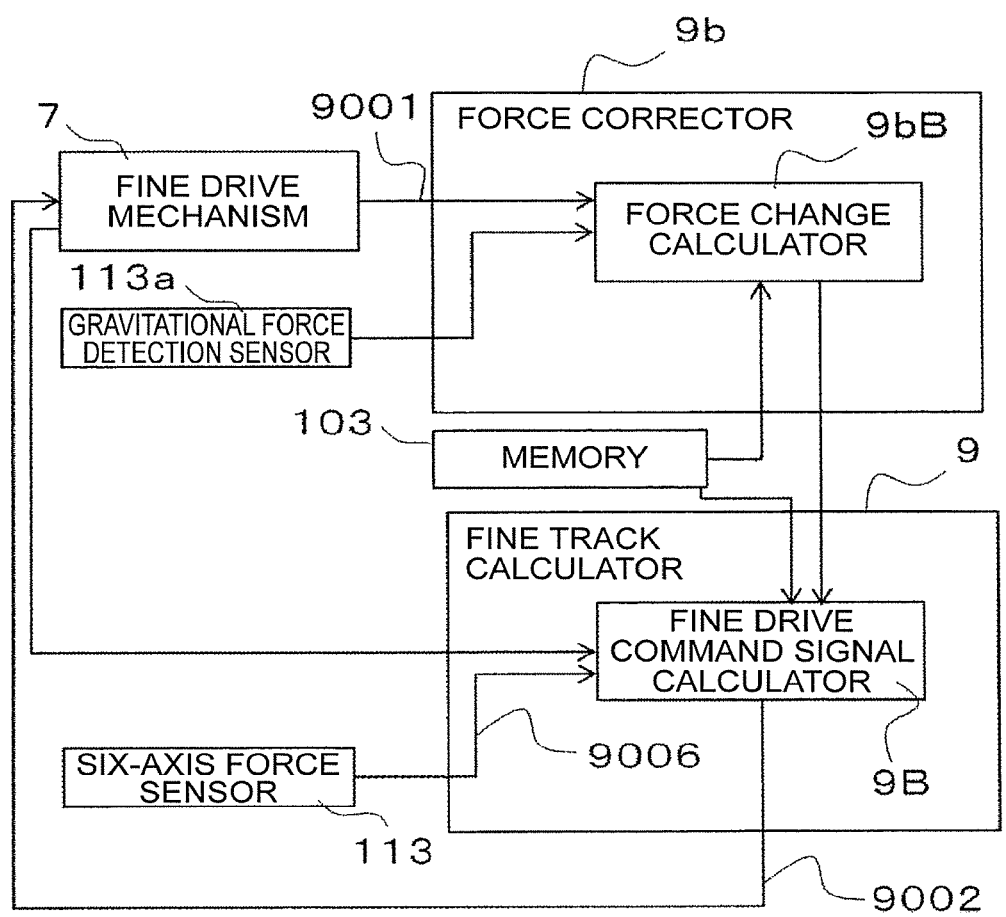
FIG. 45 is a diagram for illustrating a hardware configuration of the fine track calculator using the relative position and posture sensor, the bend measuring instrument, and the six-axis force sensor in the present disclosure.

FIG. 45 is a view for illustrating a configuration example of the force corrector 9b and the fine track calculator 9 included in the tenth embodiment. The force corrector 9b includes a force change calculator 9bB. The force change calculator 9bB is connected to the memory, the fine drive mechanism 7, and the gravitational force detection sensor 113a and calculates a force change from information therefrom. The fine track calculator 9 includes the fine drive command signal calculator 9B. The fine drive command signal calculator 9B uses, for calculating the command signal for the fine drive mechanism 7, the force change calculated by the force change calculator 9bB as an input in addition to the signal from the memory 103, the signal from the first detector, the fine drive sensor signal 9001 output from the fine drive mechanism 7, and the signal 9006 output from the six-axis force sensor 113 as in the eighth embodiment. The fine drive command signal calculator 9B calculates and outputs the fine drive command signal 9002 to the fine drive mechanism 7. In this case, the bend measuring instrument 110 may be used in place of the gravitational force detection sensor 113a.

According to the configuration described above, the force disadvantageously generated when the posture error is corrected can be corrected. Thus, the positioning with higher accuracy can be achieved.

Eleventh Embodiment

In each of the embodiments described above, the bend of the rough drive mechanism 5 and the bend of the fine drive mechanism 7 are taken into consideration. However, the segmented mirror telescope main body 2 of the segmented mirror telescope 1a has a similar problem. In the eleventh embodiment, as conceptually illustrated in FIG. 38, a segment mirror side bend measuring instrument 110a composing a fourth detector to detect a bend of the segmented mirror telescope main body 2 is mounted to the segmented mirror telescope main body 2. As a result, under determined conditions such as when the segment mirror 3 is mounted to the lift mechanism 4 or removed from the lift mechanism 4 or when the segment mirror 3 having the perpendicular axis inclined with respect to the vertical direction is replaced, the command signal is output to the fine drive mechanism 7 in accordance additionally with a detection signal output from the segment mirror side bend measuring instrument 110a. As a result, the positioning of the segment mirror with further higher accuracy is accomplished.

Twelfth Embodiment

In each of the embodiments described above, the rough drive mechanism 5 includes the rough drive brake mechanism 5a and the rough drive automatic locking mechanism 5b, and the fine drive mechanism 7 includes the fine drive brake mechanism 7a and the fine drive automatic locking mechanism 7b. In the twelfth embodiment, as conceptually illustrated in FIG. 38, the gripping mechanism 6 also includes a gripping mechanism brake mechanism 6a and a gripping mechanism automatic locking mechanism 6b.

The gripping mechanism brake mechanism 6a applies the brake to the movable portion of the gripping mechanism 6 to fix the movable portion except when the movable portion of the gripping mechanism 6 is being operated in accordance with the command signal. The gripping mechanism automatic locking mechanism 6b maintains the movable portion under a state specified by the command signal so as not to be moved by an external force except when the movable portion of the gripping mechanism 6 is being operated in accordance with the command signal. By this method, even when an earthquake occurs, the oscillation of the segment mirror can be reduced.

Thirteenth Embodiment

In the thirteenth embodiment, it is described about the mirror replacement device for a segmented mirror telescope to mount and to remove the segment mirror 3 while controlling the fine drive mechanism 7 with high accuracy using the first detector (111, 112), the second detector (bend measuring instrument 110), the six-axis force sensor 113, and the gravitational force detection sensor 113*a*. The same names and symbols as those used in the embodiments described above are used for the components and portions in the thirteenth embodiment unless otherwise noted.

Figure 46:
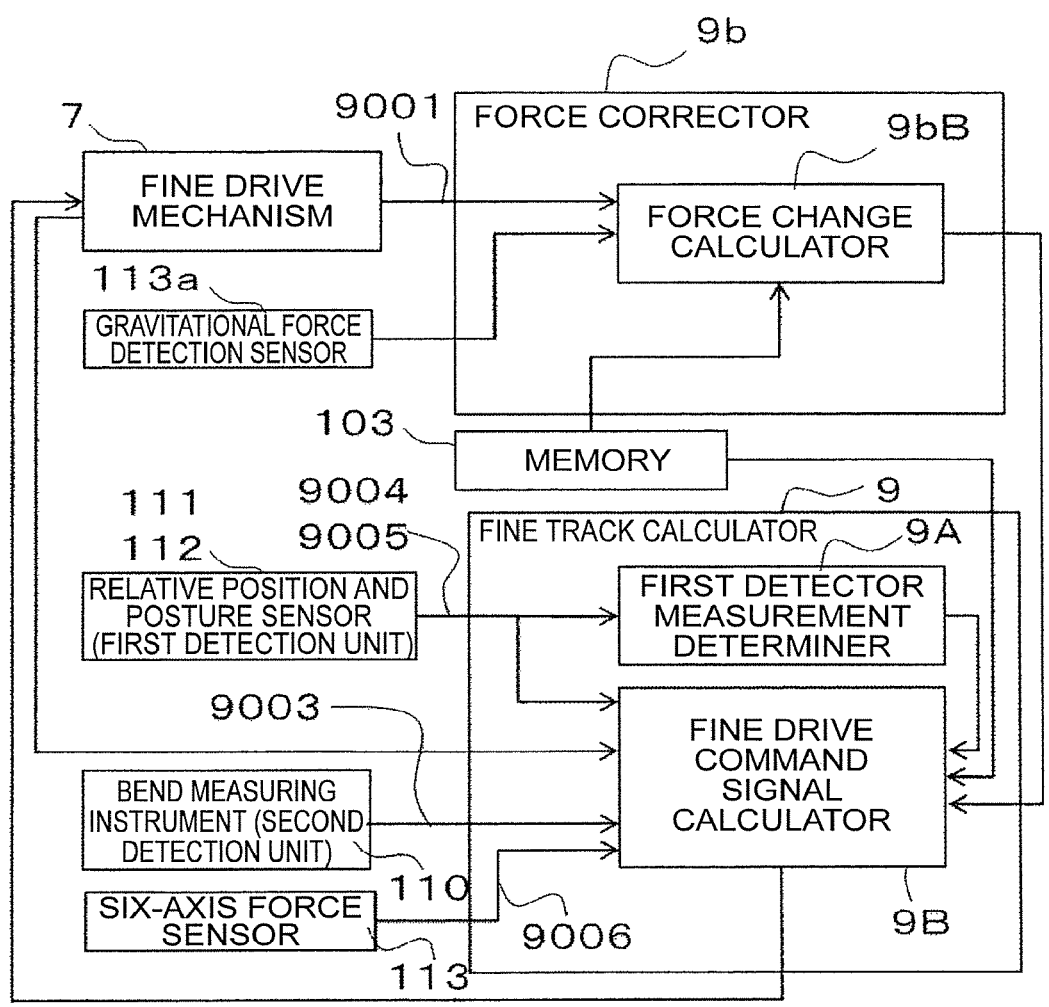
FIG. 46 is a diagram for illustrating a hardware configuration of the fine track calculator using the relative position and posture sensor, the bend measuring instrument, the six-axis force sensor, and a gravitational force detection sensor in the present disclosure.

FIG. 46 is a view for illustrating a hardware configuration of the mirror replacement controller 100 using the relative position and posture sensor (111, 112), the bend measuring instrument 110, the six-axis force sensor 113, and the gravitational force detection sensor 113*a*, specifically, the fine track calculator 9 and the force corrector 9*b* of the thirteenth embodiment. In FIG. 46, the force corrector 9*b* includes the force change calculator 9bB to calculate the three change. The force change calculator 9bB calculates the force change by using information from the memory 103, the fine drive sensor signal 9001 from the fine drive mechanism 7, and information output from the gravitational force detection sensor 113*a* as an input. The fine track calculator 9 includes the first detector measurement determiner 9A to determine whether or not the first detector can successfully perform the measurement and the fine drive command signal calculator 9B to compute the fine drive command signal. The first detector measurement determiner 9A determines whether or not the first detector (111, 112) can successfully perform the measurement by using the gripping claw portion relative sensor signal 9004 or the lift insertion portion relative sensor signal 9005 from the first detector (111, 112) as an input and outputs the result to the fine drive command signal calculator 9B. The fine drive command signal calculator 9B calculates the fine drive command signal 9002 for the fine drive mechanism 7 using the information in the memory 103, the fine drive sensor signal 9001 output from the fine drive mechanism 7, the signal (9005) output from the first detector, the signal 9003 output from the second detector, the six-axis force sensor signal 9006, a result of calculation by the force change calculator 9bB, and a result of determination by the first detector measurement determiner 9A as an input. The fine drive command signal calculator 9B outputs the same to the fine drive mechanism 7.

Figure 42:
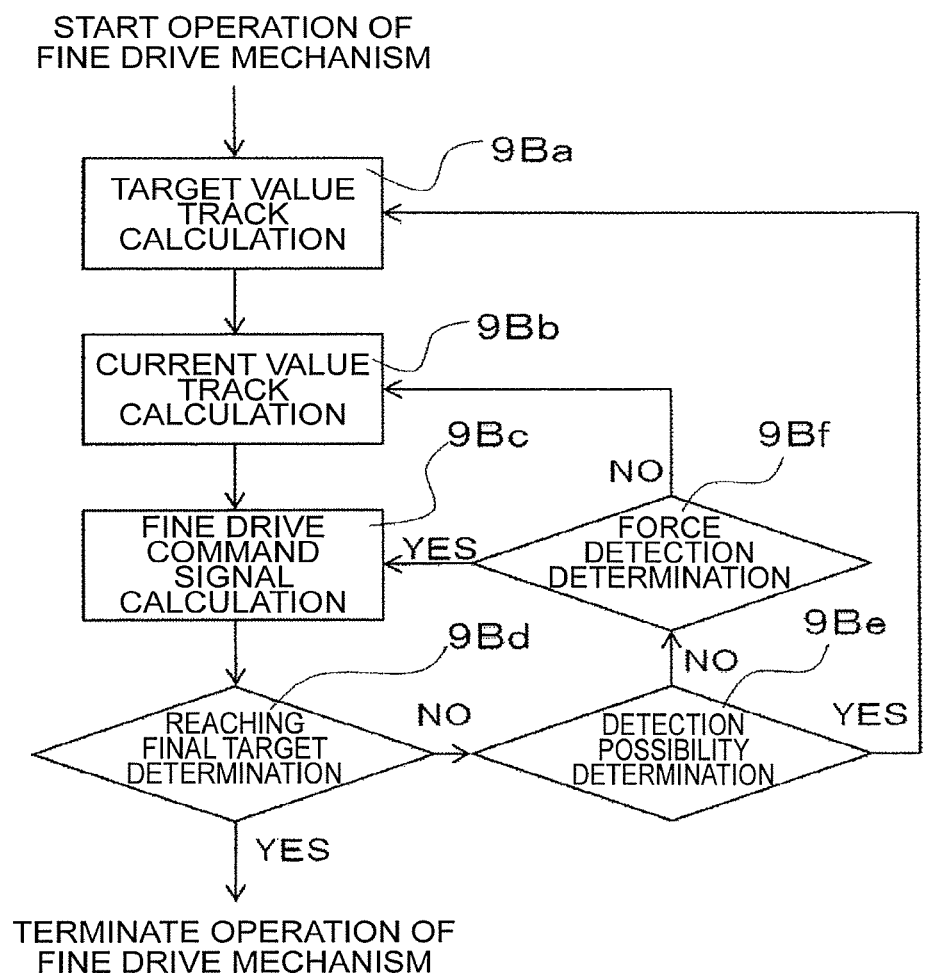
FIG. 42 is a flowchart of the fine track calculator using the relative position and posture sensor, the bend measuring instrument, and the six-axis force sensor in the present disclosure.

FIG. 42 is a view for illustrating an example of a flowchart for illustrating a flow of processing performed by the mirror replacement controller 100 of the thirteenth embodiment. In FIG. 42, Step 9Be is similar to Step 9Be of the first embodiment illustrated in FIG. 40. However, when the result of determination indicates that the measurement can be successfully performed (YES), the processing proceeds to Step 9Ba. When the result of determination indicates that the measurement cannot be successfully performed (NO), the processing proceeds to Step 9Bf.

In Step 9Ba, similarly to Step 9Ba of the first embodiment illustrated in FIG. 40, the target value fine track calculation 9Ba is executed.

In Step 9Bf, a force detection determination 9Bf is performed. In the force detection determination 9Bf, the force change calculator 9bB included in the force corrector 9*b* calculates the force change. When the amount of force change is equal to or larger than a threshold value, the result of determination is YES. When the amount of force change is smaller than the threshold value, the result of determination is NO. When the result of determination is YES, the processing proceeds to Step 9Bc without carrying out the current value fine track calculation 9Bb. When the result of determination is NO, the processing proceeds to Step 9Bb.

In Step 9Bb, similarly to Step 9Bb of the first embodiment illustrated in FIG. 40, the current value fine track calculation 9Bb is executed based on the fine drive mechanism sensor signal 9001.

Next, in Step 9Bc, processing similar to that in Step 9Bc of the first embodiment illustrated in FIG. 40 is performed. When the processing proceeds to Step 9Bc from Step 9Bf, specifically, when the force detection determination 9Bf is YES, however, the fine drive command signal calculation 9Bc is executed based on the output signal output from the force corrector 9*b* and the six-axis force sensor signal 9006 in addition to the fine drive mechanism sensor signal 9001. In Step 9Bc, the fine drive command signal 9002 obtained in the fine drive command signal calculation 9Bc from the difference between the target value and the current value is output to the fine drive mechanism 7. Then, the processing proceeds to Step 9Bd.

Next, in Step 9Bd, similarly to Step 9Bd of the first embodiment illustrated in FIG. 40, the determination of reaching the target value 9Bd is executed. When the result of determination indicates that the position and the posture reach the target position and the target posture (YES), the processing is ended. When the result of determination indicates that the position and the posture do not reach the target position and the target posture (NO), the processing proceeds to Step 9Be.

As described above, cases in which the first detector measurement determiner 9A performs the relative position/posture detection possibility determination 9Be and determines that the detection is impossible (NO) are the following cases: (1) when the lift insertion portion relative sensors 112 geometrically capture the lift mechanism 4 within the measurement range, (2) when the gripping claw portion relative sensors 111 geometrically capture the gripping mechanism 6 within the measurement range, (3) when, although the lift mechanism 4 is geometrically captured within the measurement range, a captured image is not clear due to oscillation of the mounting portion of each of the lift insertion portion relative sensors 112 or the gripping claw portion relative sensors 111 or required accuracy is not obtained due to illumination conditions, and (4) when the lift mechanism 4 is not captured within the measurement range.

In each of the embodiments described above, the present disclosure is also applicable to a structure without the rough drive mechanism 5, in which the fine drive mechanism 7 is held by the holder.

With the configuration described above, even in the cases (1) to (4) described above and other similar cases and when the position and the posture of the fine drive mechanism 7 are affected by the bend of the holder, the bend of the fine drive mechanism 7 itself, or the bend of both thereof, or when the segment mirror 3 and the lift mechanism 4 are held in contact with each other, the fine drive mechanism 7 can be controlled with high accuracy. In particular, the thirteenth embodiment is effective in that the control can be performed with high accuracy in the similar level for both when there is the influence of the bend described above and when the segment mirror 3 and the lift mechanism 4 come into contact with each other.

The present disclosure is not limited to each of the embodiments described above and encompasses all the possible combinations thereof.

INDUSTRIAL APPLICABILITY

The present disclosure is applicable to segmented mirror telescopes in various fields.

REFERENCE SIGNS LIST 1 mirror replacement device, 1a segmented mirror telescope, 2 segmented mirror telescope main body, 3 segment mirror, 4 lift mechanism, 5 rough drive mechanism, 5a rough drive brake mechanism, 5b rough drive automatic locking mechanism, 6 gripping mechanism, 6a gripping mechanism brake mechanism, 6b gripping mechanism automatic locking mechanism, 7 fine drive mechanism, 7a fine drive brake mechanism, 7b fine drive automatic locking mechanism, 8 rough track calculator, 8a rough drive hold controller, 9 fine track calculator, 9a fine drive hold controller, 9b force corrector, 30 reflecting mirror, 33 segmented primary mirror, 40 lift controller, 60 grip controller, 80 rough drive controller, 90 fine drive controller, 100 mirror replacement controller, 100a processor, 101 input/output interface, 102 CPU, 103 memory, 110 bend measuring instrument, 110a segment mirror side bend measuring instrument, 111 gripping claw portion relative sensor, 112 lift insertion portion relative sensor, 113 six-axis force sensor, 113a gravitational force detection sensor, 300 mirror material portion, 301 mirror gripped portion, 302 lift insertion portion, 303 lift contact tapered portion, 304 gripping projection, 401 lift mechanism small columnar portion, 402 lift mechanism tapered portion, 403 lift mechanism large columnar portion, 500 rough circular drive mechanism, 501 rough linear drive mechanism, 502 rough rotational drive mechanism, 503 course drive mechanism base, 504 rough linear half drive mechanism, 600 gripping mechanism base, 601 grip rotationally opening and closing mechanism, 602 gripping claw portion, 603 grip horizontally opening and closing mechanism, 604 gripping hold mechanism

The invention claimed is:

1. A mirror replacement device for a segmented mirror telescope including a segmented primary mirror in which a plurality of segment mirrors is removably arranged, the mirror replacement device comprising:
   a gripping mechanism to grip the segment mirror from above with openable and closable gripping claw portions;
   a fine drive mechanism having a lower end to which the gripping mechanism is fixed and to change a position and a posture of the gripping mechanism by being driven along each of multiple axes;
   a holder to hold the fine drive mechanism;
   a lift mechanism to lift the segment mirror mounted and to be removed along a perpendicular axis direction of the segment mirror;
   a first detector to detect a relative position and a relative posture between a comparison object being the gripping claw portions of the gripping mechanism or the segment mirror gripped by the gripping claw portions and a target object with which the comparison object is brought into contact;
   a second detector to detect a bend of the holder or a bend of the fine drive mechanism including the bend of the holder; and
   a mirror replacement controller including a processor to execute a program, and a storage to store the program which, when executed by the processor, performs processes of:
   controlling and driving the gripping mechanism, the fine drive mechanism, and the lift mechanism based on a detection signal output from the first detector or the second detector to replace the segment mirror,
   determining whether or not the first detector can successfully perform a measurement,
   driving the gripping mechanism, the fine drive mechanism, and the lift mechanism based on the detection signal output from the first detector, when the measurement can be successfully performed, and based on the detection signal output from the second detector, when the measurement cannot be successfully performed.

2. The mirror replacement device for a segmented mirror telescope according to claim 1,
   wherein the comparison object is the gripping claw portions when the gripping mechanism is not gripping the segment mirror and is the segment mirror when the gripping mechanism is gripping the segment mirror, and
   wherein the target object is the segment mirror when the gripping mechanism is not gripping the segment mirror and is the lift mechanism when the gripping mechanism is gripping the segment mirror.

3. The mirror replacement device for a segmented mirror telescope according to claim 1,
   wherein the comparison object is the gripping claw portions when the segment mirror is removed and is the segment mirror when the segment mirror is mounted, and
   wherein the target object is the segment mirror when the segment mirror is removed and is the lift mechanism when the segment mirror is mounted.

4. The mirror replacement device for a segmented mirror telescope according to claim 1, wherein the program of the mirror replacement controller performs processes of:
   computing a target track representing a track of the position and the posture of the gripping mechanism from a current position and a posture of the gripping mechanism to a final target position and a final target posture of the gripping mechanism and store the target track in the storage;
   when the measurement can be successfully performed, obtaining a correction amount for correcting the target track stored in the storage based on the detection signal output from the first detector to change the target track in the storage to a new target track corrected with the correction amount;
   when the measurement cannot be successfully performed, obtaining the correction amount for correcting the target track stored in the storage based on the detection signal output from the second detector; and
   controlling and driving the fine drive mechanism based on the target track corrected with the correction amount.

5. The mirror replacement device for a segmented mirror telescope according to claim 1, wherein the program of the mirror replacement controller performs processes of:
   computing a target track representing a track of the position and the posture of the gripping mechanism from a current position and a current posture of the gripping mechanism to a final target position and a final target posture of the gripping mechanism and store the target track in the storage;
   obtaining a command signal for driving the drive mechanism in the target track stored in the storage;
   when the measurement can be successfully performed, obtaining a correction amount for correcting the command signal based on the detection signal output from the first detector to change the target track stored in the storage by the correction amount;
   when the measurement cannot be successfully performed, obtaining the correction amount for correcting the command signal obtained from the target track stored in the storage based on the detection signal output from the second detector; and controlling and driving the fine drive mechanism based on the command signal corrected with the correction amount.

6. The mirror replacement device for a segmented mirror telescope according to claim 1,
wherein the holder has a rough drive mechanism to move the fine drive mechanism above the segmented primary mirror, and
wherein the program of the mirror replacement controller performs processes of:
outputting a command signal for moving the rough drive mechanism to a pre-stored position of the segment mirror to be replaced, to the rough drive mechanism in accordance with a difference between a detection signal indicating a position of the rough drive mechanism and the position of the segment mirror to be replaced.

7. The mirror replacement device for a segmented mirror telescope according to claim 5, further comprising a third detector to detect a bend of a segmented mirror telescope main body of the segmented mirror telescope,
wherein the program of the mirror replacement controller performs processes of:
correcting the command signal in accordance with a detection signal output from the third detector to output the corrected command signal to the fine drive mechanism.

8. The mirror replacement device for a segmented mirror telescope according to claim 1, wherein the fine drive mechanism comprises a parallel link mechanism.

9. The mirror replacement device for a segmented mirror telescope according to claim 1, wherein the gripping mechanism opens and closes in a direction parallel to a surface of the segment mirror.

10. The mirror replacement device for a segmented mirror telescope according to claim 9, wherein the gripping mechanism includes gripping hold mechanisms provided respectively to distal ends of the gripping claw portions to grip the segment mirror by opening and closing and to sandwich the segment mirror therebetween.

11. The mirror replacement device for a segmented mirror telescope according to claim 1, further comprising a six-axis force sensor,
wherein the program of the mirror replacement controller performs processes of:
monitoring a load when the segment mirror is mounted and removed in accordance with a detection signal output from the six-axis force sensor.

12. The mirror replacement device for a segmented mirror telescope according to claim 11, wherein the program of the mirror replacement controller performs processes of:
controlling the fine drive mechanism in accordance with the detection signal output from the six-axis force sensor.

13. The mirror replacement device for a segmented mirror telescope according to claim 12, wherein the segment mirror includes a lift insertion portion provided at a lower portion, into which the lift mechanism is inserted, and a distal end of the lift mechanism, which is inserted into the lift insertion portion when the lift mechanism is raised, is tapered so as to form a clearance with an inner wall of the lift insertion portion.

14. The mirror replacement device for a segmented mirror telescope according to claim 5,
wherein the fine drive mechanism includes:
a six-axis force sensor; and
a gravitational force detection sensor to measure an inclination of the six-axis force sensor with respect to a direction of a gravitational force, and
wherein the program of the mirror replacement controller performs processes of:
obtaining a correction amount for the command signal based on a signal output from the six-axis force sensor to correct the detection signal output from the six-axis force sensor, which varies depending on a force change generated when the correction amount is corrected, based on a signal output from the gravitational force detection sensor.

15. A mirror replacement method for a segmented mirror telescope, by which a segment mirror is replaced through use of a device comprising:
a segmented mirror telescope including a segmented primary mirror in which a plurality of segment mirrors is removably arranged;
a gripping mechanism to grip the segment mirror from above with openable and closable gripping claw portions;
a fine drive mechanism having a lower end to which the gripping mechanism is fixed and to change a position and a posture of the gripping mechanism by being driven along each of multiple axes;
a holder to hold the fine drive mechanism; and
a lift mechanism to lift the segment mirror mounted and to be removed along a perpendicular axis direction of the segment mirror,
the mirror replacement method comprising:
a first detecting to detect a relative position and a relative posture between a comparison object being the gripping claw portions of the gripping mechanism or the segment mirror gripped by the gripping claw portions and a target object with which the comparison object is brought into contact;
a second detecting to detect a bend of the holder or a bend of the fine drive mechanism including the bend of the holder; and
a mirror replacement controlling to control and to drive the gripping mechanism, the fine drive mechanism, and the lift mechanism based on a detection signal from the first detecting or the second detecting to replace the segment mirror,
wherein, in the mirror replacement controlling, determination is made on whether or not a measurement can be successfully performed in the first detecting, and
wherein, when a result of the determination indicates that the measurement can be successfully performed, the drive control is performed based on the detection signal from the first detecting, and when the result of determination indicates that the measurement cannot be successfully performed, the drive control is performed based on the detection signal from the second detecting.

* * * * *